US006442321B1

(12) United States Patent
Berini

(10) Patent No.: US 6,442,321 B1
(45) Date of Patent: Aug. 27, 2002

(54) OPTICAL WAVEGUIDE STRUCTURES

(75) Inventor: Pierre Simon Joseph Berini, Ottawa (CA)

(73) Assignee: Spectalis Corp., Ottawa (CA)

( * ) Notice: Subject to any disclaimer, the term of this patent is extended or adjusted under 35 U.S.C. 154(b) by 1 days.

(21) Appl. No.: 09/629,816

(22) Filed: Jul. 31, 2000

Related U.S. Application Data

(60) Provisional application No. 60/171,606, filed on Dec. 23, 1999.

(51) Int. Cl.[7] .................................................. G02B 6/10
(52) U.S. Cl. ......................... 385/130; 385/31; 385/39; 385/40; 385/42; 385/50; 385/129
(58) Field of Search ................ 385/129–132, 385/1, 2, 3, 11, 4, 15

(56) References Cited

U.S. PATENT DOCUMENTS

| 4,249,796 A | 2/1981 | Sincerbox et al. ........... 359/241 |
| 4,432,614 A | 2/1984 | McNeill et al. ............. 359/261 |
| 4,451,123 A | 5/1984 | McNeill et al. ............. 359/273 |
| 4,583,818 A | 4/1986 | Chen et al. ................... 385/37 |
| 4,806,885 A | 2/1989 | Morimoto ................... 359/284 |
| 4,915,482 A | 4/1990 | Collins et al. .............. 359/276 |
| 4,948,225 A | 8/1990 | Rider et al. ..................... 385/2 |
| 4,971,426 A | 11/1990 | Schildkraut et al. ........ 359/247 |
| 5,067,788 A | 11/1991 | Jansson et al. ................. 385/2 |
| 5,075,796 A | 12/1991 | Schildkraut et al. ........ 359/247 |
| 5,155,617 A | 10/1992 | Solgaard et al. ............ 359/245 |
| 5,157,541 A | 10/1992 | Schildkraut et al. ........ 359/276 |
| 5,359,681 A | * 10/1994 | Jorgenson et al. ............. 385/12 |
| 5,615,289 A | 3/1997 | Duck et al. .................... 385/24 |
| 5,625,729 A | 4/1997 | Brown ......................... 385/31 |
| 6,034,809 A | 3/2000 | Anemoglannis ............. 359/254 |
| 6,064,685 A | 5/2000 | Bissessur et al. ........... 372/102 |
| 6,072,926 A | 6/2000 | Cole et al. ..................... 385/37 |
| 6,282,005 B1 | * 8/2001 | Thompson et al. ......... 359/173 |
| 6,285,652 B1 | * 9/2001 | Tsai et al. ................. 369/275.1 |

FOREIGN PATENT DOCUMENTS

| EP | 0810454 A1 | 12/1997 | ........... G02B/6/124 |

OTHER PUBLICATIONS

American Institute of Physics Handbook, third edition, Mc–Graw Hill Book Company, 1972 (No Date).
Handbook of Optics, McGraw–Hill Book Company, 1978 (No Date).
"Surface Plasmon–Polariton Study of the Optical Dielectric Function of Silver", Nash, D.J., Sambles, J.R., Journal of Modern Optics, vol. 43, No. 1 (1996), pp. 81–91.
"Electromagnetic Surface Modes". Boardman, A.D., Wiley Interscience, 1982 (No Date).

(List continued on next page.)

Primary Examiner—Brian Healy
Assistant Examiner—Kevin S. Wood
(74) Attorney, Agent, or Firm—Thomas Adams

(57) ABSTRACT

The purely bound electromagnetic modes of propagation supported by symmetric waveguide structures comprised of a thin lossy metal film of finite width embedded in an infinite homogeneous dielectric have been characterized at optical wavelengths. The modes supported are divided into four families depending on the symmetry of their fields. In addition to the four fundamental modes that exist, numerous higher order ones are supported as well. A nomenclature suitable for identifying all modes is discussed. The dispersion of the modes with film thickness and width has been assessed and the effects of varying the background permittivity on the characteristics of the modes determined. The frequency dependency of one of the modes has been investigated. The higher order modes have a cut-off width, below which they are no longer propagated and some of the modes have a cut-off thickness.

31 Claims, 37 Drawing Sheets

OTHER PUBLICATIONS

"Surface Plasmons in Thin Films", Economou, E.N., Physical Review, vol. 182, No. 2 (Jun. 1969), pp. 539–554.

"Surface–Polariton–Like Waves Guided by Thin, Lossy Metal Films", Burke, J.J., Stegeman, G.I. Tamir, T., Physical Review B, vol. 33, No. 8 (Apr. 1986), pp. 5186–5201.

"Long–Range Surface Plasmon–Polaritons, in Asymmetric Layer Structures", Wendler, L., Haupt, R., Journal of Applied Physics, vol. 59, No. 9 (May 1986), pp. 3289–3291.

"Guided Optical Waves in Planar Heterostructures with Negative Dielectric Constant" Prade, B., Vinet, J.Y., Mysyrowicz, A., Physical Review B, vol. 44, No. 24 (Dec. 1991), pp. 13556–13572.

"Negative Group Velocities in Metal–Film Optical Waveguides", Tournois, P., Laude, V., Optics Communications, Apr. 1997, pp. 41–45.

"Surface Plasmon Polaritons in Thin Metal Films and Their Role in Fiber Optic Polarizing Devices", Johnstone, W., Stewart, G., Hart, T., Culshaw B., Journal of Lightwave Technology, vol. 8, No. 4 (Apr. 1990), pp. 538–544.

"Characterization of Metal–Clade TE/TM Mode Splitters Using the Finite Element Method", Rajarajan, M., Themistos, C., Rahman, B.M.A., Grattan, K.T.V., Journal of Lightwave Technology, vol. 15, No. 12 (Dec. 1997), pp. 2264–2269.

"Plasmon–Polariton Modes Guided by a Metal Film of Finite Width", Berini, P., Optics Letters, vol. 24, No. 15 (Aug. 1999), pp. 1011–1013.

"The Method of Lines", Numerical Techniques for Microwave and Millimeter–Wave Passive Structures, Pregla, R., Pascher, W., Wiley Interscience, 1989, T. Itoh, Editor (No Date).

"Modeling Lossy Anisotropic Dielectric Waveguides With The Method of Lines", Berini, P., Wu, K., IEEE Transactions on Microwave Theory and Techniques, vol. MTT–44, No. 5 (May 1996), pp. 749–759.

"Normal Mode Analysis and Characterization of an InGaAs/GaAs MQW Field–Induced Optical Waveguide Including Electrode Effects", Berini, P., Stohr, A. Wu, K. Jager, D., Journal of Lightwave Technology, vol. 14, No. 10 (Oct. 1996), pp. 2422–2435.

"The Use of Extrapolation Techniques with Electrical Network Analogue Solutions", Culver, R., British Journal of Applied Physics, vol. 3 (Dec. 1952) pp. 376–378.

"Computation Methods for Electromagnetics and Microwaves", Boonton, R.C., Wiley Interscience, 1992 (No Date).

"Excitation of Surface Polaritons by End–Fire Coupling", Stegeman,G.I., Wallis, R.F., Maradudin, A.A., Optics Letters, vol. 8, No. 7 (Jul. 1983), pp. 386–388.

"Plasmon–Polariton Waves Guided by Thin Lossy Metal Films of Finite Width: Bound Modes of Symmetric Structures", Berini, P., Physical Review B, vol. 61, No. 15, (2000), pp. 10484–10503 (No Date).

Kraus, et al., Electromagnetics, second edition, McGraw–Hill (No Date).

"Experimental Observation of Plasmon–Polariton Waves Supported by a Thin Metal Film of Finite Width", Charbonneau,R., Berini, P., Berolo, E., Lisicka–Skrzek, E., Optics Letters, vol. 25, No. 11, pp. 844–846, Jun. 2000.

"Measurement of The Electrically Induced Refractive Index Change in Silicon for Wavelength =1.3 um using a Schottky Diode", Evans, A.F., Hall, D.G., Applied Physics Letters, vol. 56, No. 3, pp. 212–214, Jan., 1990.

"Integrated Optics Waveguide Modulator Based on Surface Plasmons", Jung, G., Yee, S., Kuhn, K., Journal of Lightwave Technology, vol. 12, No. 10, pp. 1802–1806, Oct. 1994.

"High Frequency Attenuated Total Internal Reflection Light Modulator", Solgaard, O., Ho, F., Thackara, J.I., Bloom, D.M., Applied Physics Letters, vol. 61, No. 21, pp. 2500–2502, Nov., 1992.

"Long–range surface plasmon electro–optic modulator", Schildraut, J.S., Applied Optics, vol. 27, No. 21, pp. 4587–4590, Nov., 1988.

"Novel Integrated Optic Intensity Modulator Based on Mode Coupling", Driessen, A., Klein Koerkamp, H.M.M., Popma, Th.J.A. Fibre and Integrated optics, vol. 13, pp. 445–461, 1994.

"A Cost 240 Benchmark Test for Beam Propagation Methods Applied to a Electrooptical Modulator Based on Surface Plasmons", Hoekstra, H.J.W.M.et al, Journal of Lightwave Technology, vol. 16, No. 10, pp. 1921–1926, Oct. 1998.

"The Proximity Effect of Conductors in Optical Waveguide Devices: Coupling to Plasmon–Polariton Modes", Berini, P., SPIE SD–25 Millimeter–Wave Materials Devices and Components, in print, Jul. 2000.

"The Almost–magical World of Photonic Crystals" J.D. Joannopoulos, Braxilian Journal of Physcis, vol. 26, No. 1, Mar. 1996, pp. 58–67 (No Date).

"Plasmon–Polariton Modes Guided by a Metal Film of Finite Width Bounded by Different Dielectrics", Berini, P., Optics Express, vol. 7, No. 10, pp. 329–335.

"Plasmon–Polariton waves guided by thin lossy metal films of finite width: Bound Modes of Asymmetric Structures", Bereini, P., Physical Review B, in Press. Not yet published (No Date).

"A Complete Description of the Dispersion Relation for Thin Metal Film Plasmon–Polaritons", Burton, F.A., Cassidy, S.A., Journal of Lightwave Technology, vol. 8, No. 12 (Dec. 1990), pp. 1843–1849.

"Optical Properties of Metals", Georg Hass, U.S. Army Engineer Research and Development Laboratories, Colorado State University, Optics (No Date).

Glysis E N et al "High –Spatial–Frequency Binary and Multivelvel Stairstep Gratings: Polarization–Selective Mirrors and Broadband Antifeflection Surfaces" Applied Optics, Optical Society of America, washingtom US vol. 31 no. 22 Aug. 1992.

Liu J. et al "Infrared Quarter–Wave Reflector Retarders Designed with High–Spatial–Frequency Dielectric Surface–Relief Gratings on Goldsubstrate at Oblique Incidence" Applied Opticsa, Optical Society of America, Washington US vol. 35, No. 28 Nov. 1995.

Charbonneau, R. Berini, P. et al, "Long–Range Plasmon–Polariton Wave Propagation in Thin Metal Films of Finite–Width Excited Using an End–Fire Technique", Proceedings of SPIE, vol. 4087, p. 534, 2000 Dec. 2000.

* cited by examiner

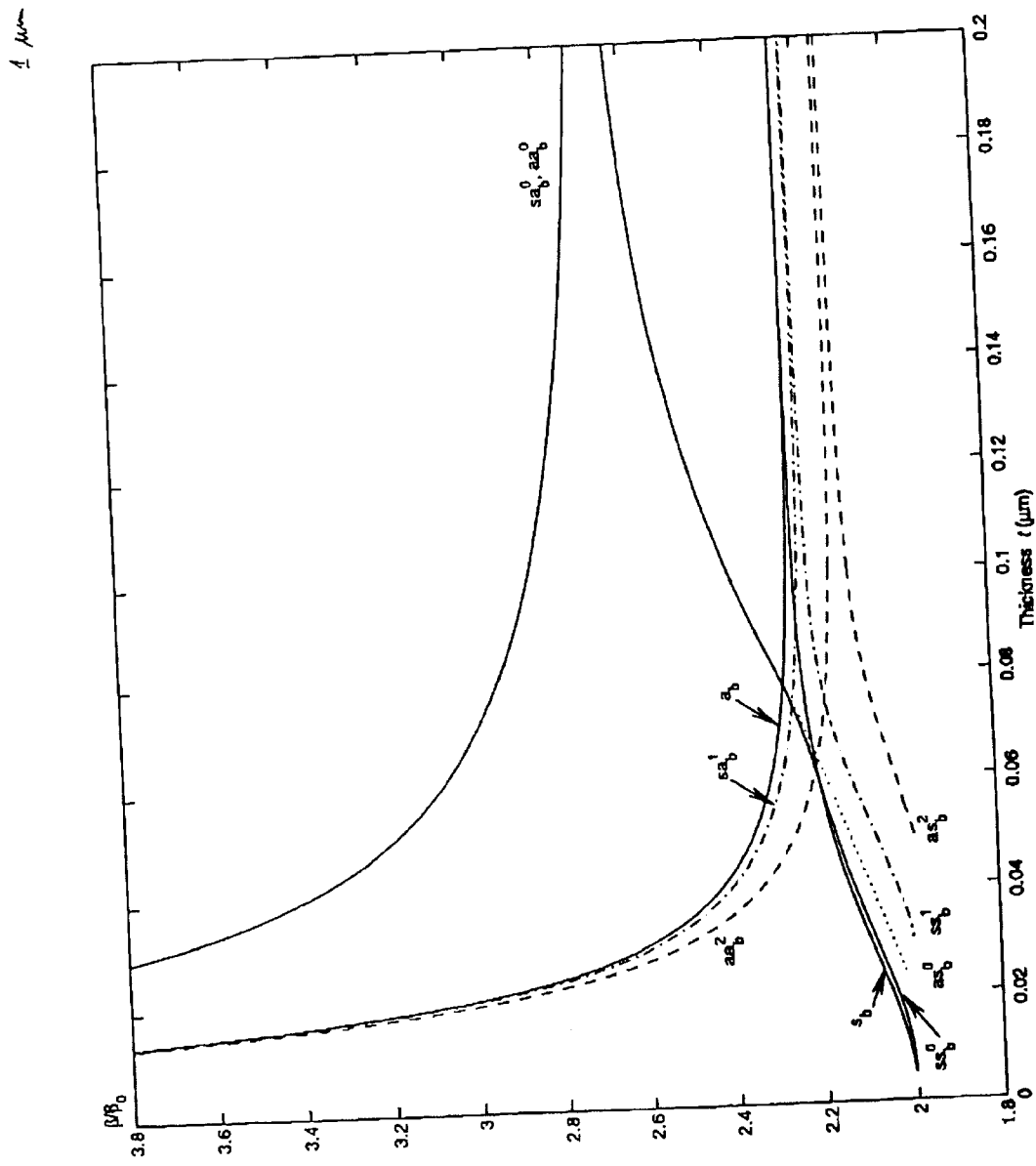

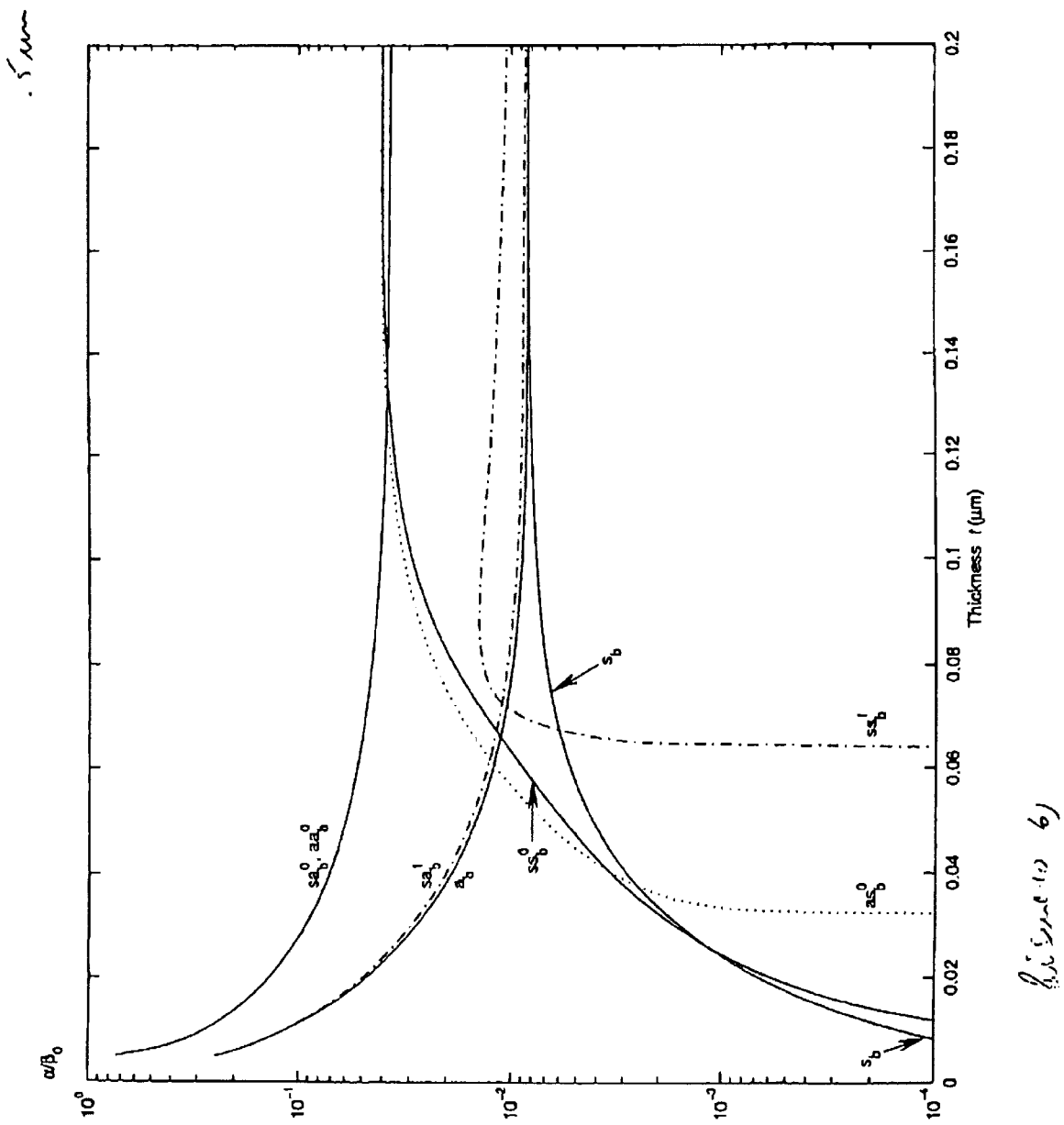

OPTICAL WAVEGUIDE STRUCTURES

This application claims benefit of Provisional Appln. Ser. No. 60/177,606 filed Dec. 23, 1999.

BACKGROUND OF THE INVENTION

1. Technical Field

The invention relates to optical devices and is especially applicable to waveguide structures and integrated optics.

2. Background Art

This specification refers to several published articles. For convenience, the articles are cited in full in a numbered list at the end of the description and cited by that number in the specification itself. The contents of these articles are incorporated herein by reference and the reader is directed to them for reference.

At optical wavelengths, the electromagnetic properties of some metals closely resemble those of an electron gas, or equivalently of a cold plasma. Metals that resemble an almost ideal plasma are commonly termed "noble metals" and include, among others, gold, silver and copper. Numerous experiments as well as classical electron theory both yield an equivalent negative dielectric constant for many metals when excited by an electromagnetic wave at or near optical wavelengths [1,2]. In a recent experimental study, the dielectric function of silver has been accurately measured over the visible optical spectrum and a very close correlation between the measured dielectric function and that obtained via the electron gas model has been demonstrated [3].

It is a well-known fact that the interface between semi-infinite materials having positive and negative dielectric constants can guide TM (Transverse Magnetic) surface waves. In the case of a metal-dielectric interface at optical wavelengths, these waves are termed plasmon-polariton modes and propagate as electromagnetic fields coupled to surface plasmons (surface plasma oscillations) comprised of conduction electrons in the metal [4].

A metal film of a certain thickness bounded by dielectrics above and below is often used as an optical slab (planar, infinitely wide) waveguiding structure, with the core of the waveguide being the metal film. When the film is thin enough, the plasmon-polariton modes guided by the interfaces become coupled due to field tunnelling through the metal, thus creating supermodes that exhibit dispersion with metal thickness. The modes supported by infinitely wide symmetric and asymmetric metal film structures are well-known, as these structures have been studied by numerous researchers; some notable published works include references [4] to [10].

In general, only two purely bound TM modes, each having three field components, are guided by an infinitely wide metal film waveguide. In the plane perpendicular to the direction of wave propagation, the electric field of the modes is comprised of a single component, normal to the interfaces and having either a symmetric or asymmetric spatial distribution across the waveguide. Consequently, these modes are denoted $s_b$ and $a_b$ modes, respectively. The $s_b$ mode can have a small attenuation constant and is often termed a long-range surface plasmon-polariton. The fields related to the $a_b$ mode penetrate further into the metal than in the case of the $s_b$ mode and can be much lossier by comparison. Interest in the modes supported by thin metal films has recently intensified due to their useful application in optical communications devices and components. Metal films are commonly employed in optical polarizing devices [11] while long-range surface plasmon-polaritons can be used for signal transmission [7]. In addition to purely bound modes, leaky modes are also known to be supported by these structures.

Infinitely wide metal film structures however are of limited practical interest since they offer 1-D field confinement only, with confinement occurring along the vertical axis perpendicular to the direction of wave propagation implying that modes will spread out laterally as they propagate from a point source used as the excitation. Metal films of finite width have recently been proposed in connection with polarizing devices [12], but merely as a cladding.

SUMMARY OF THE INVENTION

The present invention seeks to eliminate, or at least mitigate, the disadvantages of the prior art.

According to the present invention there is provided a waveguide structure comprising a thin strip of a material having a relatively high free charge carrier density surrounded by a material having a relatively low free charge carrier density, the strip having finite width and thickness with dimensions such that optical radiation having a wavelength in a predetermined range couples to the strip and propagates along the length of the strip as a plasmon-polariton wave.

Such a strip of finite width offers 2-D confinement in the transverse plane, i.e. perpendicular to the direction of propagation, and, since suitable low-loss waveguides can be fabricated from such strip, it may be useful for signal transmission and routing or to construct components such as couplers, power splitters, modulators and other typical components of integrated optics.

For example, where the optical radiation has a free-space wavelength of 1550 nm, and the waveguide is made of a strip of a noble metal surrounded by a good dielectric, say glass, suitable dimensions for the strip are thickness less than about 0.1 microns, preferably 20 nm, and width of a few microns, preferably about 4 microns.

The strip could be straight, curved, bent, tapered, and so on.

The dielectric material may be inhomogeneous, for example a combination of slabs, strips, laminae, and so on. The conductive or semiconductive strip may be inhomogeneous, for example a gold layer sandwiched between thin layers of titanium.

The plasmon-polariton wave which propagates along the structure may be excited by an appropriate optical field incident at one of the ends of the waveguide, as in an end-fire configuration, and/or by a different radiation coupling means.

Various objects, features, aspects and advantages of the present invention will become more apparent from the following detailed description, in conjunction with the accompanying drawings, of a preferred embodiment of the invention.

DESCRIPTION OF THE PREFERRED EMBODIMENT

The following description presents a comprehensive description of the purely bound modes of propagation supported by symmetric waveguide structures comprised of a thin lossy metal film of finite-width as the core, embedded in an "infinite" homogeneous dielectric medium, and to investigate the evolution of modes due to variations in the physical parameters of the waveguides. (Preliminary results of this work have already been reported as a short communication [13].) The description is organized as follows. Section II summarizes the physical basis and numerical technique used to analyze the structures of interest. Section III describes the nature of the purely bound fundamental and higher-order modes, their dispersion and evolution with film thickness, and discusses a recently proposed mode nomenclature suitable for identifying them [13]. Section IV describes the dispersion of modes with film width, Section V presents the changes in waveguiding properties caused by varying the background permittivity and Section VI discusses the frequency dependence of mode solutions. Concluding remarks are given in Section VII.

In the context of this patent specification, the term "optical radiation" embraces electromagnetic waves having wavelengths in the infrared, far infrared, visible and ultraviolet ranges.

The terms "finite" and "infinite" as used herein are used by persons skilled in this art to distinguish between waveguides having "finite" widths in which the actual width is significant to the performance of the device and the physics governing its operation and so-called "infinite" waveguides where the width is so great that it has no significant effect upon the performance and physics or operation.

Figure 1A:
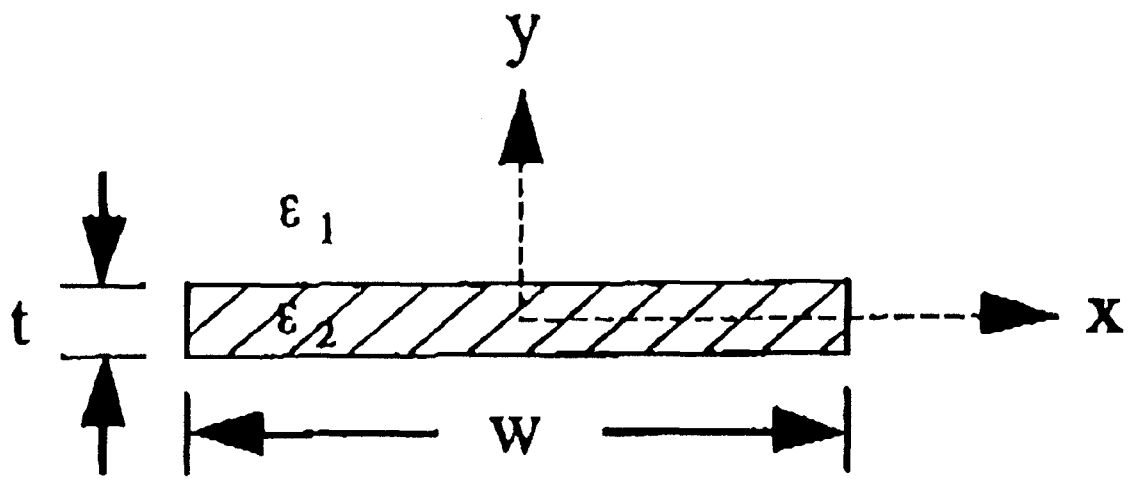
FIGS. 1(a) and 1(b) are a cross-sectional illustration and a plan view, respectively, of a waveguide structure embodying the present invention in which the core is comprised of a lossy metal film of thickness t, width w, length I and permittivity $\in_2$ embedded in a cladding or background comprising an "infinite" homogeneous dielectric having a permittivity $\in_1$.

II. Physical Basis and Numerical Technique
A. Description of the Waveguide Structure A structure embodying the present invention is shown in FIG. 1A. It comprises a metal film of thickness t, width w and equivalent permittivity $\in_2$, surrounded by an infinite homogeneous dielectric of permittivity $\in_1$. The Cartesian coordinate axes used for the analysis are also shown with propagation taking place along the z axis, which is out of the page.

It is assumed that the metal region shown in FIG. 1A can be modeled as an electron gas over the wavelengths of interest. According to classical or Drude electron theory, the complex relative permittivity of the metal region is given by the well-known plasma frequency dispersion relation [4]:

$$\in_{r,2} = \left(1 - \frac{\omega_p^2}{\omega^2 + v^2}\right) - j\left(\frac{\omega_p^2 v}{\omega(\omega^2 + v^2)}\right) \qquad (1)$$

where $\omega$ is the excitation frequency, $\omega_p$ is the electron plasma frequency and $v$ is the effective electron collision frequency, often expressed as $v=1/\tau$ with $\tau$ defined as the relaxation time of electrons in the metal. When $\omega^2+v^2<\omega_p^2$ (which is the case for many metals at optical wavelengths) a negative value for the real part $\in_{r,2}$ is obtained, implying that plasmon-polariton modes can be supported at interfaces with normal dielectrics.

B. Electromagnetic Wave and Field Equations

The modes supported by the structure illustrated in FIG. 1 are obtained by solving a suitably defined boundary value problem based on Maxwell's equations written in the frequency domain for a lossy inhomogeneous isotropic medium. Uncoupling Maxwell's equations yields the following time-harmonic vectorial wave equations for the E and H fields:

$$\nabla \times \nabla \times E - \omega^2 \in(x,y) \mu E = 0 \qquad (2)$$

$$\nabla \times \in(x,y)^{-1} \nabla \times H - \omega^2 \mu H = 0 \qquad (3)$$

where the permittivity $\in$ is a complex function of cross-sectional space, and describes the waveguide structure. For the structures analyzed in this description, $\mu$ is homogeneous and taken as the permeability of free space $\mu_0$.

Due to the nature of the numerical method used to solve the boundary value problem, the implicit y dependence of the permittivity can be immediately removed since any inhomogeneity along y is treated by dividing the structure into a number of layers that are homogeneous along this direction, and suitable boundary conditions are applied between them.

The two vectorial wave equations (2) and (3) are expanded in each layer into scalar wave equations, some being coupled by virtue of the remaining inhomogeneity in $\in$ along x. Since the structure under consideration is invariant along the propagation axis (taken to be in the +z direction), the mode fields vary along this dimension according to $\bar{e}^{\gamma z}$ where $y=\alpha+j\beta$ is the complex propagation constant of the mode, $\alpha$ being its attenuation constant and $\beta$ its phase constant. Substituting this field dependency into the scalar wave equations, and writing them for $TE^x$ ($E_x=0$) and $TM^x$ ($H_x=0$) modes while making use of $\nabla \cdot [\in(x)E]$ 32 0 and $\nabla \cdot H=0$ accordingly, yields simplified and uncoupled scalar wave equations that are readily solved. The $E_y$ component of the $TE^x$ modes must satisfy the Helmholtz wave equation:

$$\frac{\partial^2}{\partial x^2}E_y^{TE} + \frac{\partial^2}{\partial y^2}E_y^{TE} + [\gamma^2\omega^2\mu \in (x)]E_y^{TE} = 0 \qquad (4)$$

and the $H_y$ component of the $TM^x$ modes must satisfy the Sturm-Liouville wave equation:

$$\in(x)\frac{\partial}{\partial x}\left[\frac{1}{\in(x)}\frac{\partial}{\partial x}H_y^{TM}\right] + \frac{\partial^2}{\partial y^2}H_y^{TM} + [\gamma^2 = \omega^2\mu \in (x)]H_y^{TM} = 0 \qquad (5)$$

The superposition of the $TE^x$ and $TM^x$ mode families then describes any mode propagating in the structure analyzed. The electric and magnetic field components resulting from this superposition are given by the following equations:

$$E_x = \frac{-1}{j\omega\gamma}\left[\frac{\partial}{\partial x}\left(\frac{1}{\in(x)}\frac{\partial}{\partial x}H_y^{TM}\right) + \omega^2\mu H_y^{TM}\right] \qquad (6)$$

$$E_y = E_y^{TE} - \frac{i}{j\omega\gamma \in(x)}\frac{\partial^2}{\partial x \partial y}H_y^{TM} \qquad (7)$$

-continued $$E_z = \frac{1}{\gamma} \frac{\partial}{\partial y} E_y^{TE} + \frac{1}{j\omega \in (x)} \frac{\partial}{\partial x} H_y^{TM} \quad (8)$$

$$H_x = \frac{1}{j\omega\gamma} \left[ \frac{1}{\mu} \frac{\partial^2}{\partial x^2} E_y^{TE} + \omega^2 \in (x) E_y^{TE} \right] \quad (9)$$

$$H_y = \frac{1}{j\omega\gamma\mu} \frac{\partial^2}{\partial x \partial y} E_y^{TE} + H_y^{TM}$$

$$H_z = -\frac{1}{j\omega\mu} \frac{\partial}{\partial x} E_y^{TE} + \frac{1}{\gamma} \frac{\partial}{\partial y} H_y^{TM} \quad (10)$$

In order to obtain a mode of propagation supported by a waveguiding structure, the Helmholtz and Sturm-Liouville wave equations (4) and (5), along with the field equations (6)–(11), must be solved for the propagation constant y using appropriate boundary conditions applied between layers and at the horizontal and vertical limits.

C. Poynting Vector and Power Confinement Factor

The power confinement factor is defined as the ratio of mode complex power carried through a portion of a waveguide's cross-section with respect to the mode complex power carried through the entire waveguide cross-section. Formally it is expressed as:

$$cf = \frac{\left| \iint_{A_c} S_z ds \right|}{\left| \iint_{A_\infty} S_z ds \right|} \quad (12)$$

where $A_c$ is usually taken as the area of the waveguide core and $A_\infty$ implies integration over the entire waveguide cross-section (which can be all cross-sectional space for an open structure) or the entire cross-sectional computational domain. $S_z$ refers to the z component of the Poynting vector:

$$S_x = \frac{1}{2} (E_x H_y^* - E_y H_x^*) \quad (13)$$

and $H_{x,y}^*$ denotes the complex conjugate of $H_{x,y}$. The spatial distribution of a component of the Poynting vector is easily computed from the spatial distribution of the relevant electric and magnetic mode field components.

D. Numerical Solution Approach

The boundary value problem governed by equations (4) to (11) is solved by applying the Method of Lines (MoL). The MoL is a well-known numerical technique and its application to various electromagnetic problems, including optical waveguiding, is well-established [14]. The MoL is rigorous, accurate and flexible. It can handle a wide variety of waveguide geometries, including the structures at hand. The method is not known to generate spurious or non-physical modes. The MoL formulation used herein is based on the formulation reported in [15], but simplified for isotropic media, as prescribed by equations (4)–(11) and reported in [16]. Except for a 1-D spatial discretization, the method is exact.

The main idea behind the MoL is that the differential field equations governing a waveguiding problem are discretized only as far as necessary so that generalized analytic solutions can be applied to derive a homogeneous matrix problem describing all modes supported by the structure. This approach renders the method accurate and computationally efficient since only N-1 dimensions must be discretized to solve an N dimension problem. In the case of a 2-D waveguiding structure, this means that only one spatial dimension needs to be discretized. The main features of this procedure, as applied to a modal analysis problem are described below.

The x axis and the function $\in(x)$ are discretized using two shifted non-equidistant line systems, parallel to the y axis.

The differential operators $\partial\backslash\partial x$ and $\partial^2/\partial^2 x$ in the wave and field equations are replaced by finite difference approximations that include the lateral boundary conditions.

The discretized wave equations are diagonalized using appropriate transformations matrices.

The diagonalization procedure yields in the transform domain two systems of uncoupled 1-D differential equations along the remaining dimension (in this case along the y axis).

These differential equations are solved analytically and tangential field matching conditions are applied at interfaces between layers along with the top and bottom boundary conditions.

The last field matching condition, applied near the center of the structure, yields a homogeneous matrix equation of the form $G(\gamma)\bar{e}=0$ which operates on transformed tangential fields.

The complex propagation constant y of modes is then obtained by searching for values that satisfy $\det[G(y)]=0$.

Once the propagation constant of a mode has been determined, the spatial distribution of all six field components of the mode are easily generated.

A mode power confinement factor can be computed by first computing the spatial distribution of $S_2$ which is then integrated according to Equation (12).

The open structure shown in FIG. 1 is discretized along the x axis and the generalized analytic solution applied along the y axis. The physical symmetry of the structure is exploited to increase the accuracy of the results and to reduce the numerical effort required to generate the mode solutions. This is achieved by placing either electric wall ($E_{ten}=0$) or magnetic wall ($H_{ten}=0$) boundary conditions along the x and y axes. The remaining top boundary condition is placed at infinity and the remaining lateral boundary condition is either placed far enough from the guide to have a negligible effect on the mode calculation, or a lateral absorbing boundary condition is used to simulate infinite space, depending on the level of confinement observed in the resulting mode.

The use of numerical methods to solve differential equations inevitably raises questions regarding the convergence of computed results and their accuracy. The propagation constant of a mode computed using the method of lines converges in a monotonic or smooth manner with a reduction in the discretization interval (which increases the number of lines in the calculation and thus the numerical effort). This suggests that extrapolation can be used to generate a more accurate value for the propagation constant, and this value can then be used to compute the error in values obtained using the coarser discretizations [17]. This anticipated error does not correspond to the actual error in the propagation constant as the latter could only be known if the analytic or exact value is available. The anticipated error however still provides a useful measure of accuracy since it must tend toward zero as more accurate results are generated.

The convergence of the computed propagation constant of the modes supported by the structures of interest has been monitored during the entire study. The anticipated error in the results presented herein is estimated as 1% on average and 6% in the worst case. These error values are based on extrapolated propagation constants computed using Richardson's extrapolation formula [18].

III. Mode Characteristics and Evolution with Film Thickness

A. Review of Mode Solutions for Metal Film Slab Waveguides

We begin with the reproduction of results for an infinitely wide symmetric metal film waveguide, as shown in FIG. 1 with w=∞, taken from the standard work on such structures [6]. In order to remain consistent with their results, the optical free-space wavelength of excitation is set to $\lambda_0=0.633$ μm and their value for the relative permittivity of the silver film at this wavelength is used: $\epsilon_{r,2}=-19-j0.53$. The relative permittivity of the top and bottom dielectric regions is set to $\epsilon_{r,1}=4$.

An infinitely wide structure supports only two purely bound TM ($E_x=H_y=H_z=0$) modes having transverse field components $E_y$ and $H_x$ that exhibit asymmetry or symmetry with respect to the x axis. These modes are created from the coupling of individual plasmon-polariton modes supported by the top and bottom interfaces and they exhibit dispersion with film thickness. The widely accepted nomenclature for identifying them consists in using the letters a or y for asymmetric or symmetric transverse field distributions, respectively, followed by a subscript b or l for bound or leaky modes, respectively. The propagation constants of the $a_b$ and $s_b$ modes have been computed as a function of film thickness and the normalized phase and attenuation constants are plotted in FIG. 2(a) and (b), respectively.

From FIG. 2, it is observed that the $a_b$ and $s_b$ modes become degenerate with increasing film thickness. As the separation between the top and bottom interfaces increases, the $a_b$ and $s_b$ modes begin to split into a pair of uncoupled plasmon-polariton modes localized at the metal-dielectric interfaces. The propagation constants of the $a_b$ and $s_b$ modes thus tend towards that of a plasmon-polariton mode supported by the interface between semi-infinite metallic and dielectric regions, which is given via the following equations [6]:

$$\beta/\beta_0 = -\text{Re}\left\{\sqrt{\frac{\epsilon_{r,1}\epsilon_{r,2}}{\epsilon_{r,1}+\epsilon_{r,2}}}\right\} \quad (14)$$

$$\alpha/\beta_0 = -\text{Im}\left\{\sqrt{\frac{\epsilon_{r,1}\epsilon_{r,2}}{\epsilon_{r,1}+\epsilon_{r,2}}}\right\} \quad (15)$$

where $\beta_0=\omega/c_0$ with $c_0$ being the velocity of light in free space, and $\epsilon_{r,1}$ and $\epsilon_{r,2}$ are the complex relative permittivities of the materials used. Using the above equations, values of $\beta/\beta_0=2.250646$ and $\alpha/\beta_0=0.836247 \, 10^{-2}$ are obtained for $\epsilon_{r,1}=4$ and $\epsilon_{r,2}=-19-j0.53$.

As the thickness of the film decreases, the phase and attenuation constants of the $a_b$ mode increase, becoming very large for very thin films. This is due to the fact that the fields of this mode penetrate progressively deeper into the metal as its thickness is reduced. In the case of the $s_b$ mode, a decreasing film thickness causes the opposite effect, that is, the fields penetrate progressively more into the top and bottom dielectric regions and less into the metal. The propagation constant of this mode thus tends asymptotically towards that of a TEM (Transverse ElectroMagnetic) wave propagating in an infinite medium having the same permittivity as the top and bottom dielectric regions. In this case, the attenuation constant decreases asymptotically towards zero since losses were neglected in these regions. The $a_b$ and $s_b$ modes do not have a cutoff thickness.

The fields in an infinitely wide structure do not exhibit any spatial variation along x. Due to the nature of the MoL, and to the fact that the generalized analytical solution is applied along the y dimension, our results do not contain discretization errors and thus are in perfect agreement with those reported in [6].

B. Modes Supported by a Metal Film of width w=1 μm

Next, we proceed with the analysis of the structure shown in FIG. 1 for the case w=1 μm. The material parameters and free-space wavelength that were used in the previous case (ω=∞) were also used here. The MoL was applied and the discretization adjusted until convergence of the propagation constant was observed. The physical quarter-symmetry of the structure was exploited by placing vertical and horizontal electric or magnetic walls along the y and x axes, respectively, which leads to four possible wall combinations as listed in Table 1. The first two purely bound (non-leaky) modes for each wall combination was found and their dispersion with metal thickness computed. The results for these eight modes are shown in FIG. 2. Table 1: Vertical-Horizontal wall combinations used along the axes of symmetry and proposed mode nomenclature: ew—electric wall, mw—magnetic wall.

| V-H Walls | Mode |
|---|---|
| ew-ew | $as^M_b$ |
| mw-ew | $ss^m_b$ |
| mw-mw | $sa^m_b$ |
| ew-mw | $aa^m_b$ |

Unlike its slab counterpart, pure TM modes are not supported by a metal film of finite width: all six field components are present in all modes. For a symmetric structure having an aspect ratio w/t>1, the Ey field component dominates. The $E_x$ field component increases in magnitude with increasing film thickness and if w/t<1, then $E_x$ dominates. Recently, a proposal was made to identify the modes supported by a metal film of finite width, by extending the nomenclature used for metal film slab waveguides [13]. First a pair of letters being a or s identify whether the main transverse electric field component is asymmetric or symmetric with respect to the y and x axes, respectively (in most practical structures w/t>>1 and $E_y$ is the main transverse electric field component). A superscript is then used to track the number of extrema observed in the spatial distribution of this field component along the largest dimension (usually along the x axis) between the corners. A second superscript n could be added to track the extrema along the other dimension (the y axis) if modes exhibiting them are found. Finally, a subscript b or l is used to identify whether the mode is bound or leaky. Leaky modes are known to exist in metal film slab structures and though we have not searched for them at this time, their existence is anticipated. Table 1 relates the proposed mode nomenclature to the corresponding vertical and horizontal wall combinations used along the axes of symmetry.

The $ss_b^0, sa_b^0, as_b^0$ and $aa_b^0$ modes are the first modes generated (one for each of the four possible quarter-symmetries listed in Table 1, and having the largest phase constant) and thus may be considered as the fundamental modes supported by the structure. FIGS. 3 to 6 show the field distributions of these modes over the cross-section of the waveguide for a metal film of thickness t=100 nm. As is observed from these figures, the main transverse electric field component is the $E_y$ component and the symmetries in the spatial distribution of this component are reflected in the mode nomenclature. The outline of the metal is clearly seen in the distribution of the $E_y$ component on all of these plots. As is observed from the figures, very little field tunnels through the metal to couple parallel edges for this case of film thickness and width (very little coupling through the metal between the top and bottom edges and between the left and right edges), though coupling does occur along all edges between adjacent corners (mostly along the left and right ones), and also between perpendicular edges through the corner.

FIG. 2 suggests that the dispersion curves for these first four modes converge with increasing film thickness toward the propagation constant of a plasmon-polariton mode supported by an isolated corner (though pairs of corners in this case remain weakly coupled along the top and bottom edges due to the finite width of the film, even if its thickness goes to infinity). If both the film thickness and width were to increase further, the four fundamental modes would approach degeneracy with their propagation constant tending towards that of a plasmon-polariton mode supported by an isolated corner, and their mode fields becoming more localized near the corners of the structure with maxima occurring at all four corners and fields decaying in an exponential-like manner in all directions away from the corners. This is further supported by considering the evolution of the field distributions given in FIGS. 3 to 6 as both the thickness and width increase.

As the thickness of the film decreases, coupling between the top and bottom edges increases and the four modes split into a pair as the upper branch (modes $sa_b^0$ and $aa_b^0$ which have a dominant $E_y$ field component exhibiting asymmetry with respect to the x axis) and a pair as the lower branch (modes $ss_b^0$ and $as_b^0$ which have a dominant $E_y$ field component exhibiting symmetry with respect to the x axis), as shown in FIG. 2. The pair on the upper branch remain approximately degenerate for all film thicknesses, though decreasing the film width would eventually break this degeneracy. The upper branch modes do not change in character as the film thickness decreases. Their field distributions remain essentially unchanged from those shown in FIGS. 4 and 6 with the exception that confinement to the metal region is increased thus causing an increase in their attenuation constant. This field behaviour is consistent with that of the $a_b$ mode supported by a metal film slab waveguide.

The modes on the lower branch begin to split at a film thickness of about 80 nm, as shown in FIG. 2. As the film thickness decreases further the $ss_b^0$ mode follows closely the phase and attenuation curves of the $s_b$ mode supported by the metal film slab waveguide. In addition to exhibiting dispersion, the lower branch modes change in character with decreasing thickness, their fields evolving from being concentrated near the corners, to having Gaussian-like distributions along the waveguide width. The $E_y$ field component of the $ss_b^0$ mode develops an extremum near the center of the top and bottom interfaces, while that of the $as_b^0$ mode develops two extrema, one on either side of the center. Since these modes change in character, they should be identified when the film is fairly thick.

Figure 2B:
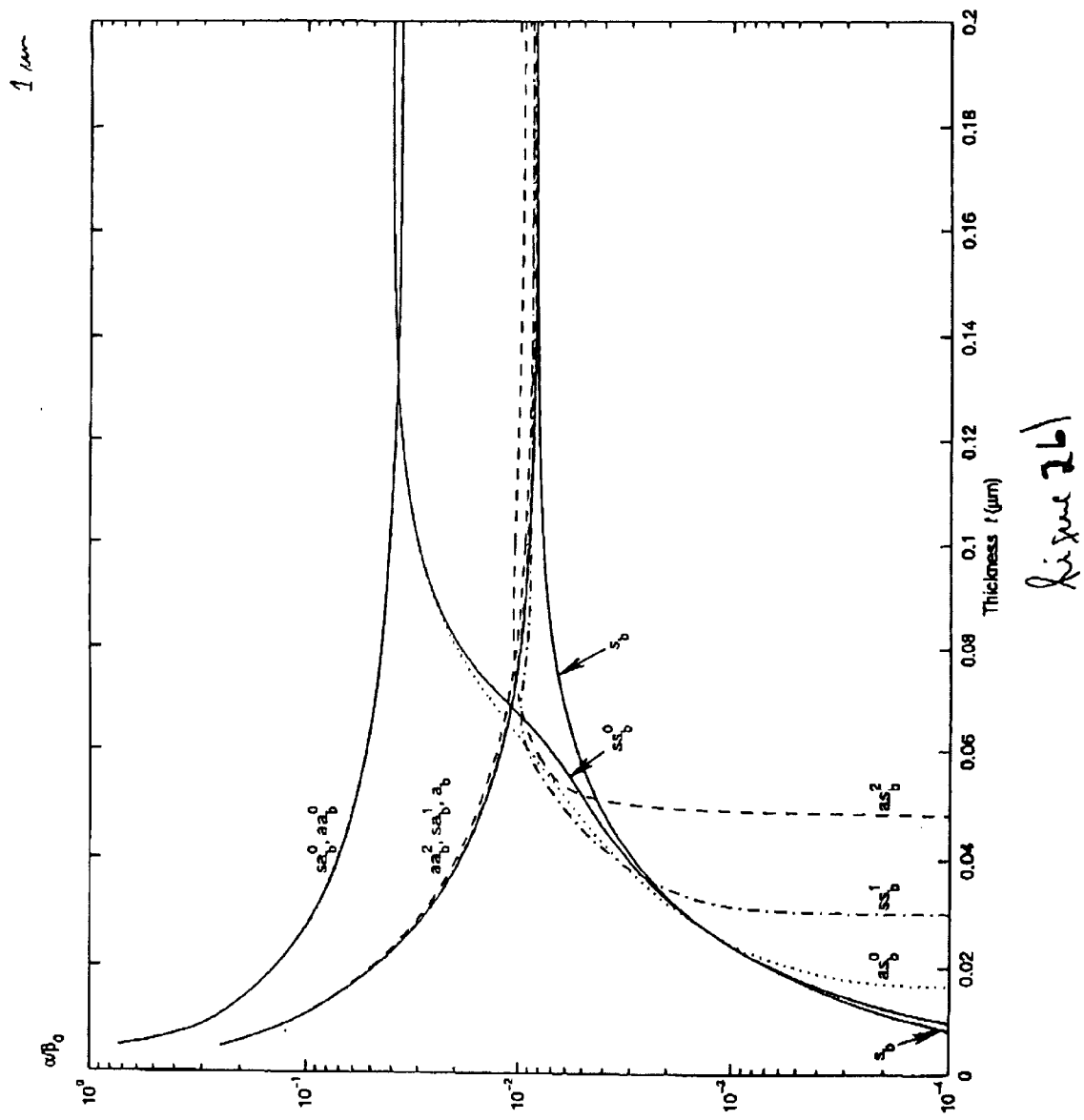
FIGS. 2(a) and (b) illustrate dispersion characteristics with thickness of the first eight modes supported by a metal film waveguide of width w=1 μm. The $a_b$ and $s_b$ modes supported for the case w=∞ are shown for comparison. (a) Normalized phase constant; (b) Normalized attenuation constant.
Figure 3:
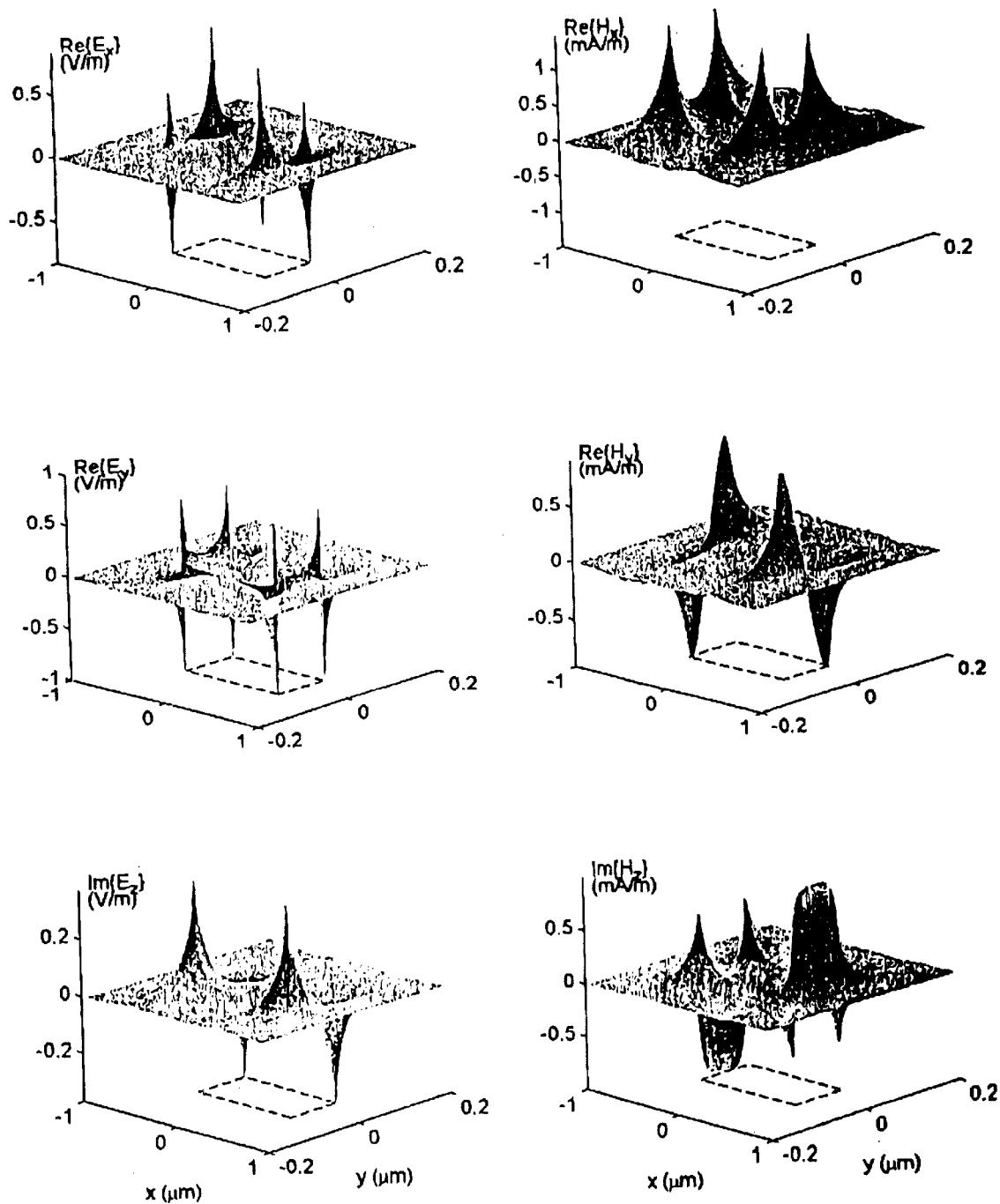
FIG. 3 illustrates the spatial distribution of the six field components related to the $ss_b^0$ mode supported by a metal film waveguide of thickness t=100 nm and width w=1 μm. The waveguide cross-section is located in the x-y plane and the metal is bounded by the region −0.5≦x≦0.5 μm and −0.05 ≦y≦0.05 μm, outlined as the rectangular dashed contour. The field distributions are normalized such that max $|Re\{E_y\}|=1$.
Figure 4:
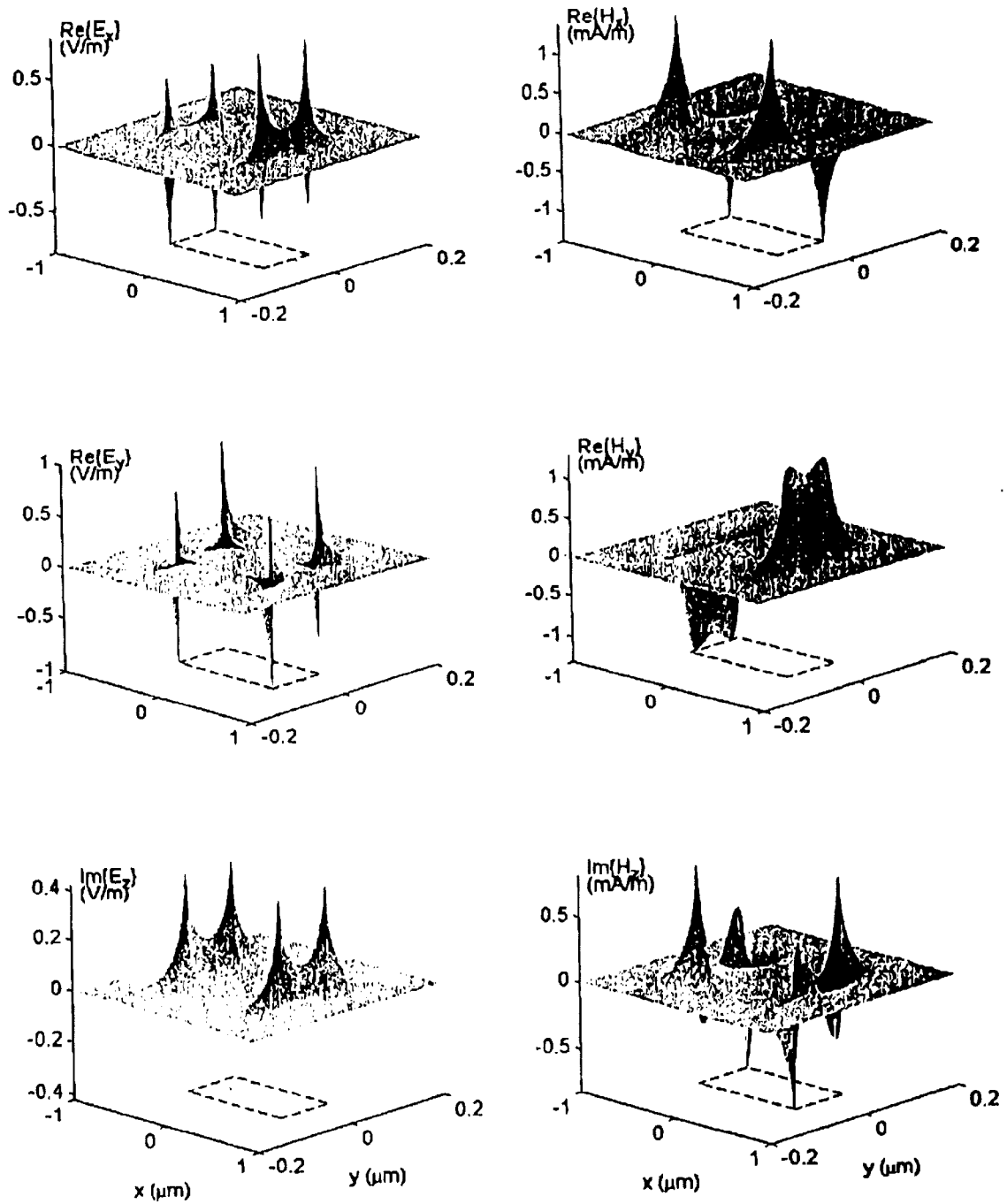
FIG. 4 illustrates the spatial distribution of the six field components related to the $sa_b^0$ mode supported by a metal film waveguide of thickness t=100 nm and width w=1 μm. The waveguide cross-section is located in the x-y plane and the metal is bounded by the region −0.5≦x≦0.5 μm and −0.05≦y≦0.05 μm, outlined as the rectangular dashed contour. The field distributions are normalized such that max $|Re\{E_y\}|=1$.
Figure 5:
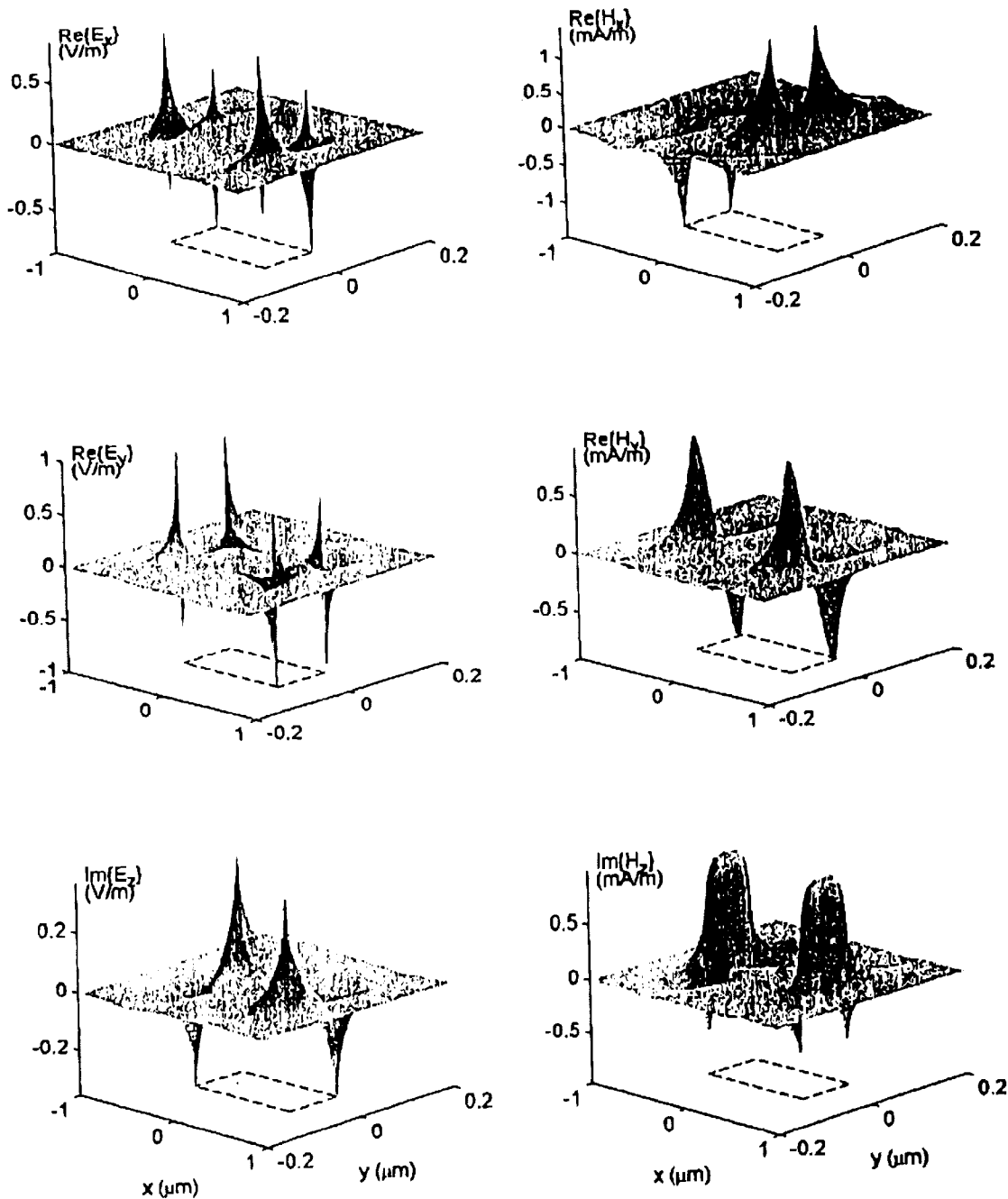
FIG. 5 illustrates the spatial distribution of the six field components related to the a $s_b^0$ mode supported by a metal film waveguide of thickness t=100 nm and width w=1 μm. The waveguide cross-section is located in the x-y plane and the metal is bounded by the region −0.5≦x≦0.5 μm and −0.05≦y≦0.05 μm, outlined as the rectangular dashed contour. The field distributions are normalized such that max $|Re\{Ey\}|=1$.
Figure 6:
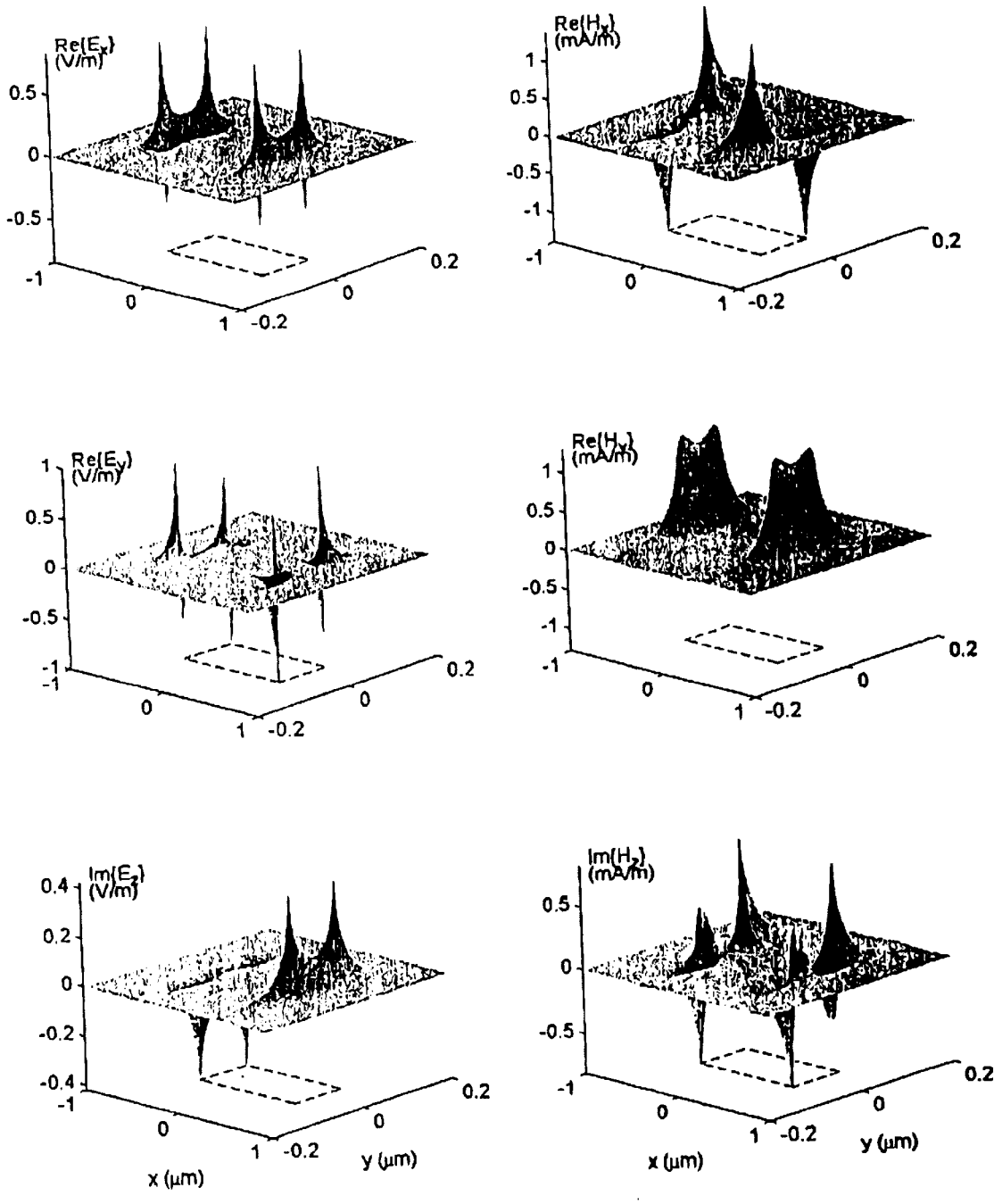
FIG. 6 illustrates the spatial distribution of the six field components related to the $aa_b^0 b$ mode supported by a metal film waveguide of thickness t=100 nm and width w=1 μm. The waveguide cross-section is located in the x-y plane and the metal is bounded by the region −0.5≦x≦0.5 μm and −0.05≦y≦0.05 μm, outlined as the rectangular dashed contour. The field distributions are normalized such that max $|Re\{E_y\}|=1$.
Figure 7:
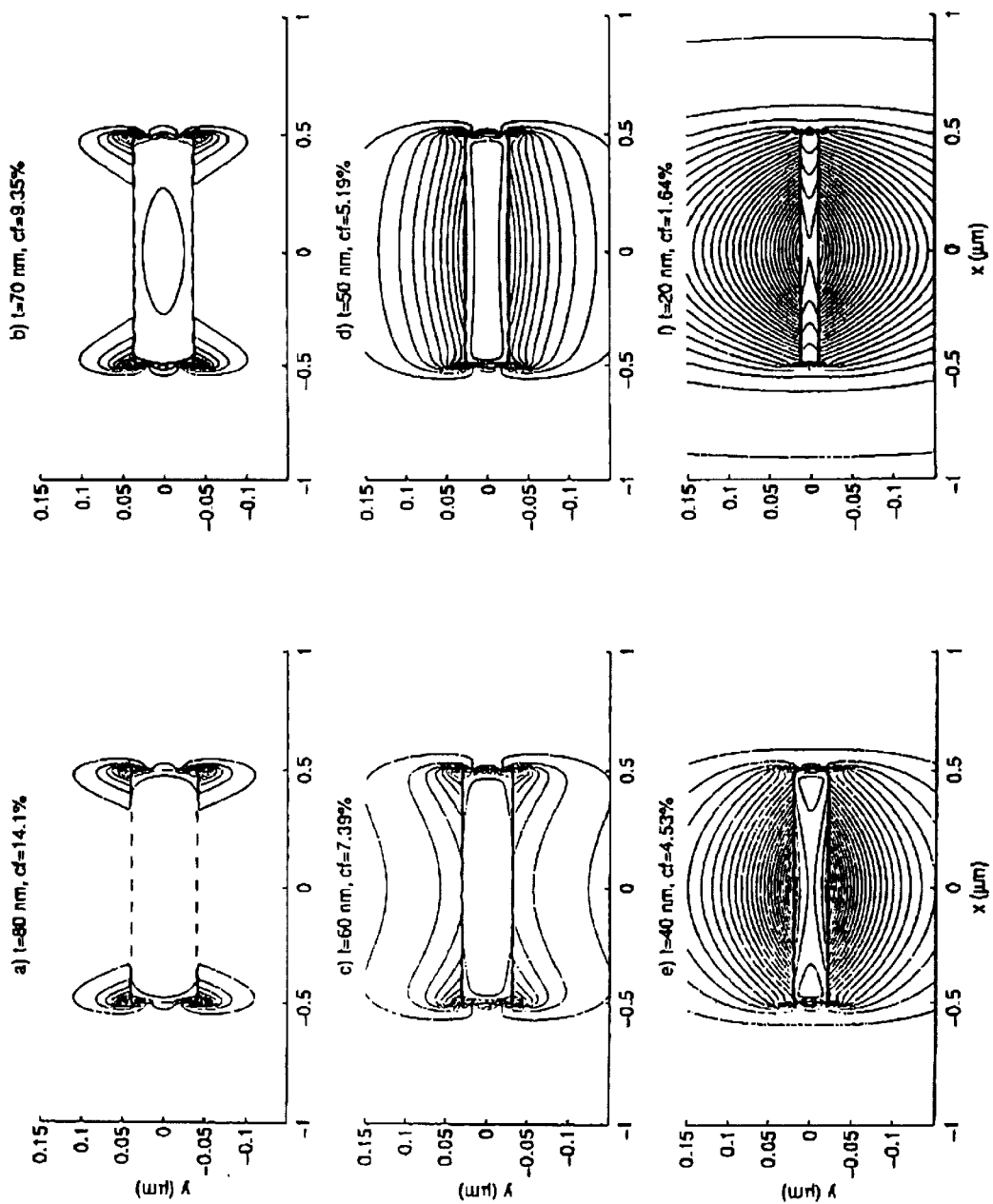
FIG. 7 is a contour plot of $Re\{S_z\}$ associated with the $ss_b^0$ mode for metal film waveguides of width w=1 μm and various thicknesses. The power confinement factor cf is also given in all cases, and is computed via equation (12) with the area of the waveguide core $A_c$ taken as the area of the metal region. In all cases, the outline of the metal film is shown as the rectangular dashed contour.

FIG. 7 shows the evolution of the $ss_b^0$ mode fields with film thickness via contour plots of $\text{Re}\{S_z\}$. $S_z$ is computed from the $ss_b^0$ mode fields using Equation 13 and corresponds to the complex power density carried by the mode. The power confinement factor cf is also given in the figure for all cases, and is computed via equation (12) with the area of the waveguide core $A_c$ taken as the area of the metal region. FIG. 7 clearly shows how the mode fields evolve from being confined to the corners of thick films to being distributed in a Gaussian-like manner laterally along the top and bottom edges, as the field coupling between these edges increases due to a reduction in film thickness. The confinement factor becomes smaller as the film thickness decreases, ranging from 14% confinement to 1.6% as the thickness goes from 80 nm to 20 nm. This implies that fields become less confined to the metal, spreading out not only along the vertical dimension but along the horizontal one as well, as is observed by comparing parts a) and f) of FIG. 7. This reduction in confinement to the lossy metal region, explains the reduction in the attenuation constant of the mode with decreasing film thickness, as shown in FIG. 2(b). An examination of all field components related to the $ss_b^0$ mode reveals that the magnitude of the weak transverse ($E_x$, $H_y$) and longitudinal ($E_z$, $H_z$) components decrease with decreasing film thickness implying that the mode is evolving towards a TEM mode comprised of the $E_y$ and $H_x$ field components. Indeed, the normalized propagation constant of the $ss_b^0$ mode tends asymptotically towards the value of the normalized propagation constant of a TEM wave propagating in the background material ($\in_{r,1}=4$ with no losses in this case), further supporting this fact. This field behaviour is also consistent with that of the $s_b$ mode supported by a metal film slab waveguide.

Figure 8:
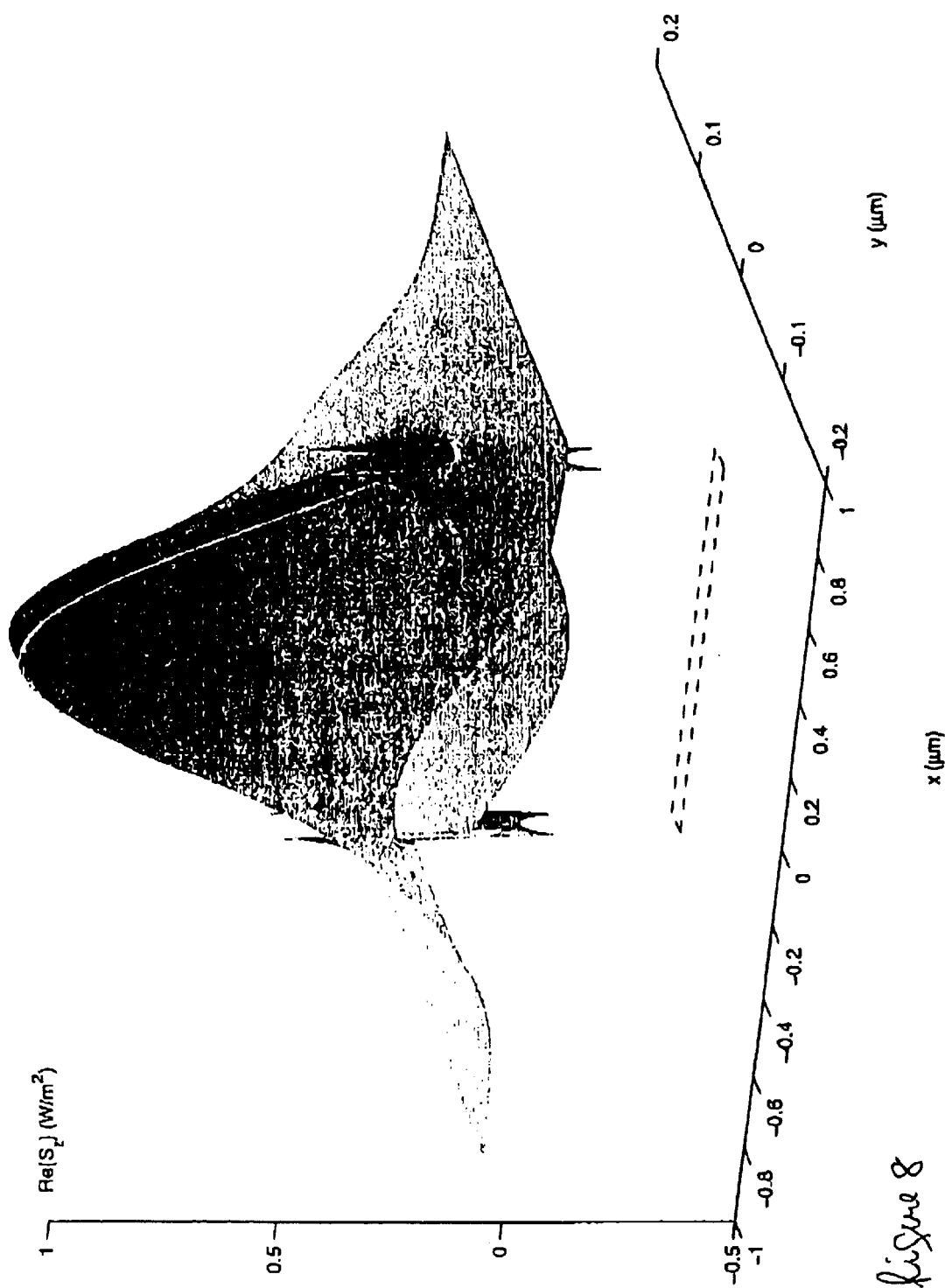
FIG. 8 illustrates a normalized profile of $Re\{S_z\}$ associated with the $ss_b^0$ mode for a metal film waveguide of width w=1 μm and thickness t=20 nm. The waveguide cross-section is located in the x-y plane and the metal film is bounded by the region −0.5≦x≦0.5 μm and −0.01≦y≦0.01 μm, outlined as the rectangular dashed contour.

FIG. 8 shows the profile of $\text{Re}\{S_z\}$ of the $ss_b^0$ mode over the cross-section of the guide for the case t=20 nm, providing a different perspective of the same information plotted as contours in FIG. 7(f). FIG. 8 shows that $\text{Re}\{S_z\}$ is negative in the metal film, implying that the mode real power is flowing in the direction opposite to the direction of mode propagation (or to the direction of phase velocity) in this region. It is clear however that the overall or net mode real power is flowing along the direction of propagation. It is likely that the net mode real power can be made to flow in the direction opposite to that of phase velocity (as in metal film slab waveguides [10] for values of $\in_{r,1}$ in the neighbourhood or greater than $|\text{Re}\{\in_{r,2}\}|$.

Figure 9:
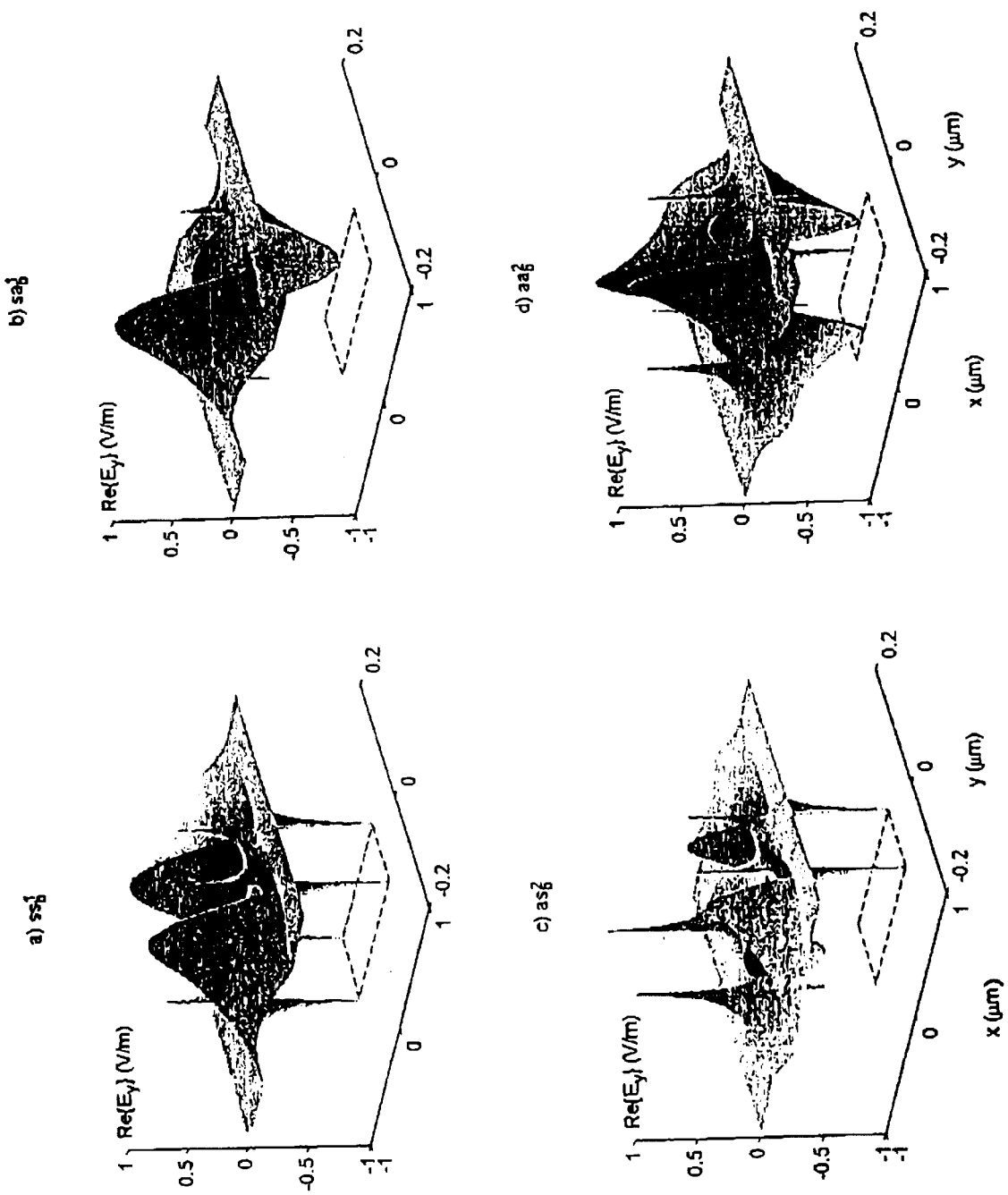
FIG. 9 illustrates the spatial distribution of the $E_y$ field component related to some higher order modes supported by a metal film waveguide of thickness t=100 nm and width w=1 μm, In all cases, the waveguide cross-section is located in the x-y plane and the metal film is bounded by the region −0.5≦x≦0.5 μm and −0.05≦y≦0.05 μm, outlined as the rectangular dashed contour.

Unlike the metal film slab waveguide, a metal film of finite width can support a number of higher order modes. The dispersion curves of the first four higher order modes (each generated from one of the symmetries listed in Table 1 are shown in FIG. 2, and the spatial distribution of their main transverse electric field component is shown in FIG. 9 for a film of thickness t=100 nm. As is observed from FIG. 9, the symmetries and number of extrema in the distributions of $\text{Re}\{E_y\}$ are reflected in the mode nomenclature. It should be noted that the nature of the nomenclature is such that all higher order modes $sa_b^m$ and $ss_b^m$ have an odd m while all higher order modes $aa_b^m$ and as have an even m. Comparing parts (a) through (d) of FIG. 9 with the $E_y$ field component of the corresponding m=0 mode in FIGS. 3 through 6 (ie: comparing the $E_y$ component of the $ss_b^1$ mode shown in FIG. 9(a) with the $E_y$ component of the $ss_b^0$ mode shown in FIG. 3, etc . . . ) reveals that the fields of a higher order mode are comprised of the fields of the corresponding m=0 mode with additional spatial oscillations or variations along the top and bottom edges of the structure due to the latter's limited width. Making this comparison for all of the field components of the higher order modes found reveals this fact to be true, except for the $H_y$ field component which remains in all cases essentially identical to that of the corresponding m=0 mode; ie: the $H_y$ field component never exhibits oscillations along the width of the structure.

The evolution of the $sa_b^1$ and $aa_b^2$ modes with film thickness is similar to the evolution of the $sa_b^0$ and $aa_b^0$ modes (and the $a_b$ mode supported by the metal film slab waveguide), in that their mode fields become more tightly confined to the metal as the thickness of the latter decreases, thereby causing an increase in the attenuation of the modes, as shown in FIG. 2(b). Furthermore, the $sa_b^1$ and $aa_b^2$ modes do not change in character with film thickness, their field distributions remaining essentially unchanged in appearance from those computed at a thickness of 100 nm.

The $ss_b^1$ and $as_b^1$ modes evolve with thickness in a manner similar to the corresponding m=0 modes (and the $s_b$ mode of the metal film slab waveguide) in the sense that their fields become less confined to the metal region as the thickness of the latter decreases, thereby reducing the attenuation of the modes as shown in FIG. 2(b). As the thickness of the film decreases, the $ss_b^1$ and $as_b^2$ modes change in character in a manner similar to the corresponding m=0 modes, their field components evolving extra variations along the top and bottom edges.

As the thickness of the film increases, the propagation constants of the $sa_b^1$ and $ss_b^1$ modes converge to a single complex value as shown in FIG. 2. This is the propagation constant of uncoupled higher order modes supported by the top and bottom edges of the film. A similar observation holds for the $aa_b^2$ and $as_b^2$ modes. The nature of these 'edge modes' is clear by considering the evolution with increasing film thickness of the distributions shown in FIG. 9. As the thickness of the film tends to infinity, the top edge becomes uncoupled from the bottom edge, forcing the $ss_b^1$ mode to become degenerate with the $sa_b^1$ mode since both have an $E_y$ field component that is symmetric with respect to the y axis and one extremum in its distribution along the top or bottom edge. A similar reasoning explains why the $as_b^2$ mode must become degenerate with the $ss_b^2$ mode. In general, it is expected that the higher order $sa_b^m$ and $ss_b^m$ mode families will form degenerate pairs for a given m, as will the higher order $as_b^m$ and $aa_b^m$ mode families, with increasing film thickness.

The $aa_b^m$ and $sa_b^m$ mode families do not have mode cutoff thicknesses. This is due to the fact that their confinement to the metal film increases with decreasing film thickness, thus the modes remain guided as t→0. The $as_b^m$ and $ss_b^m$ mode families have cutoff thicknesses for all modes except the $ss_b^0$ mode, which remains guided as t→0, since it evolves into the TEM mode supported by the background. The other modes of these families, including the $as_b^0$ mode cannot propagate as t→0 because their mode fields do not evolve into a TEM mode. Rather, the modes maintain extrema in their field distributions and such variations cannot be enforced by an infinite homogeneous medium. In general, the purely bound modes supported by a metal film of finite width appear to be formed from a coupling of modes supported by each metal-dielectric interface defining the structure. In a metal film of finite width, straight interfaces of finite length (top, bottom, left and right edges) and corner interfaces are present. Since a straight metal-dielectric interface of infinite length can support a bound plasmon-polariton mode then so should an isolated corner interface and a straight interface of finite length bounded by corners (say the edge defined by a metal of finite width having an infinite thickness). A preliminary analysis of an isolated corner has revealed that a plasmon-polariton mode is indeed supported and that the phase and attenuation constants of this mode are greater than those of the mode guided by the corresponding infinite straight interface, as given by Equations (14) and (15). This is due to the fact that fields penetrate more deeply into the metal near the corner, to couple neighbouring perpendicular edges. All six field components are present in such a mode, having their maximum value at the corner and decreasing in an exponential-like manner in all directions away from the corner. A straight interface of finite length bounded by corners should support a discrete spectrum of plasmon-polariton modes with the defining feature in the mode fields being the number of extrema in their spatial distribution along the edge. A mode supported by a metal film of finite width may therefore be seen as being comprised of coupled 'corner modes' and 'finite length edge modes'.

The $ss_b^0$ mode could be used for optical signal transmission over short distances. Its losses decrease with decreasing film thickness in a manner similar to the $s_b$ mode supported by the metal film slab waveguide. In a symmetric structure such as the one studied here, the $ss_b^0$ mode does not have a cut-off thickness thus losses could be made small enough to render it long-ranging, though a trade-off against confinement is necessary. In addition, when the metal is thin the $E_y$ field component of the mode has a maximum near the center of the metal-dielectric interfaces, with a symmetric profile similar to that shown in FIG. 8. This suggests that the mode should be excitable using a simple end-fire technique similar to the one employed to excite surface plasmon-polariton modes [19,6]; this technique is based on maximizing the overlap between the incident field and that of the mode to be excited.

IV. Mode Dispersion With Film Width

Since the modes supported by a metal film waveguide exhibit dispersion with film thickness, it is expected that they also exhibit dispersion with film width.

A. Modes Supported by a Metal Film of Width w=0.5 μm

We continue with the analysis of a metal film waveguide of width w=0.5 μm. The material parameters and free-space wavelength that were used in the previous section were also used here. A film width of 0.5 μm was selected in order to determine the impact of a narrowing film on the modes supported and to demonstrate that the structure can still function as a waveguide though the free-space optical wavelength is greater than both the width and thickness of the film.

As in the previous section, the first eight modes supported by the structure (two for each symmetry listed in Table 1 were sought, but in this case only six modes were found. The dispersion curves with thickness of the modes found are plotted in FIG. 10. The observations made in the previous section regarding the general behaviour of the modes hold for other film widths, including this one.

The $aa_b^2$ and $as_b^2$ modes, which were the highest order modes found for a film of width w=1 μm, were not found in this case suggesting that the higher order modes (m>0) in general have a cut-off width. By comparing FIGS. 10(a) with 2(a), it is apparent that decreasing the film width causes a decrease in the phase constant of the $ss_b^1$ and $sa_b^1$ modes, further supporting the existence of a cut-off width for these modes.

Figure 10:
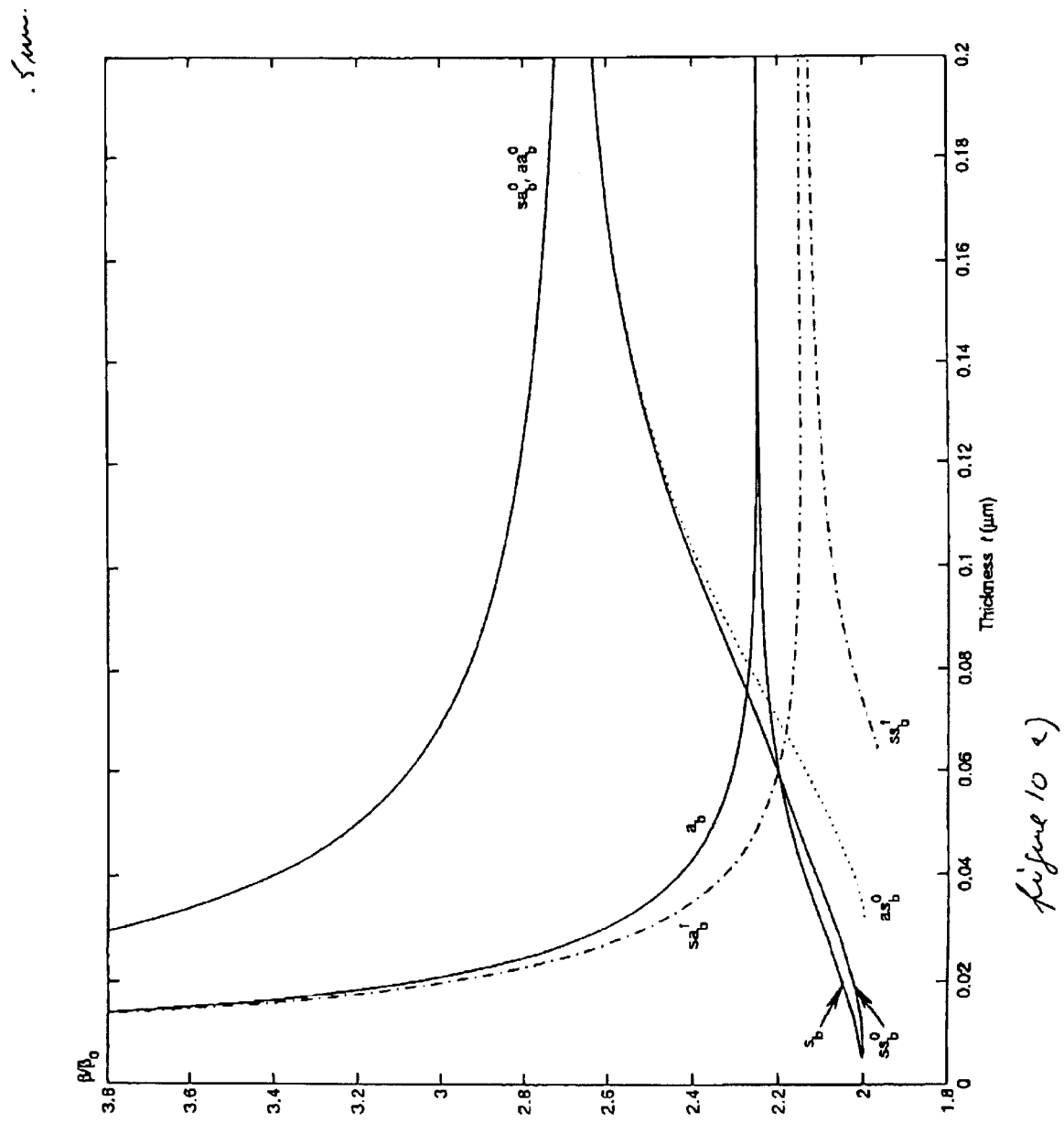
FIGS. 10(a) and (b) illustrate dispersion characteristics with thickness of the first six modes supported by a metal film waveguide of width w=0.5 μm. The $a_b$ and $s_b$ modes supported for the case w=∞ are shown for comparison. (a) Normalized phase constant; (b) Normalized attenuation constant.
Figure 12:
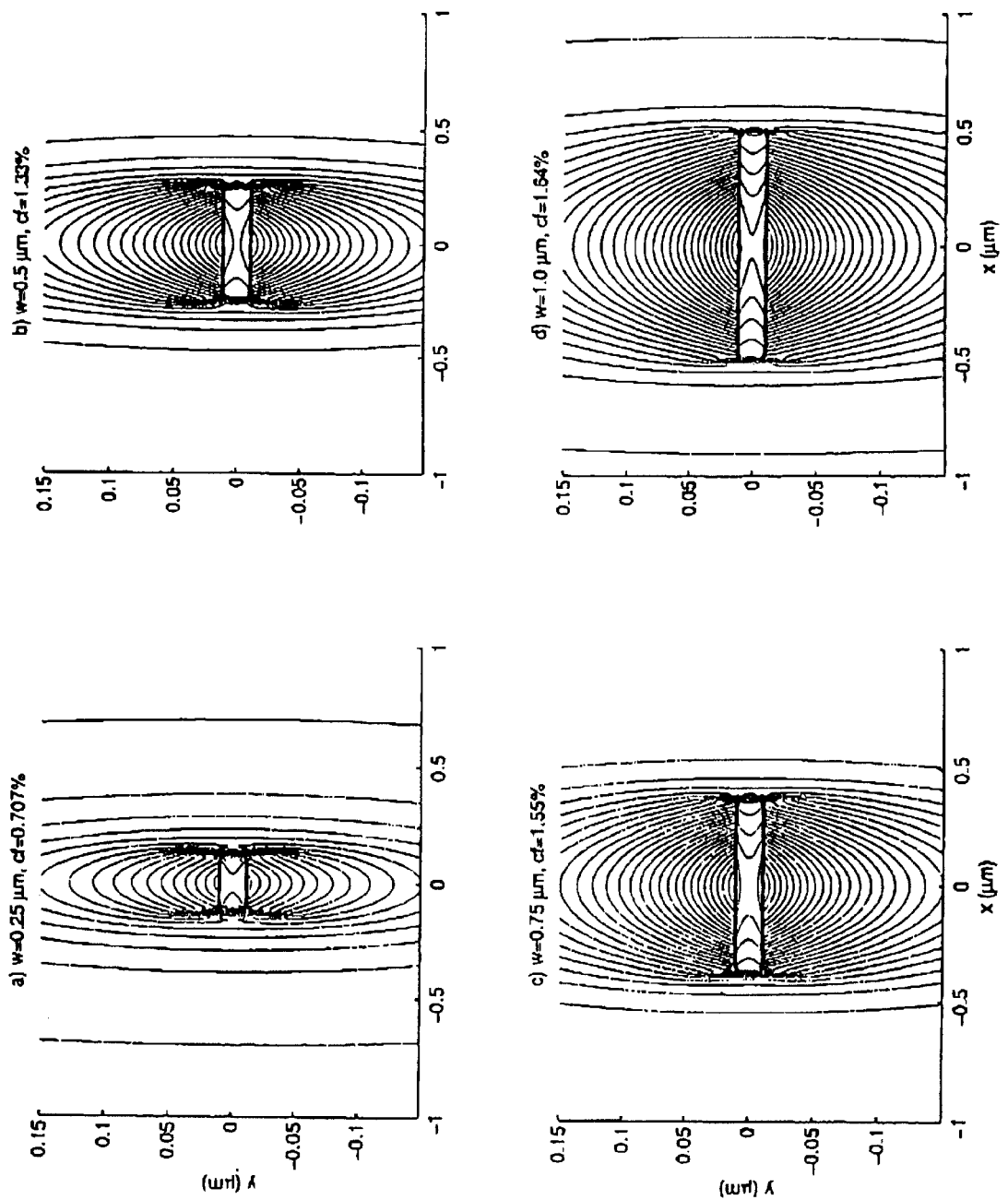
FIG. 12 illustrates a contour plot of $Re\{S_z\}$ associated with the $ss_b^0$ mode for metal film waveguides of thickness t=20 nm and various widths. The power confinement factor cf is also given in all cases, and is computed via equation (12) with the area of the waveguide core $A_c$ taken as the area of the metal region. In all cases, the outline of the metal film is shown as the rectangular dashed contour.

By comparing FIGS. 10 and 12, it is noted that the modes which do exhibit cutoff thicknesses (the $ss_b^m$ modes with m>0 and the $as_b^m$ modes with m≧0), exhibit them at a larger thickness for a narrower film width. This makes it possible to design a waveguide supporting only one long-ranging mode (the $ss_b^0$ mode) by carefully selecting the film width and thickness.

B. Dispersion of the $ss_b^0$ Mode with Film Width

Figure 11A:
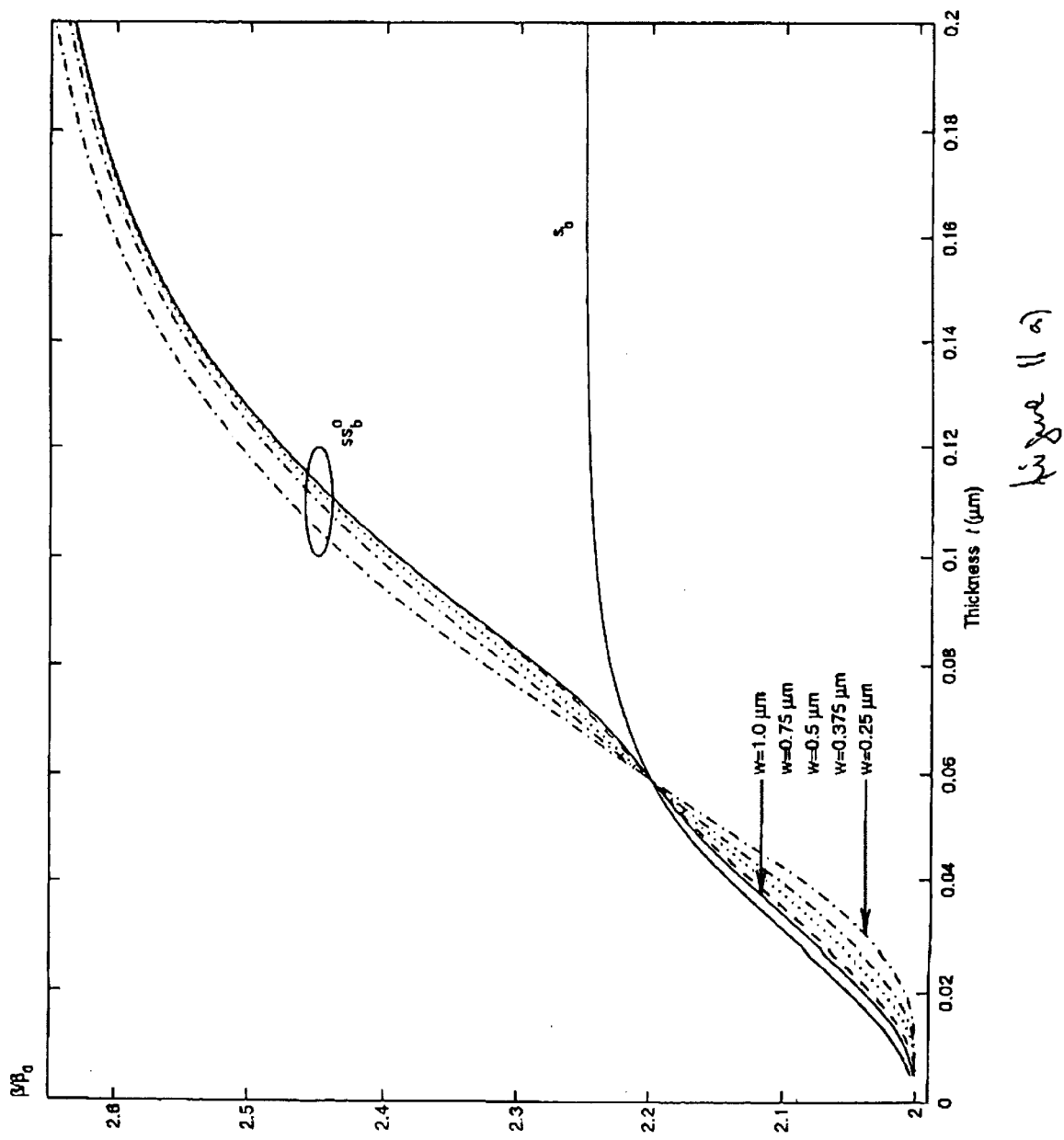
FIGS. 11(a) and (b) illustrate dispersion characteristics with thickness of the $ss_b^0$ mode supported by metal film waveguides of various widths. The $s_b$ mode supported for the case w=∞ is shown for comparison. (a) Normalized phase constant; (b) Normalized attenuation constant.
Figure 11:
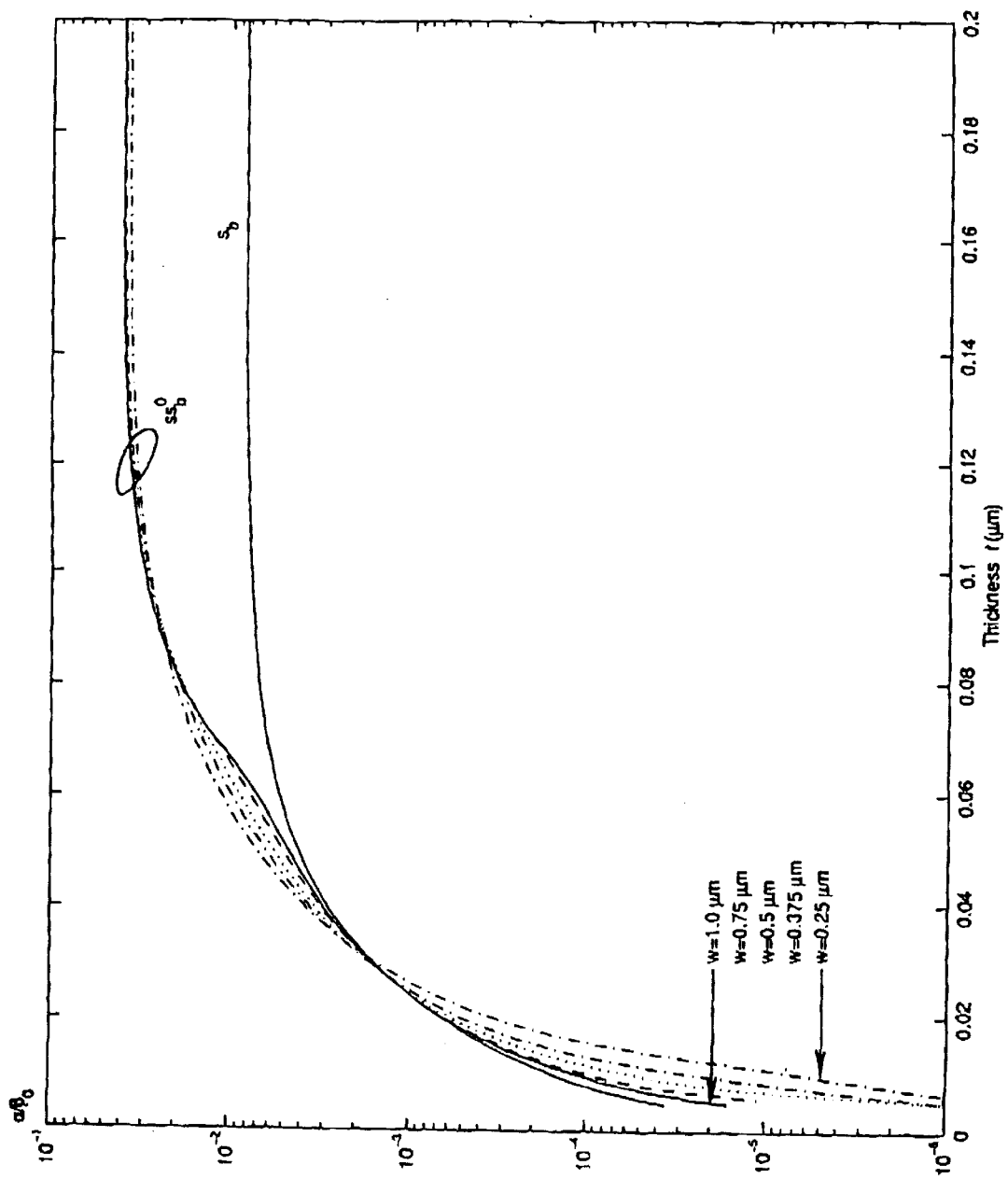

The dispersion with thickness of the $ss_b^0$ mode is shown in FIG. 11 for numerous film widths in the range $0.25 \leq w \leq 1$ µm, illustrating the amount of dispersion in the mode properties that can be expected due to a varying film width. In all cases the $ss_b^0$ mode evolves with decreasing film thickness into the TEM wave supported by the background but this evolution occurs more rapidly for a narrower width. For a film of thickness t=20 nm for example, from FIG. 11(a), the normalized phase constant of the mode supported by a film of width w=1 µm is about 2.05 while that of the mode supported by a film of width w=0.25 µm is already about 2. This fact is also supported by the results plotted in FIG. 11(b) since the attenuation constant of the mode at a thickness of t=20 nm is closer to zero (the attenuation constant of the background) for narrow film widths compared to wider ones. Indeed, at a thickness of 10 nm, the attenuation of the mode for a width of w=0.25 µm is more than an order of magnitude less than its attenuation at a width of w=1 µm (and more than an order of magnitude less than that of the $s_b$ mode supported by a metal film slab waveguide), indicating that this mode can be made even more long-ranging by reducing both the film thickness and its width.

The dispersion of the mode with increasing film thickness also changes as a function of film width, as seen from FIG. 11(a). This is due to the fact that the amount of coupling between corners along the top and bottom edges increases as the film narrows, implying that the mode does not evolve with increasing thickness towards a plasmon-polariton mode supported by an isolated corner but rather towards a plasmon-polariton mode supported by the pair of corners coupled via these edges.

FIG. 12 shows contour plots of $Re\{S_z\}$ related to the $ss_b^0$ mode supported by films of thickness t=20 nm and various widths. The power confinement factor is also given for all cases, with the area of the waveguide core $A_c$ taken as the area of the metal region. This figure clearly illustrates how the fields become less confined to the lossy metal as its width decreases, explaining the reduction in attenuation shown in FIG. 11(b) at this thickness. In addition, the confinement factor ranges from 1.64% to 0.707% for the widths considered, further corroborating this fact. The fields are also seen to spread out farther, not only along the horizontal dimension but along the vertical one as well, as the film narrows. This indicates that the mode supported by a narrow film is farther along in its evolution into the TEM mode supported by the background, compared to a wider film of the same thickness. It is also clear from this figure that the trade-off between mode confinement and attenuation must be made by considering not only the film thickness but its width as well.

V. Effects Caused by Varying the Background Permittivity

The changes in the propagation characteristics of the $ss_b^0$ mode due to variations in the background permittivity of the waveguide are investigated in this section. Only the $ss_b^0$ mode is considered since the main effects are in general applicable to all modes. In order to isolate the effects caused by varying the background permittivity, the width of the metal film was fixed to w=0.5 µm and its permittivity as well as the optical free-space wavelength of analysis were set to the values used in the previous sections. The relative permittivity of the background $\in_{r,1}$ is taken as the variable parameter.

Figure 13:
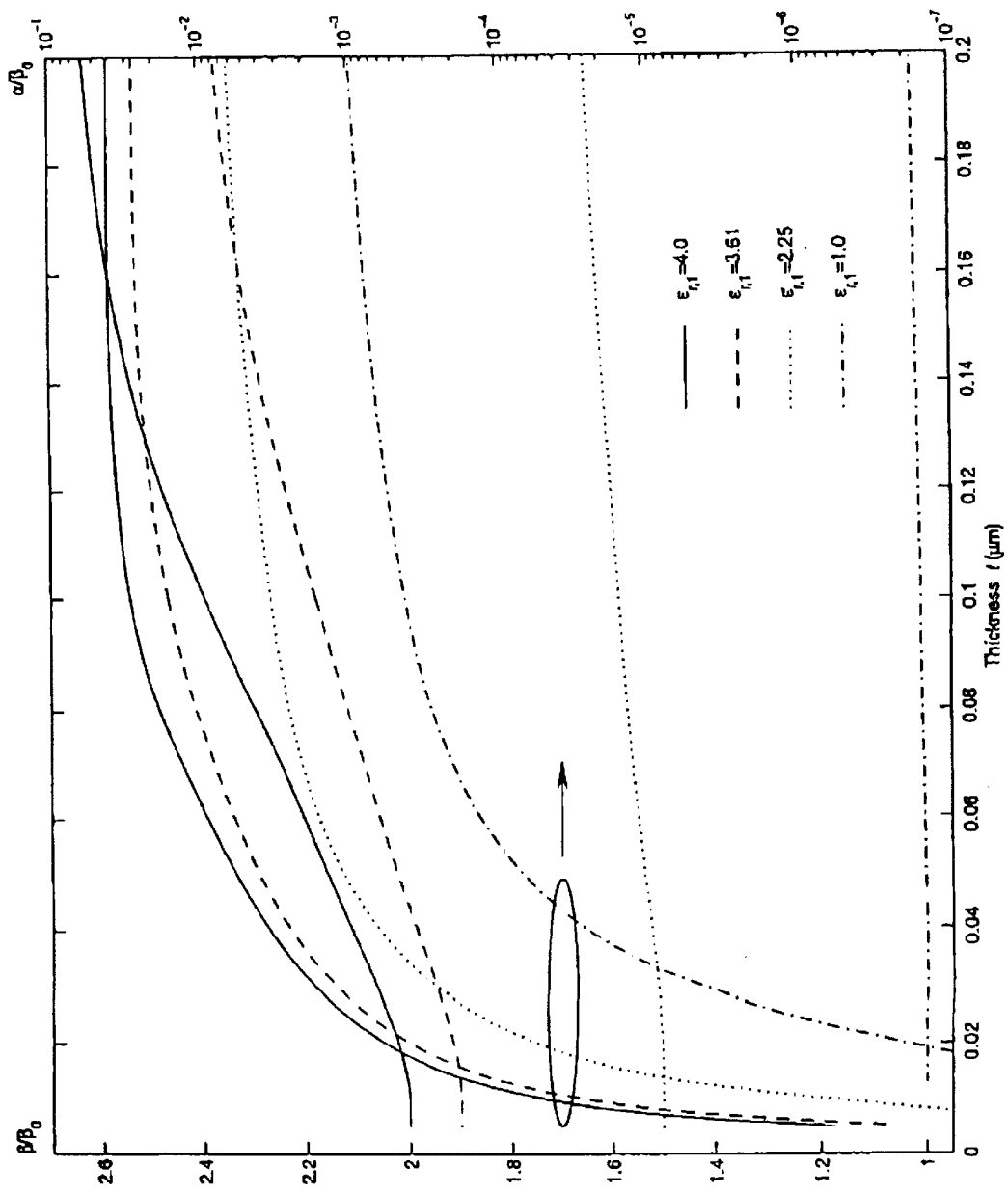
FIG. 13 illustrates dispersion characteristics with thickness of the $ss_b^0$ mode supported by a metal film waveguide of width w=0.5 μm for various background permittivities $\in_{r,1}$. The normalized phase constant is plotted on the left axis and the normalized attenuation constant is plotted on the right one.
Figure 14:
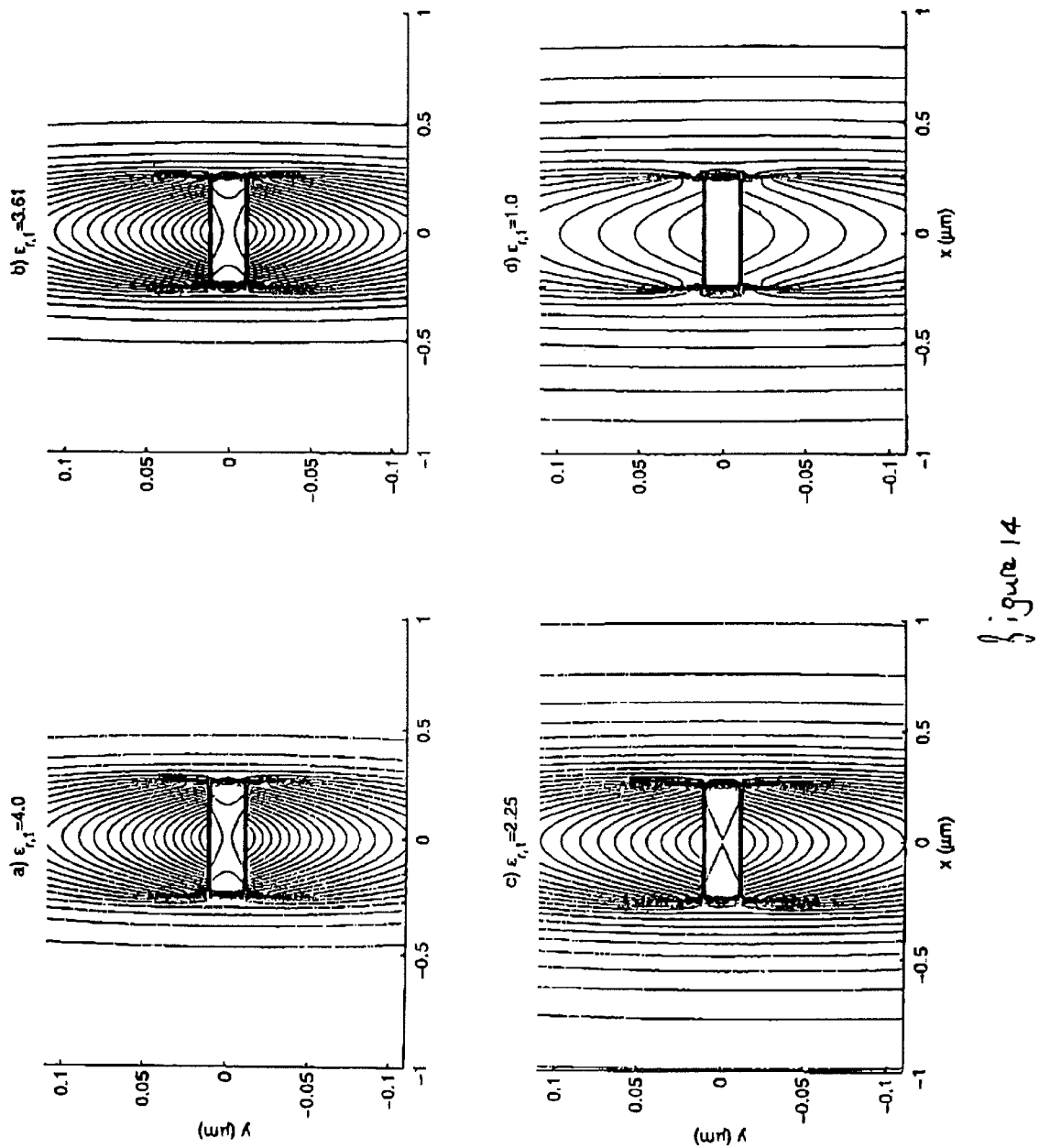
FIG. 14 illustrates a contour plot of $Re\{Sz\}$ associated with the $ss_b^0$ mode for a metal film waveguide of width w=0.5 μm and thickness t=20 nm for various background permittivities $\in_{r,1}$. In all cases, the outline of the metal film is shown as the rectangular dashed contour.

The dispersion with thickness of the $ss_b^0$ mode is shown in FIG. 13 for some background permittivities in the range $1 \leq \in_{r,1} \leq 4$. FIG. 14 compares contour plots of $Re\{S_z\}$ related to this mode for a film of thickness t=20 nm and for the same set of background permittivities used to generate the curves plotted in FIG. 13. From FIG. 14, it is observed that reducing the value of the background permittivity causes a reduction in field confinement to the metal. This reduction in field confinement within the lossy metal in turn causes a reduction in the attenuation of the mode that can be quite significant, FIG. 13 showing a reduction of almost four orders of magnitude at a film thickness of t=20 nm, as the background relative permittivity ranges from $\in_{r,1}=4$ to 1. It is also noted that the mode exhibits less dispersion with thickness as the background relative permittivity is reduced, since the normalized phase constant curves shown in FIG. 13 flatten out with a reduction in the value of this parameter.

From FIG. 14, it is seen that the mode power is confined to within approximately one free-space wavelength in all directions away from the film in all cases except (d), where fields are significant up to about two free-space wavelengths. In FIG. 14(c), the background permittivity is roughly that of glass and from FIG. 13 the corresponding normalized attenuation constant of the mode is about $\alpha/\beta_0 = 6.0 \times 10^{-5}$. The associated mode power attenuation in dB/mm, computed using the following formula:

$$Att = \alpha \times \frac{20}{1000} \log_{10}(e) \tag{16}$$

is about 5 dB/mm. This value of attenuation is low enough and field confinement is high enough as shown in FIG. 14(c) to render this particular structure practical at this free-space wavelength for applications requiring short propagation lengths.

The changes in mode properties caused by varying the background permittivity as discussed above are consistent with the changes observed for the modes supported by a metal film slab waveguide and the observations are in general applicable to the other modes supported by a metal film of finite width. In the case of the higher order modes (m>0) and those exhibiting a cutoff thickness (the $as_b^m$ modes for all m and the $ss_b^m$ modes for m>0) additional changes in the mode properties occur. In particular, as the background permittivity is reduced, the cut-off width of the higher order modes increase as do all relevant cut-off thicknesses.

VI. Frequency Dependence of the $ss_b^0$ Mode Solutions

In order to isolate the frequency dependence of the $ss_b^0$ mode solutions, the geometry of the metal film was held constant and the background relative permittivity was set to $\in_{r,1}=4$. The relative permittivity of the metal film $\in_{r,2}$ was assumed to vary with the frequency of excitation according to Equation (1). In order to remain consistent with [6], the values $\omega_p=1.29 \times 10^{16}$ rad/s and $1/v=\tau=1.25 \times 10^{-14}$s were adopted though the latter do not generate exactly $\in_{r,2}=-19-j0.53$ at $\lambda_0=0.633$ µm, which is the value used in the previous sections. This is due to the fact that values of $\omega_p$ and $\tau$ are often deduced by fitting Equation (1) to measurements. The values used however are in good agreement with recent measurements made for silver [3] and are expected to generate frequency dependant results that are realistic and experimentally verifiable.

Figure 15A:
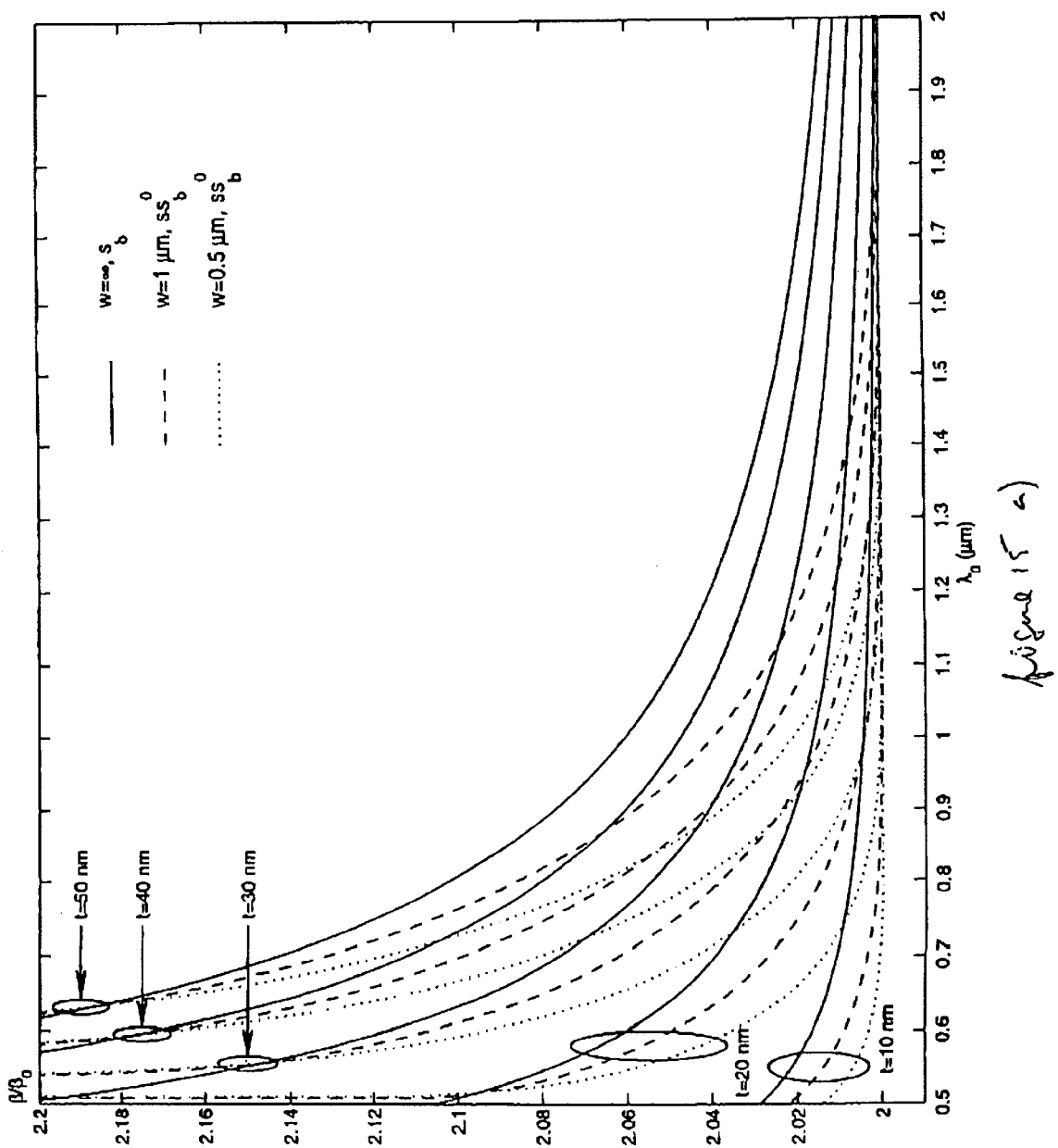
FIGS. 15(a) and (b) illustrate dispersion characteristics with frequency of the $ss_b^0$ mode supported by metal film waveguides of width w=0.5 μm and w=1 μm and various thicknesses t. The $s_b$ mode supported for the case w=∞ and the thicknesses considered is shown for comparison. (a) Normalized phase constant. (b) Mode power attenuation computed using Equation (16) and scaled to dB/cm.
Figure 15:
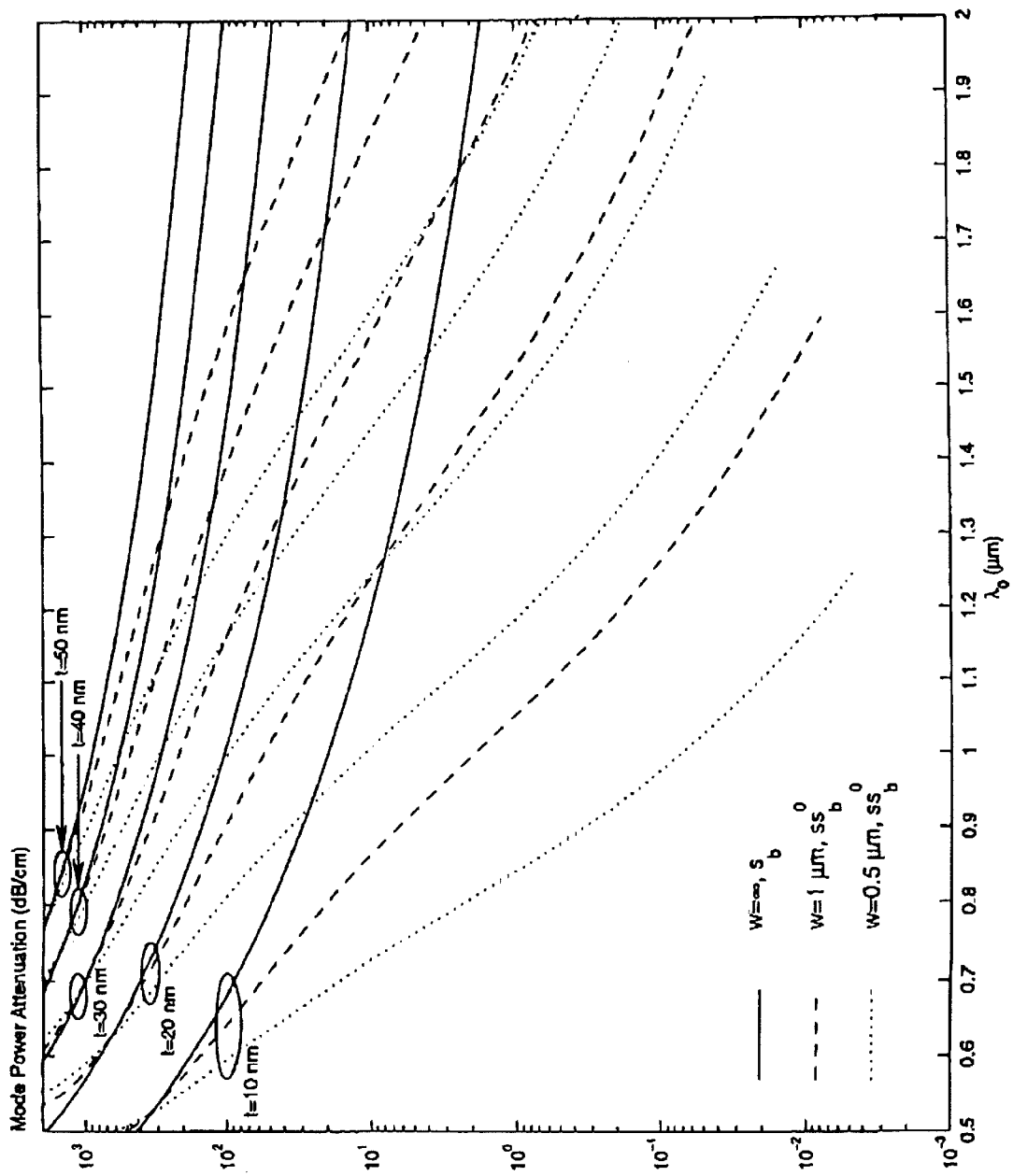

The dispersion characteristics of the $ss_b^0$ mode supported by films of width w=0.5 µm and w=1 µm, and thicknesses in the range $10 \leq t \leq 50$ nm are shown in FIG. 15 for frequencies covering the free-space wavelength range $0.5 \leq \lambda_0 \leq 2$ µm. Curves for the $s_b$ mode supported by metal film slab waveguides (w=∞) of the same thicknesses are also shown for comparison.

The results given in FIG. 15(a) show in all cases that the normalized phase constant of the modes tend asymptotically towards that of the TEM wave supported by the background as the wavelength increases, and that the convergence to this value is steeper as the width of the film decreases (for a given thickness). The curves remain essentially unchanged in character as the thickness changes but they shift upwards toward the top left of the graph with increasing thickness, as shown. Convergence to the asymptote value with increasing wavelength suggests that the $ss_b^0$ mode evolves into the TEM mode supported by the background. It is noteworthy that the $ss_b^0$ mode can exhibit very little dispersion over a wide bandwidth, depending on the thickness and width of the film, though flat dispersion is also associated with low field confinement to the metal film.

The results plotted in FIG. 15(b) show in all cases a decreasing attenuation with increasing wavelength and the curves show a sharper drop for a narrow film (w=0.5 μm compared to a wide one (w=∞). The attenuation curves look essentially the same for all of the film thicknesses considered, though the range of attenuation values shifts downwards on the graph with decreasing film thickness.

Figure 16:
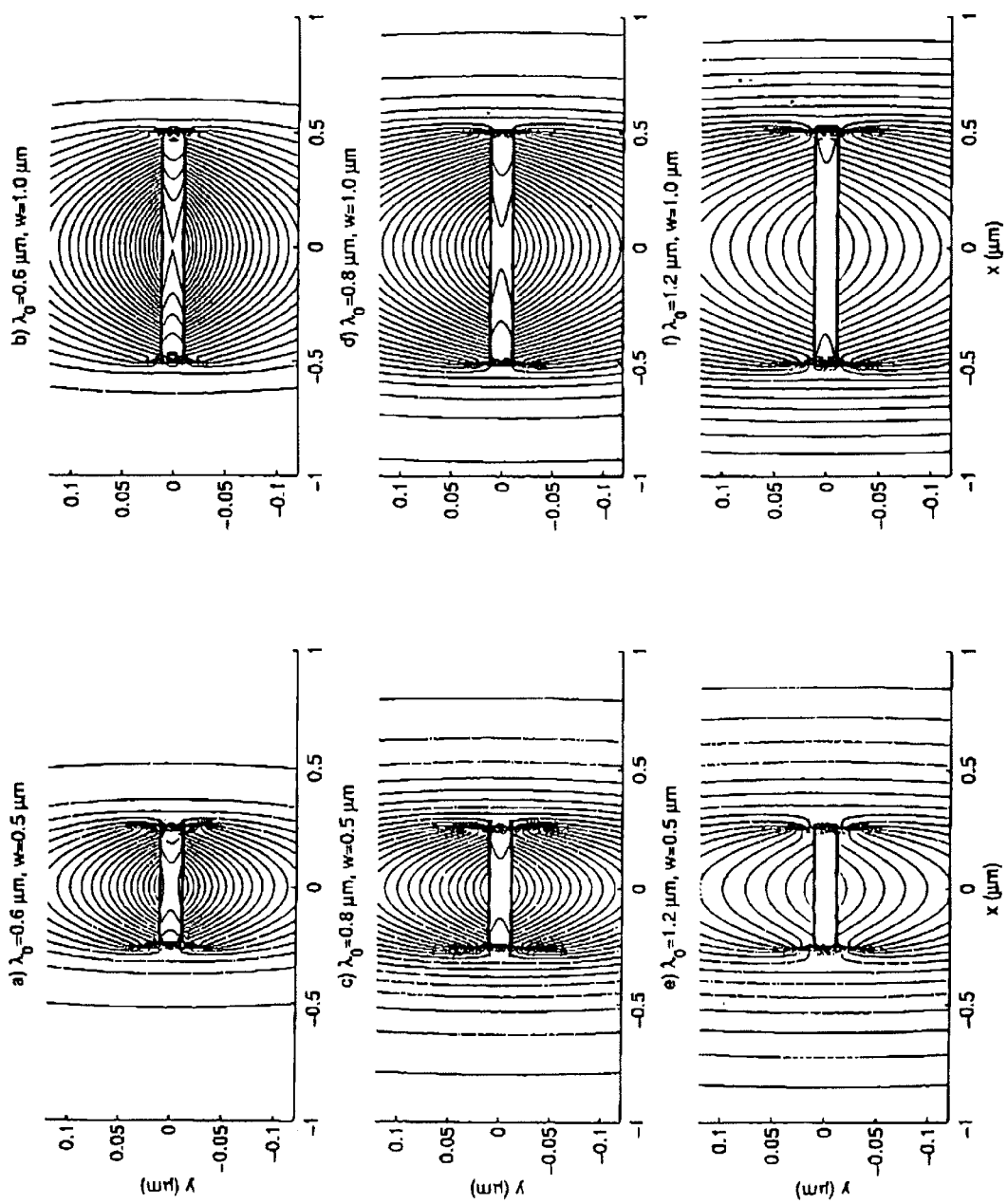
FIG. 16 illustrates a contour plot of $Re\{S_z\}$ associated with the $ss_b^0$ mode for metal film waveguides of width w=0.5 μm and w=1 μm, and thickness t=20 nm at various free-space wavelengths of excitation $\lambda_0$. In all cases, the outline of the metal film is shown as the rectangular dashed contour.

FIG. 16 gives contour plots of $Re\{S_z\}$ related to the $ss_b^0$ mode for films of thickness t=20 nm and widths w=0.5 μm and w=1 μm, for three free-space wavelengths of operation: $\lambda_0$=0.6, 0.8 and 1.2 μm. Comparing the contours shown in FIG. 16, explains in part the frequency dependant behaviour plotted in FIG. 15. FIG. 16 shows that the mode power contours spread out farther from the film as the wavelength increases, which means that the mode confinement to the metal region decreases explaining in part the decrease in losses and the evolution of the mode towards the TEM mode of the background as shown in FIG. 15. This behaviour is more pronounced for the waveguide of width w=0 μm compared to the wider one of width w=1.0 μm.

There are two mechanisms causing changes in the $ss_b^0$ mode as the frequency of operation varies. The first is geometrical dispersion, which changes the optical or apparent size of the film, and the second is material dispersion, which is modeled for the metal region using Equation (1). If no material dispersion is present, then the geometrical dispersion renders the film optically smaller as the free-space wavelength is increased (an effect similar to reducing t and w) so in the case of the $ss_b^0$ mode, confinement to the film is reduced and the mode spreads out in all directions away from the latter. Now based on Equation (1), it is clear that the magnitude of the real part of the film's permittivity $|Re\{\epsilon_{r,2}\}|$ varies approximately in a $1/\omega^2$ or $\lambda_0^2$ fashion while the magnitude of its imaginary part $|Im\{\epsilon_{r,2}\}|$ varies approximately in a $1/\omega^3$ or $\lambda_0^3$ fashion. However, an increase in $|Re\{\epsilon_{r,2}\}|$ reduces the penetration depth of the mode fields into the metal region and combined with the geometrical dispersion causes a net decrease in mode attenuation with increasing wavelength even though the losses in the film increase in a $\lambda_0^3$ fashion.

FIG. 15(b) shows that mode power attenuation values in the range 10 to 0.1 dB/cm are possible near communications wavelengths ($\lambda_0$~1.51 μm) using structures of reasonable dimensions: w~1.0 μm and t~15 nm. Such values of attenuation are low enough to consider the $ss_b^0$ mode as being long-ranging, suggesting that these waveguides are practical for applications requiring propagation over short distances. As shown in the previous section, even lower attenuation values are possible if the background permittivity is lowered. From parts (e) and (f) of FIG. 16, (case $\lambda_0$=1.2 μm, which is near communications wavelengths), it is apparent that the mode power confinement is within one free-space wavelength of the film, which should be tight enough to keep the mode bound to the structure if a reasonable quality metal film of the right geometry can be constructed, VII. Conclusion The purely bound optical modes supported by a thin lossy metal film of finite width, embedded in an infinite homogeneous dielectric have been characterized and described. The modes supported by the structure are divided into four families depending on the symmetry of their mode fields and none of the modes are TM in nature (as they are in the metal film slab waveguide). In addition to the four fundamental modes that exist, numerous higher order modes are supported as well. A proposed mode nomenclature suitable for identifying them has been discussed. The dispersion of the modes with film thickness has been assessed and the behaviour in general terms found to be consistent with that of the purely bound modes supported by the metal film slab waveguide. In addition, it has been found that one of the fundamental modes and some higher order modes have cut-off thicknesses. Mode dispersion with film width has also been investigated and it has been determined that the higher order modes have a cut-off width, below which they are no longer propagated. The effect of varying the background permittivity on the modes has been investigated as well, and the general behaviour found to be consistent with that of the modes supported by a metal film slab waveguide. In addition it was determined that the cut-off width of the higher order modes decreases with decreasing background permittivity and that all cut-off thicknesses are increased.

One of the fundamental modes supported by the structure, the $ss_b^0$ mode exhibits very interesting characteristics and is potentially quite useful. This mode evolves with decreasing film thickness towards the TEM wave supported by the background, (an evolution similar to that exhibited by the $s_b$ mode in metal film slab waveguides), its losses and phase constant tending asymptotically towards those of the TEM wave. In addition, it has been found that decreasing the film width can reduce the losses well below those of the $s_b$ mode supported by the corresponding metal film slab waveguide. Reducing the background permittivity further reduces the losses. However, a reduction in losses is always accompanied by a reduction in field confinement to the waveguide core which means that both of these parameters must be traded-off one against the other. Furthermore, carefully selecting the film's thickness and width can make the $ss_b^0$ mode the only long-ranging mode supported. It has also been demonstrated that mode power attenuation values in the range of 10 to 0.1 dB/cm are achievable at optical communications wavelengths with even lower values possible. Finally, the mode evolved into its most useful form, has a field distribution that renders it excitable using end-fire techniques.

The existence of the $ss_b^0$ mode as well as its interesting characteristics makes the finite-width metal film waveguide attractive for applications requiring short propagation distances. The waveguide offers 2-D field confinement in the transverse plane rendering it useful as the basis of an integrated optics technology. Interconnects, power splitters, power couplers and interferometers could be built using the guides. Finally the structures being quite simple should be inexpensive to fabricate. The foregoing theoretical discussion has been published by the inventor in reference [20].

OTHER EMBODIMENTS AND EXAMPLES OF APPLICATION

Examples of practical waveguide structures and integrated optics devices which can be implemented using the invention will now be described with reference also to FIGS. 17 to 33.

Figure 1B:
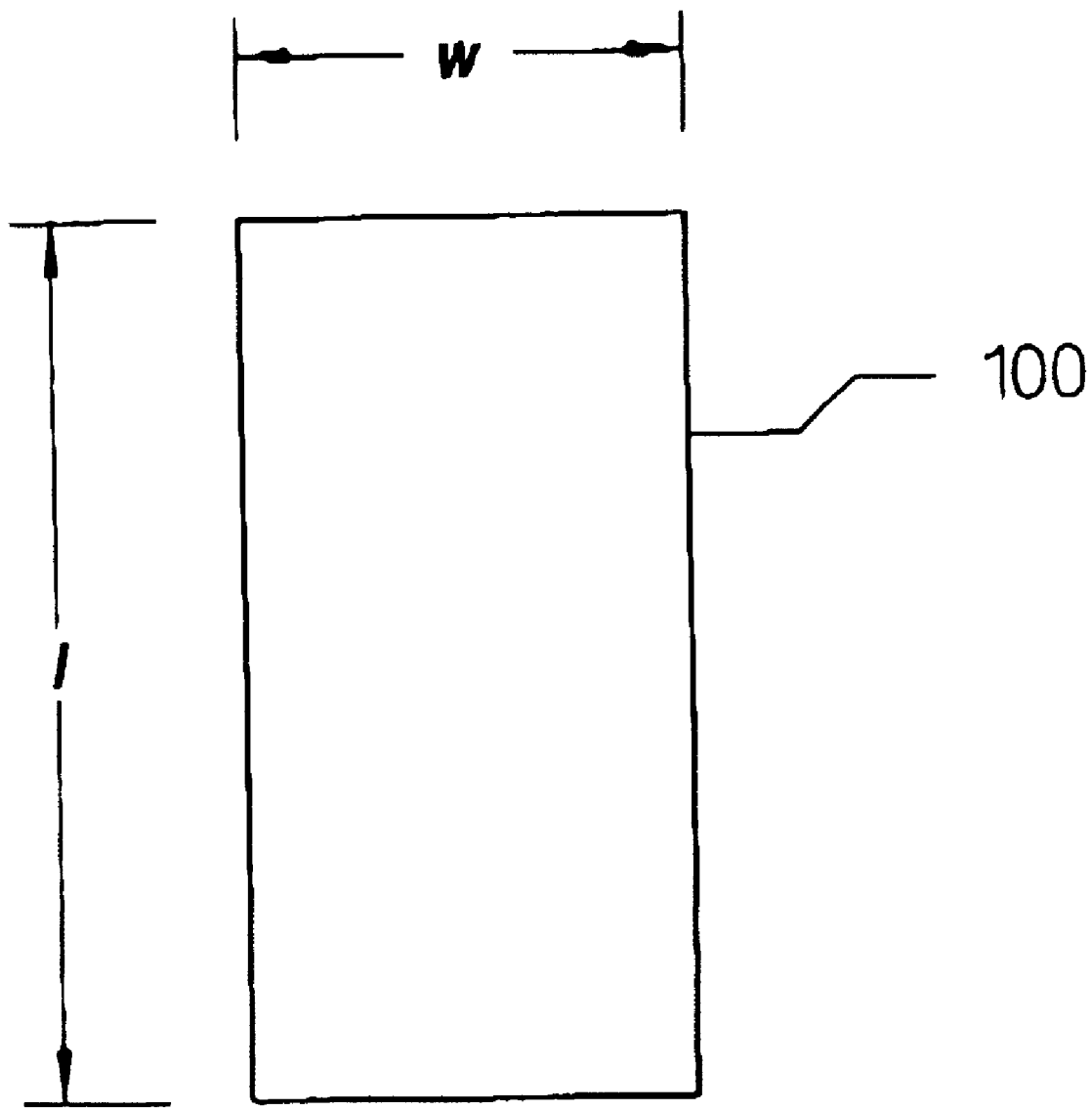

The waveguide structure 100 shown in FIGS. 1(a) and 1(b) comprises a strip of finite thickness and width of a first material having a high free (or almost free) charge carrier density, surrounded by a second material which has a very low free carrier density. The strip material can be a metal or a highly doped semiconductor and the background material can be a dielectric.

Suitable materials for the strip include (but are not limited to) gold, silver, copper, aluminium and highly n- or p-doped GaAs, InP or Si, while suitable materials for the surrounding material include (but are not limited to) glass, quartz, polymer and undoped or very lightly doped GaAs, InP or Si. Particularly suitable combinations of materials include Au for the strip and $SiO_2$ for the surrounding material.

The thickness and the width of the strip are selected such that the waveguide supports a long-ranging plasmon-polariton mode at the free-space operating wavelength of interest. Suitable dimensions for $Au/SiO_2$ waveguides at an operating free-space wavelength of 1550 nm are about 10 to 30 nm for the thickness and about 2 to 12 µm for the width; a thickness of 20 nm and a width of 4 µm are good dimensions. When structure dimensions are mentioned from this point onward, they refer to the $Au/SiO_2$ material combination at an operating optical free-space wavelength of 1550 nm. Similar dimensions are needed for most material combinations.

The plasmon-polariton field may be excited by optical radiation coupled to the strip in an end-fire manner from a fiber butt-coupled to the input of the waveguide. The output of the waveguide can also be butt-coupled to a fibre. Alternatively, it could be excited at an intermediate position by an alternative means, for example using the so-called attenuated total reflection method (ATR).

The length/shown in FIG. 1(b) is arbitrary and will be selected to implement a desired interconnection.

It has been demonstrated that a straight waveguide 100 with the dimensions set out above is polarisation sensitive. The plasmon-polariton wave is highly linearly polarised in the vertical direction, i.e. perpendicular to the plane of the strip. Hence, it may serve as a polarisation filter, whereby substantially only a vertical polarised mode (aligned along the y-axis as defined in FIG. 1(a)) of the incident light is guided.

Figure 17:
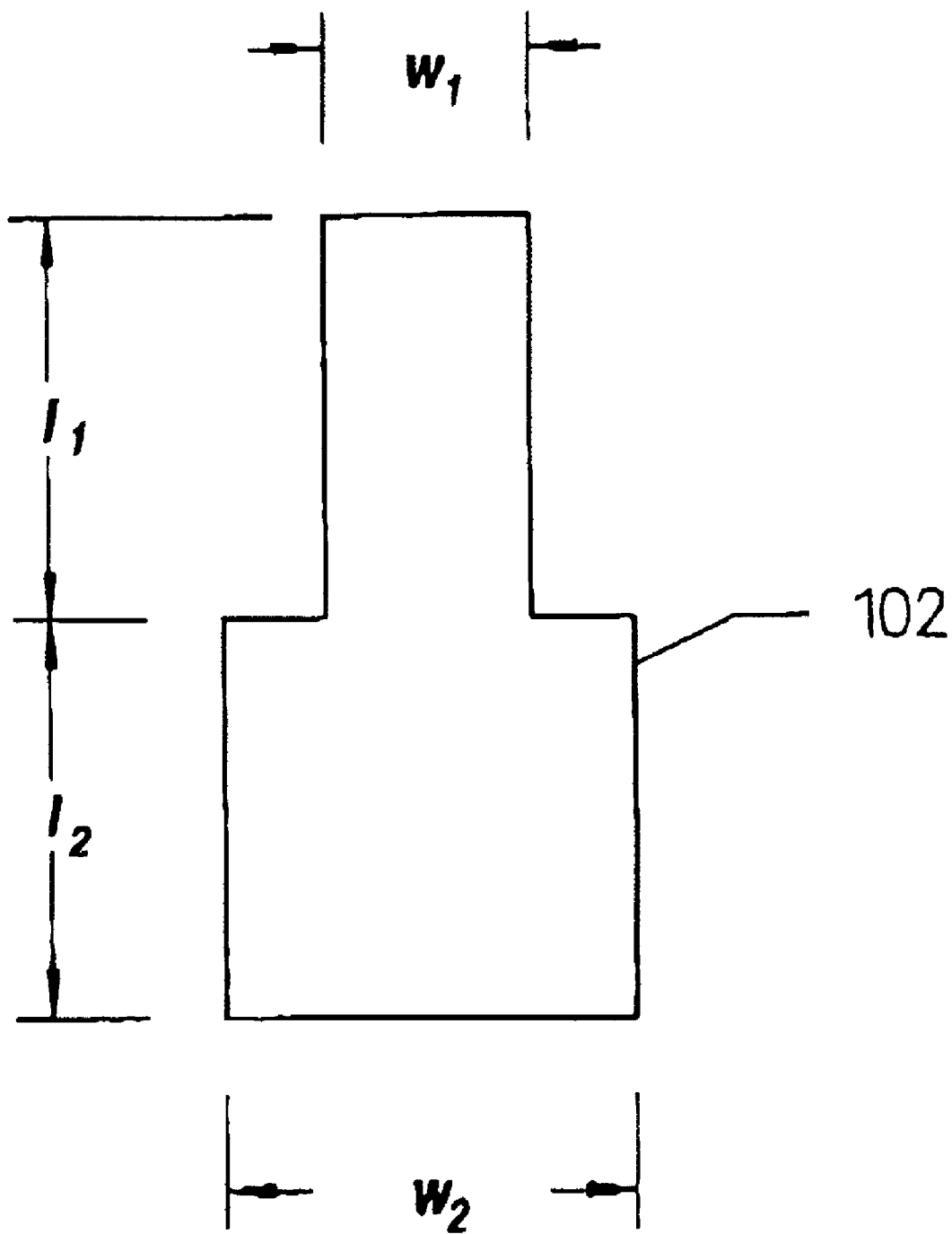
FIG. 17 is a plan view of a waveguide with opposite sides stepped to provide different widths.

A transition waveguide section 102 having stepped sides as shown in FIG. 17 can be used to interconnect two sections of waveguide having different widths. The larger width can be used to more effectively couple the waveguide to the input/output fibres. The reduced width helps to reduce the insertion loss of the waveguide. Typical widths are about $W_2=10$ µm to couple to single mode fibre and $W_1=4$ µm for the waveguide width. Any symmetry of the structure shown can be used.

Figure 18:
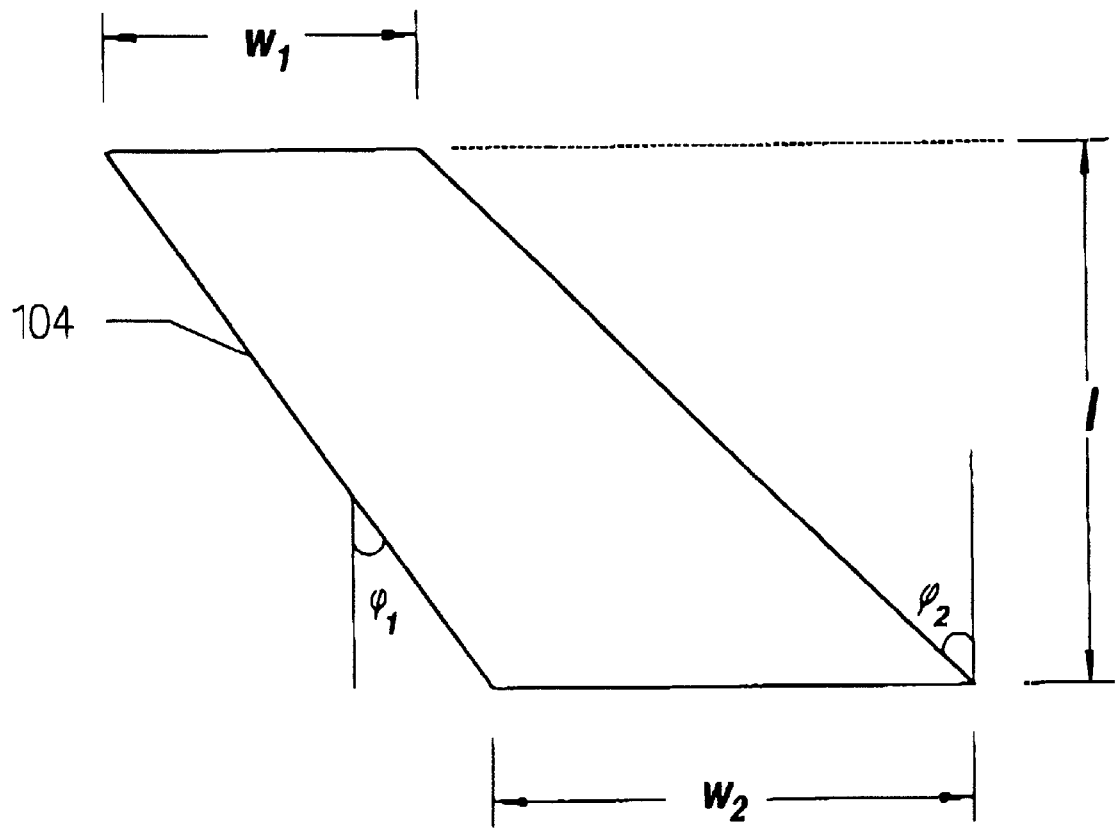
FIG. 18 is a plan view of a waveguide which is tapered and slanted.

An angled section 104 as shown in FIG. 18 can be used as an interconnect. The dimensions are adjusted for a particular application as needed. Usually the angles are kept small, in the range of 1 to 15 degrees and the input and output widths are usually similar, about 4 µm. The sides of the angled section 104 could be tapered, as shown in FIG. 18, or parallel. It should also be appreciated that the angle of the inclination could be reversed, i.e. the device could be symmetrical about the bottom right hand corner shown in FIG. 18 or transposed about that axis if not symmetrical about it.

Figure 19:
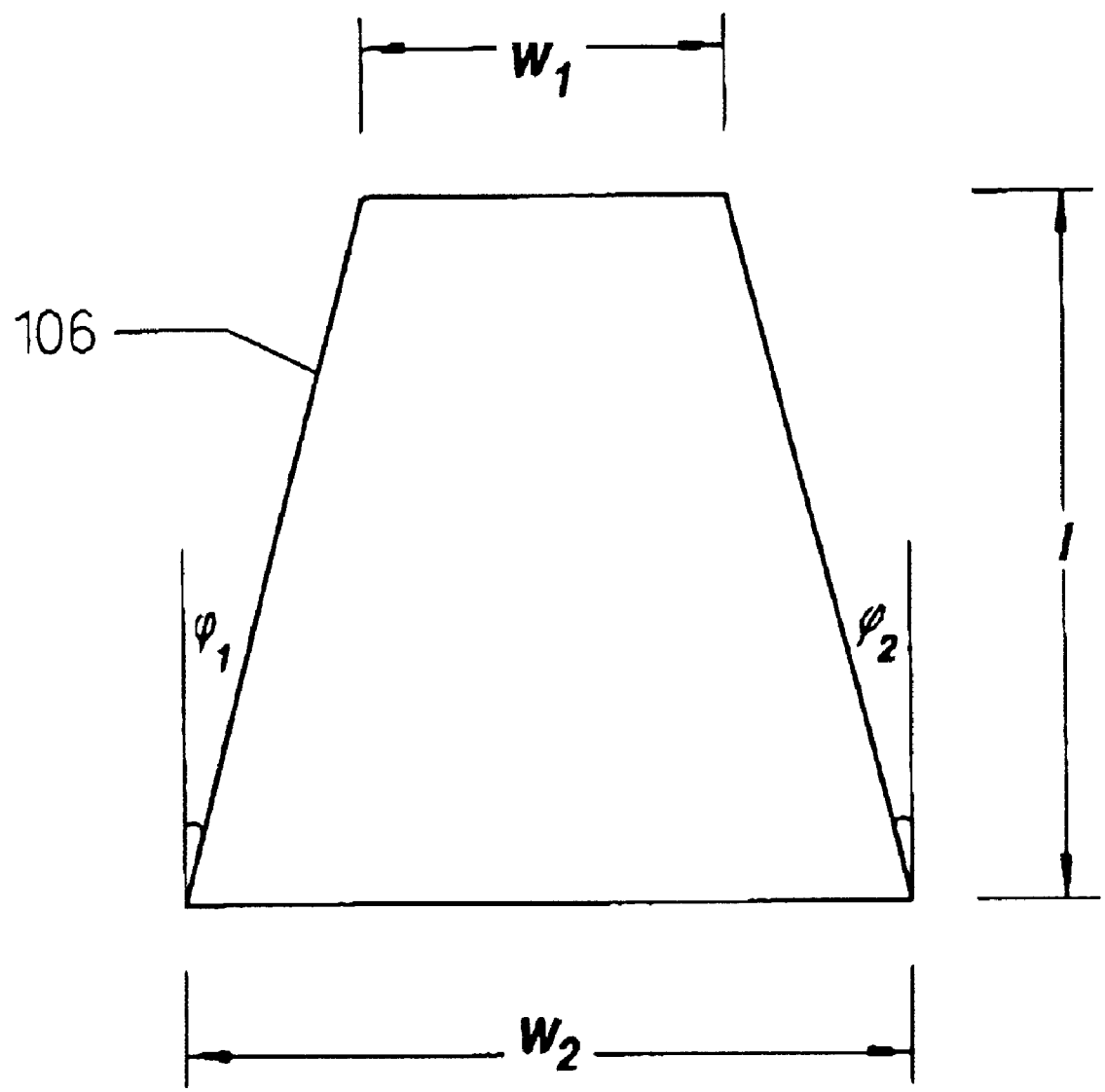
FIG. 19 is a plan view of a trapezoidal waveguide.

A tapered waveguide section 106 as shown in FIG. 19 can be used to interconnect two waveguides of different widths. The length of the taper is usually adjusted such that the angles are small, usually in the range of 1 to 15 degrees. The taper angles at the two sides are not necessarily the same.

Such a configuration might be used as an input port, perhaps as an alternative to the layout shown in FIG. 17, or as part of another device such as a power splitter. Any symmetry of the structure shown can be used.

Figure 20:
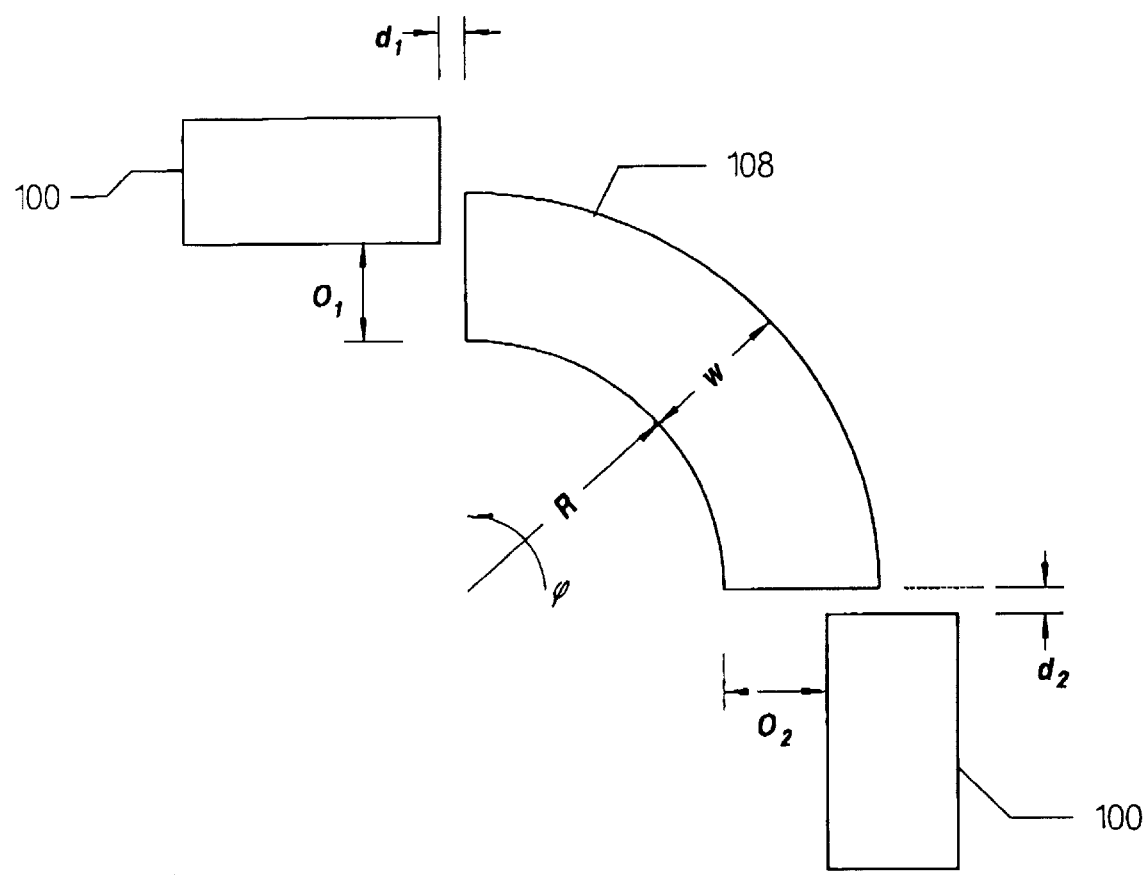
FIG. 20 is a plan view of a curved waveguide section suitable for interconnecting waveguides at a corner.

A curved waveguide section 108 as shown in FIG. 20 can be used to redirect the light. The angle φ of the bend can be in the range of 0 to 360 degrees and the bending radius R can be in the range of a few microns to a few centimetres. For a 45-degree bend, a radius of 0.5 to 2 cm is appropriate. The critical dimensions are the radius R and the positions of the input and output straight sections 100. Although the device will work and the structure 108 will convey the plasmon-polariton wave around the bend, there is leakage out of the bend (from the exterior curve) and also reflection back in the direction from which the wave came. Reduced radiation and reflection is obtained when the input and output waveguides 100 are offset outwards relative to the ends of the bend. The reason for this is that the straight waveguide sections 100 have an optical field extremum that peaks along the longitudinal centre line, and then decays towards the edges. In the bend, the extremum of the optical field distribution shifts towards the exterior of the curve. This results in increased radiation from the external edge of the curve and increased reflection back to the input waveguide 100 due to a mismatch in the field distributions. Offsetting the input and output waveguides 100 towards the outside of the curve helps to minimise both the radiation and the reflection, since the extrema of the optical fields are more closely aligned. The tighter the radius R, the greater the radiation from the exterior of the curve so the offset $O_1$ is related to the radius R and the optimum values would have to be determined according to the specific application.

It should also be noted that it is not necessary to connect the input and output waveguides 100 directly to the curve. As shown in FIG. 20, it is possible to have a short spacing $d_1$ between the end of the input waveguide 100 and the adjacent end of the curved section 108. Generally speaking, that spacing $d_1$ should be minimised, even zero, and probably no more than a few optical wavelengths. A similar offset $O_2$ and spacing $d_2$ could be provided between the bend 108 and the output straight waveguide 100.

Although FIG. 20 shows no gradual transition between the straight waveguides 100 at the input and output and the ends of the curved section 108, it is envisaged that, in practice, a more gradual offset could be provided so as to reduce edge effects at the corners.

Figure 21:
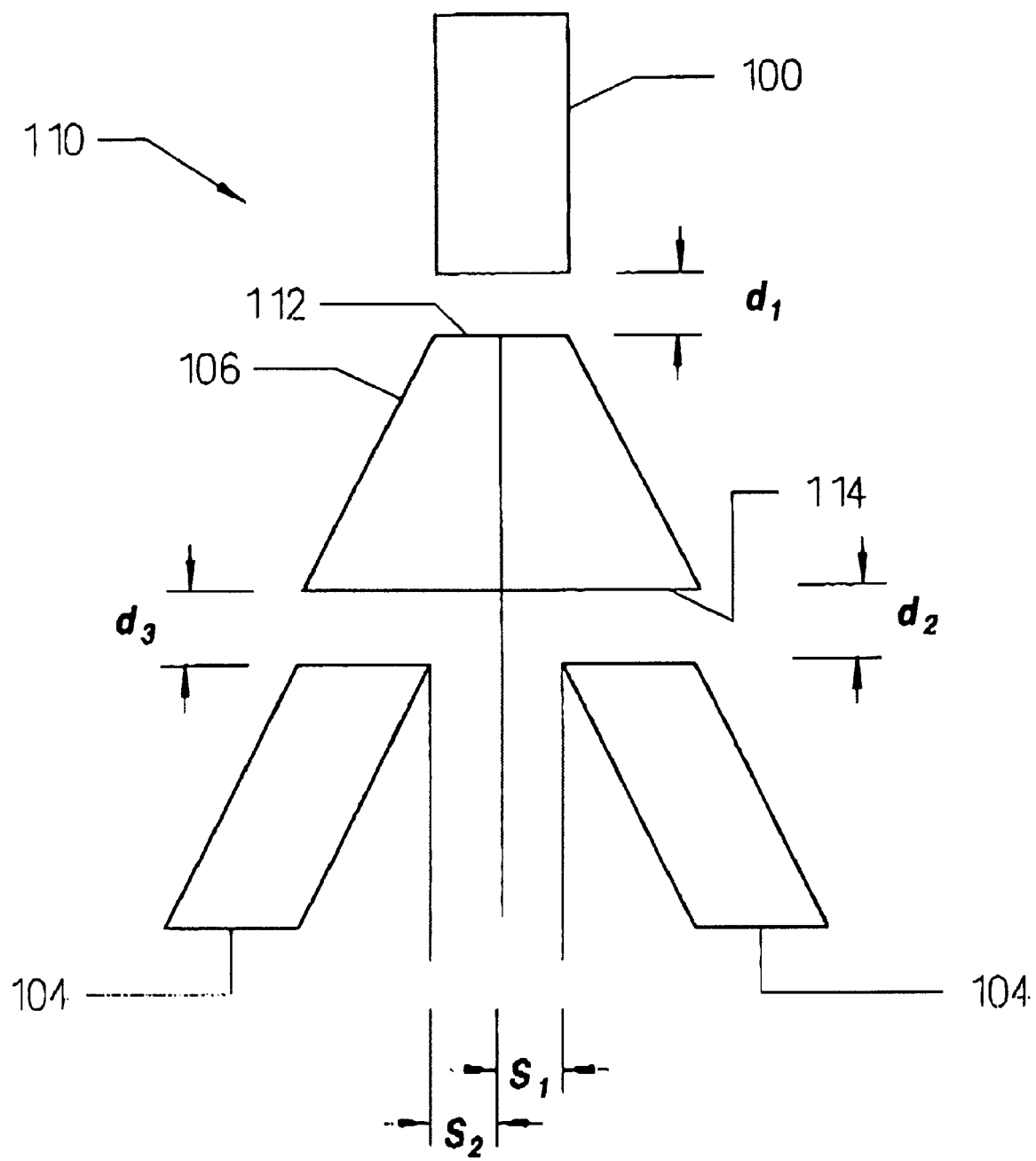
FIG. 21 is a plan view of a two-way splitter/combiner formed by a combination of three straight waveguide sections and one tapered waveguide section.

FIG. 21 shows a two-way power splitter 110 formed from a trapezoidal section 106 with a straight section 100 coupled to its narrower end 112 and two angled sections 104 coupled side-by-side to its wider end 114. The distances between the input waveguide 100 and the end 112 of the tapered section 106 and the output waveguides 104 and the wider end 114 of the tapered section 106, $d_1$, $d_2$ and $d_3$, respectively, should be minimised. The angle between the output waveguides 104 is usually in the range of 0.5 to 10 degrees and their widths are usually similar. The offsets $S_1$ and $S_2$ between the output waveguides and the longitudinal centre line preferably are set to zero, but could be non-zero, if desired, and vary in size. Ideally, however, the output sections 104 should together be equal in width to the wider end 114.

The widths of the output sections 104 can be adjusted to vary the ratio of the output powers. The dimensions of the centre tapered section 106 are usually adjusted to minimise input and output reflections and radiation losses in the region between the output sections 104.

It should also be noted that the centre tapered section 106 could have angles that vary according to application.

It is envisaged that the tapered section 106 could be replaced by a rectangular transition section having a width broader than the width of the input waveguide 100 so that the transition section favoured multimode propagation causing constructive/destructive interference patterns throughout its length. The length can be selected so that, at the output end of the rectangular transition section, the constructive portions of the interference pattern will be coupled into the different waveguides establishing in effect a 1 to N power split. Such a splitter then would be termed a multimode interferometer-based-power divider.

It should be appreciated that the device shown in FIG. 21 could also be used as a combiner. In this usage, the light is injected into the waveguide sections 104 and combined by the tapered centre section 106 to form the output wave which emerges from the straight waveguide section 100.

In either the Y splitter or the interferometer power divider, the number of arms or limbs 104 at the output could be far more than the two that are shown in FIG. 21.

It is also feasible to have a plurality of input waveguides. This would enable an N×N divider to be constructed. The dimensions of the transition section 106 then would be controlled according to the type of splitting/combining required.

Figure 22:
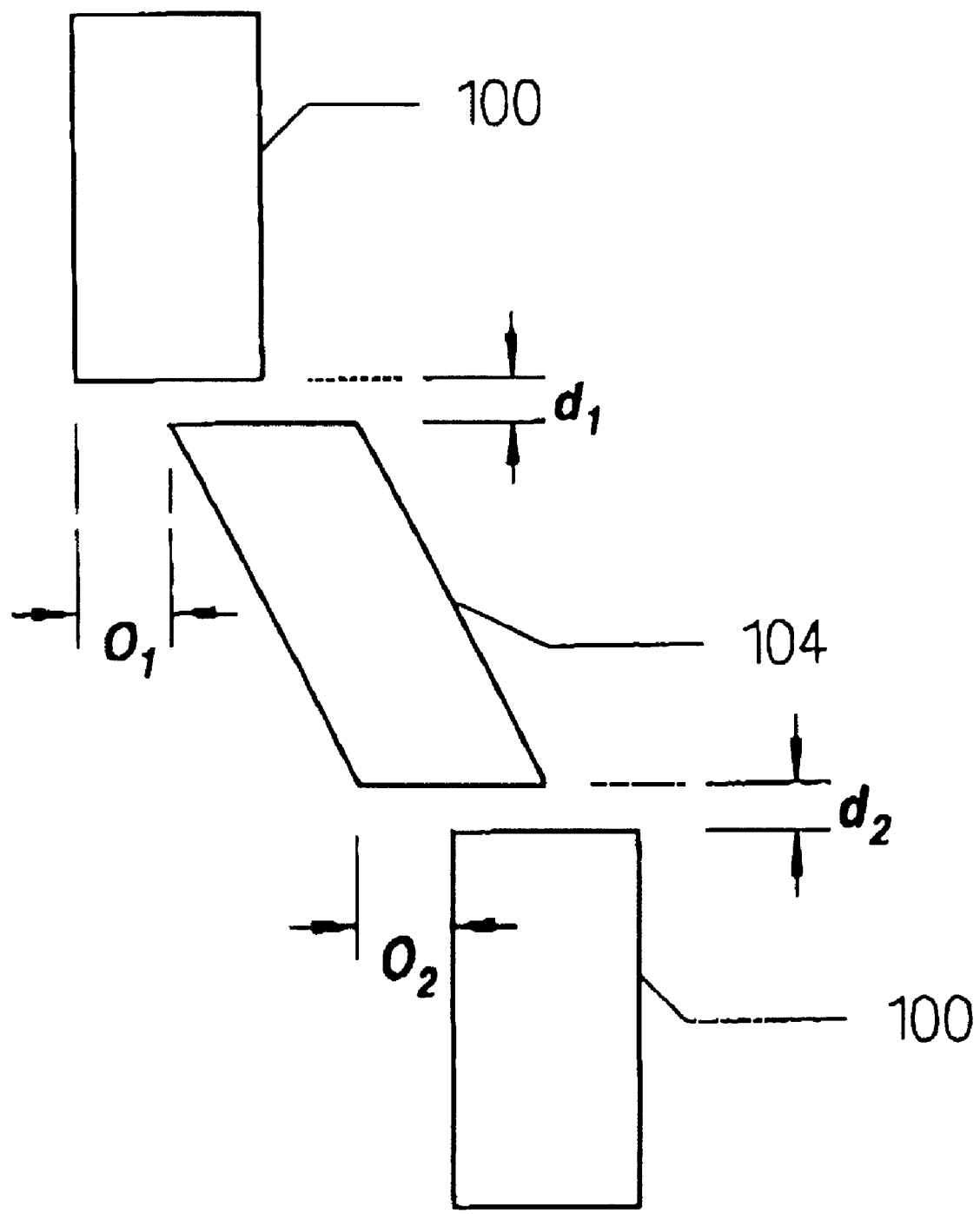
FIG. 22 is a plan view of an angled junction using a slanted section.

As shown in FIG. 22, an angled waveguide section 104 may be used to form an intersection between two straight waveguide section 100, with the dimensions adjusted for the particular application. It should be noted that, as shown in FIG. 22, the two straight sections 100 are offset by the distances $O_1$ and $O_2$ which would be selected to optimise the couplings by reducing radiation and reflection losses. The angle of the trapezoidal section 104 will be a factor in determining the best values for the offsets $O_1$ and $O_2$. The sections 100 and 104 need not be connected directly together but could be spaced by the distances $d_1$ and $d_2$ and/or coupled by a suitable transition piece that would make the junction more gradual (i.e., the change of direction would be more gradual).

This, therefore, illustrates the principle of offset wherever there is a transition or change of direction of the optical wave and an inclination relative to the original path, which can cause radiation and reflection. It should be linked to FIG. 20 which demonstrates the same kind of principle of offsets related to a curved section 108.

Figure 23:
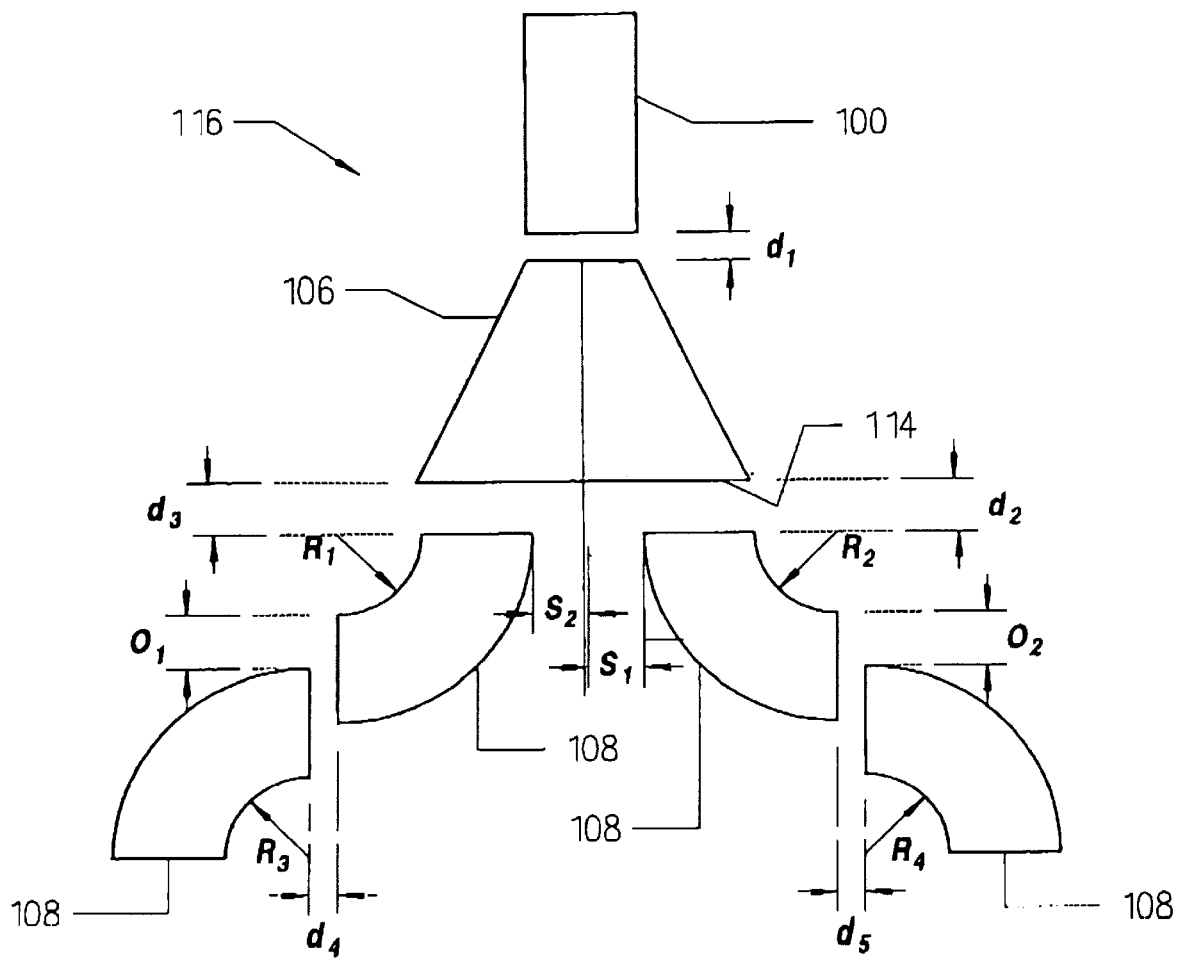
FIG. 23 is a plan view of a power divider formed by a trapezoidal section and pairs of concatenated bends.

As illustrated in FIG. 23, a power divider 116 can also be implemented using a pair of concatenated curved sections 108 instead of each of the angled sections 104 in the splitter 110 shown in FIG. 21. As shown in FIG. 23, in each pair, the curved section nearest to the wider end 114 of the tapered section 106 curves outwards from the longitudinal centre line of the tapered section 106 while the other curved section curves oppositely so that they form an "S" bend. Also, the curved sections in each pair are offset one relative to the other for the reasons discussed with respect to the bend 108 shown in FIG. 20. Other observations made regarding the power divider and the curved section disclosed in FIGS. 21 and 20 respectively, also hold in this case.

Figure 24:
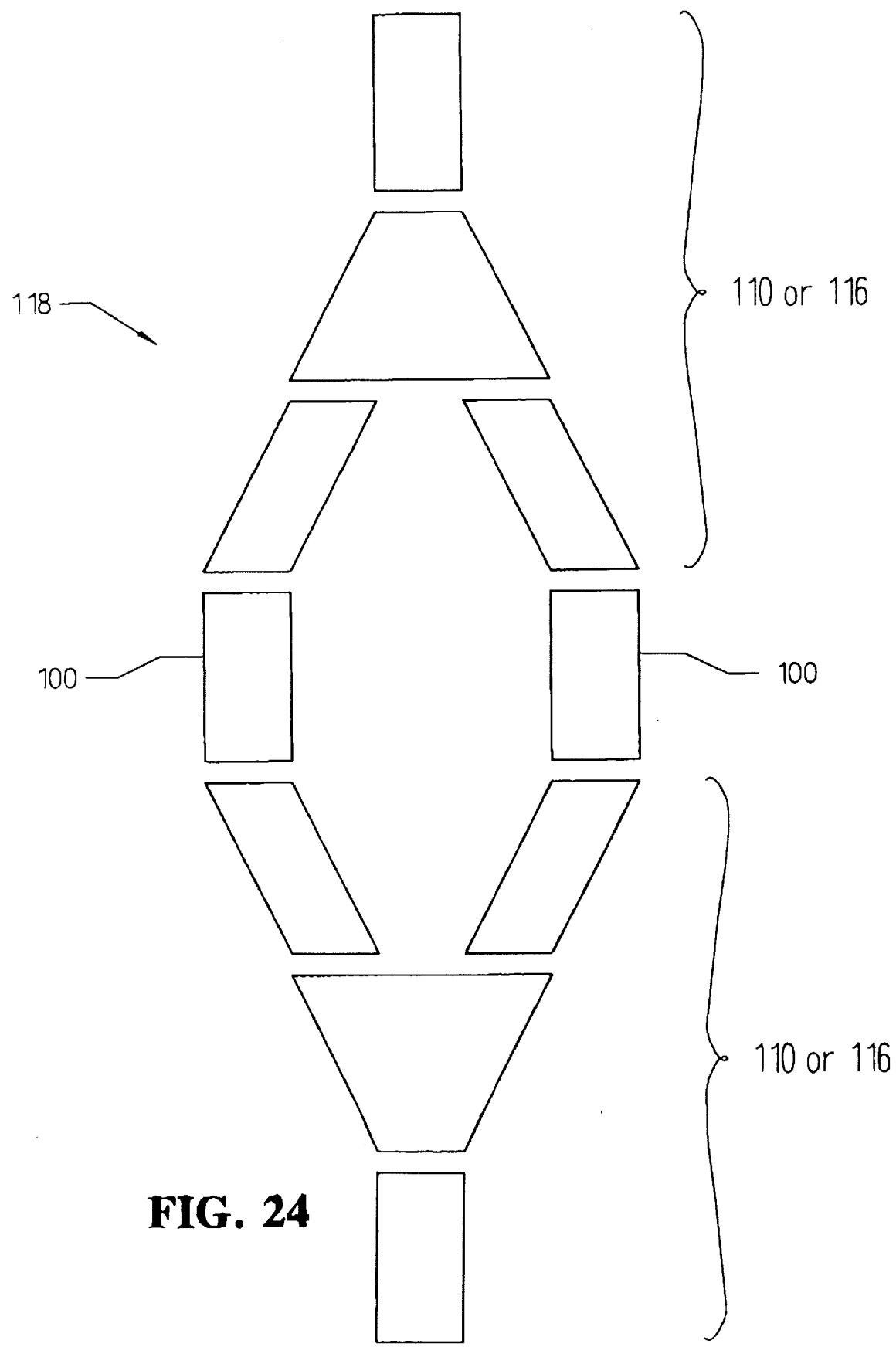
FIG. 24 is a plan view of a Mach-Zehnder interferometer formed using a combination of the waveguide sections.
Figure 25:
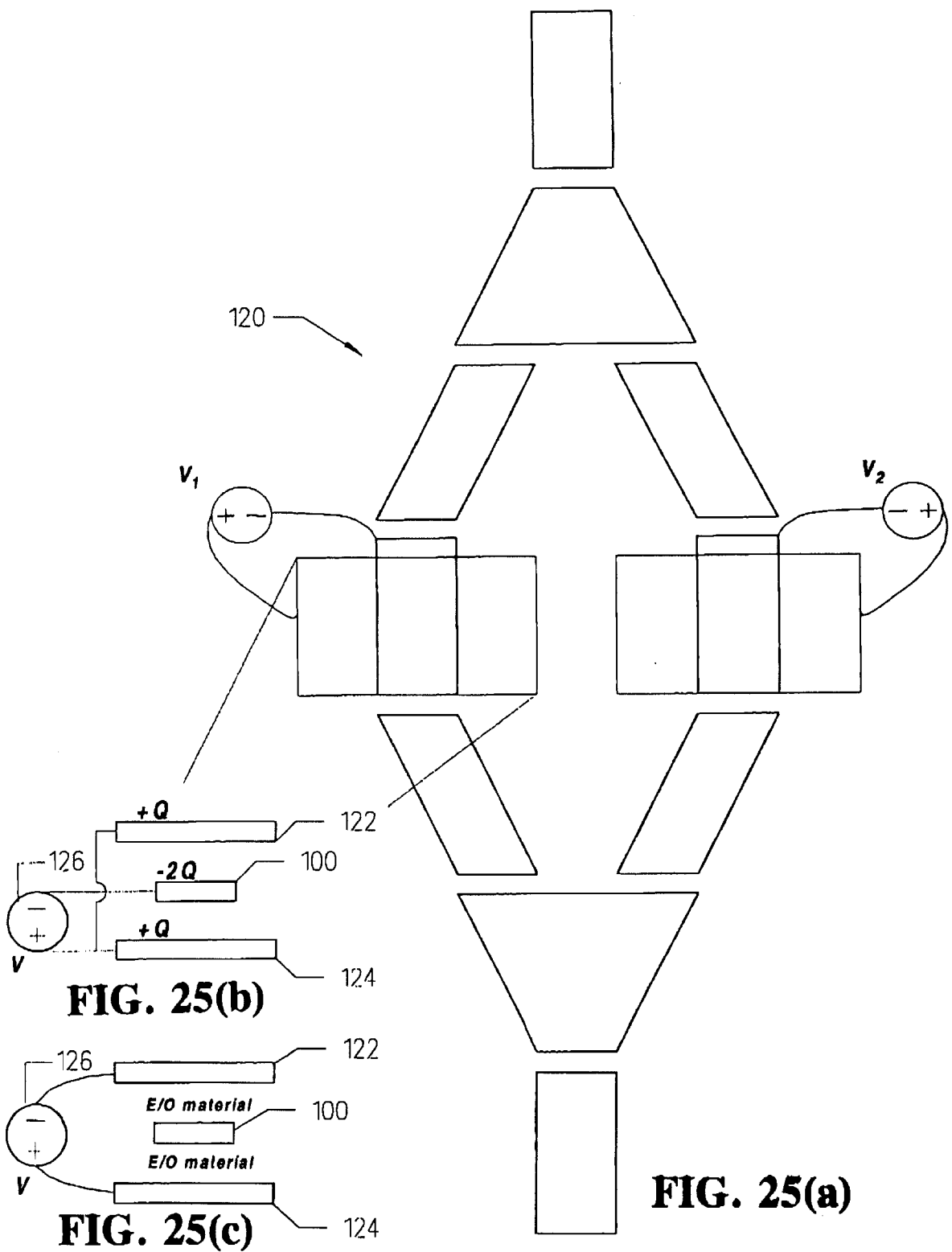
FIG. 25(a) is a schematic plan view of a modulator using the Mach-Zehnder waveguide structure of FIG. 24.
FIGS. 25(b) and 25(c) are inset diagrams illustrating alternative ways of applying a modulation control voltage.

FIG. 24 illustrates a Mach-Zehnder interferometer 118 created by interconnecting two power splitters 110 as disclosed in FIG. 21. Of course, either or both of them could be replaced by the power splitter 116 shown in FIG. 23. Light injected into one of the ports, i.e. the straight section 100 of one power splitter 110, is split into equal amplitude and phase components that travel along the angled arms 104 of the splitter, are coupled by straight sections 100 into the corresponding arms of the other splitter, and then are recombined to form the output wave.

If the insertion phase along one or both arms of the device is modified then destructive interference between the re-combined waves can be induced. This induced destructive interference is the basis of a device that can be used to modulate the intensity of an input optical wave. The lengths of the arms are usually adjusted such that the phase difference in the re-combined waves is 180 degrees for a particular relative change in insertion phase per unit length along the arms. The structure will thus be optically long if the mechanism used to modify the per unit insertion phase is weak (or optically short if the mechanism is strong).

FIG. 25(a) illustrates a modulator 120 based on the Mach-Zehnder 118 disclosed in FIG. 24. As illustrated also in FIG. 25(b), parallel plate electrodes 122 and 124 are disposed above and below, respectively, each of the strips 100 and spaced from it by the dielectric material. The electrodes are connected in common to one terminal of a voltage source 126, and the strip 100 is connected using a minimally invasive contact to the other terminal. Variation of the voltage V effects the modulating action. According to the plasma model for the strip 100, a change in the carrier density of the latter (due to charging +2Q or −2Q) causes a change in its permittivity, which in turn causes a change in the insertion phase of the arm. (The change induced in the permittivity is described by the plasma model representing the guiding strip at the operating wavelength of interest. Such model is well known to those of ordinary skill in the art and so will not be described further herein. For more information the reader is directed to reference [21], for example.) This change is sufficient to induce destructive interference when the waves in both arms re-combine at the output combiner. FIG. 25(c) illustrates an alternative connection arrangement in which the two plate electrodes 122 and 124 are connected to respective ones of the terminals of the voltage source 126. In this case, the dielectric material used as the background of the waveguide is electro-optic ($LiNbO_3$, a polymer, . . . ). In this instance, the applied voltage V effects a change in the permittivity of the background dielectric thus changing the insertion phase along the arm. This change is sufficient to induce destructive interference when the waves in both arms re-combine.

For both cases described above, it is possible to apply voltages in opposite polarity to both arms of the structure as suggested in the Figure. This effects an increase in the insertion phase of one arm and a decrease in the insertion phase of the other arm of the Mach-Zehnder (or vice versa), thus reducing the magnitude of the voltage or the length of the structure required to achieve a desirable degree of destructive interference at the output.

Also, it is possible to provide electrodes 122 and 124 and a source 126 for only one of the strips 100 in order to provide the required interference.

It should be appreciated that other electrode structures could be used to apply the necessary voltages. For example, the electrodes 122 and 124 could be coplanar with the strip 100, one on each side of it.

Figure 26:
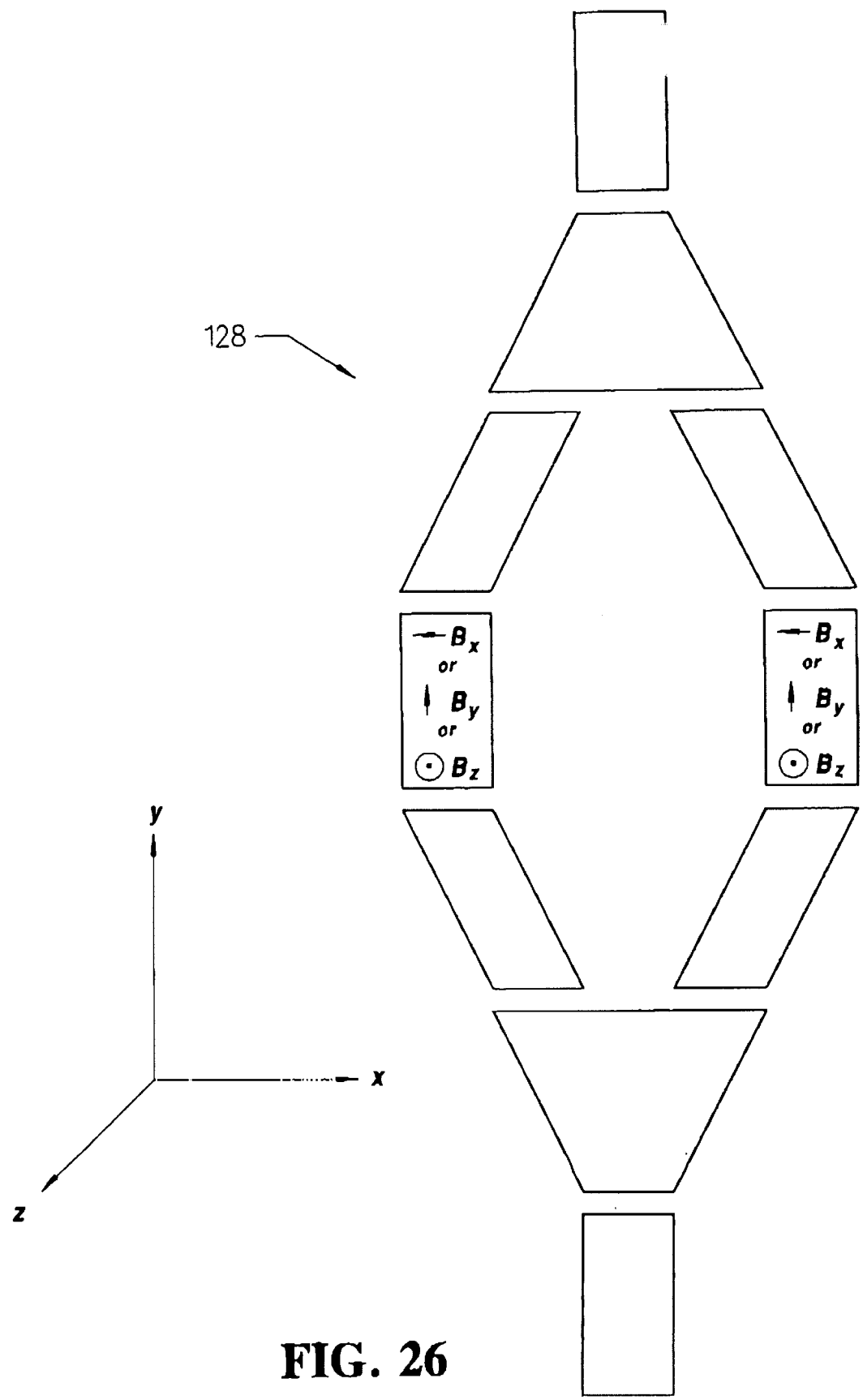
FIG. 26 is a plan view of a modulator using the Mach-Zehnder waveguide structure of FIG. 24 and illustrating magnetic field control.

FIG. 26 illustrates an alternative implementation of a Mach-Zehnder 128 which has the same set of waveguides as that shown in FIG. 24 but which makes use of magnetic fields B applied to either or both of the middle straight section arms in one or all of the orientations shown, or their opposites, to induce a change in the permittivity tensor describing the strips. (The change induced in the tensor is described by the plasma model representing the guiding strip at the operating wavelength of interest. Such model is well known to those of ordinary skill in the art and so will not be described further herein. For more information the reader is directed to reference [21], for example. The change induced in the permittivity tensor will induce a change in the insertion phase of either or both arms thus inducing a relative phase difference between the light passing in the arms and generating destructive interference when the waves re-combine at the output combiner. Modulating the magnetic field thus modulates the intensity of the light transmitted through the device. The magnetic field can be made to originate from current-carrying wires or coils disposed around the arms in such a manner as to create the magnetic field in the desired orientation and intensity in the optical waveguides. The wires or coils could be fabricated using plated via holes and printed lines or other conductors in known manner. Alternatively, the field could be provided by an external source, such as a solenoid or toroid having poles on one or both sides of the strip.

Figure 27:
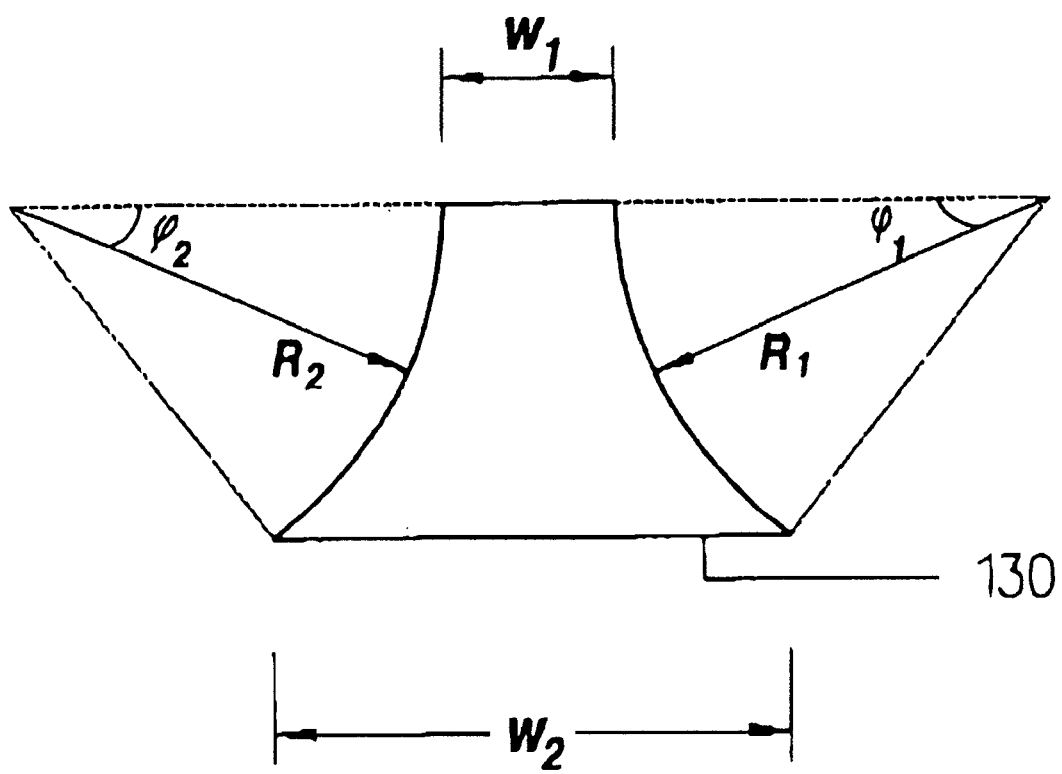
FIG. 27 is a plan view of a waveguide having curved side edges and suitable for use as a transition piece.

FIG. 27 illustrates an alternative transition waveguide section 130 which has curved sides, rather than straight as in the trapezoidal transition section disclosed in FIG. 19. In FIG. 27, the curved sides are shown as sections of circles of radius $R_1$ and $R_2$, respectively, but it should be appreciated that various functions can be implemented, such as exponential or parabolic, such that the input and output reflections are minimised.

Figure 28:
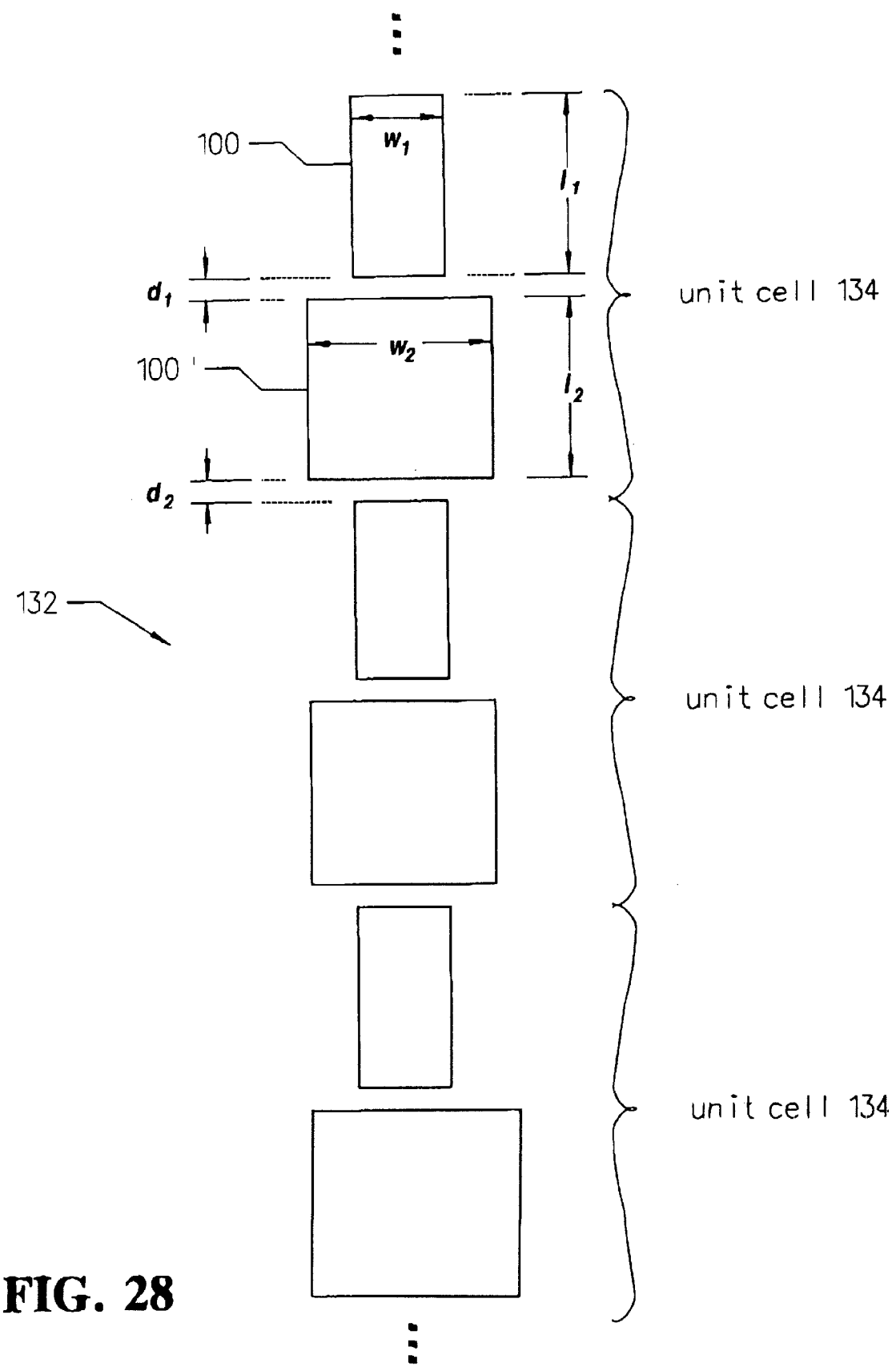
FIG. 28 is a plan view of a periodic structure formed by a series of unit cells each comprising two waveguide sections having different widths and lengths.

FIG. 28 illustrates a periodic waveguide structure 132 comprising a series of unit cells 134 where each cell 134 comprises two rectangular waveguides 100 and 100' having different lengths $l_1$ and $l_2$ and widths $w_1$ and $w_2$, respectively. The dimensions of the waveguides in each unit cell 134, the spacing $d_1$ therebetween, the number of unit cells, and the spacings $d_2$ between cells are adjusted such that Bragg reflection occurs at a desired operating wavelength or over a desired operating bandwidth. The period of the periodic structure, i.e. the length of each unit cell, $l_1+l_2+d_1+d_2$, can be made optically long such that a long-period periodic structure is obtained. The dimensions of the elements in the unit cell can also be made to change along the direction of the periodic structure in order to implement a prescribed transfer function (like in a chirped periodic structure).

Figure 29:
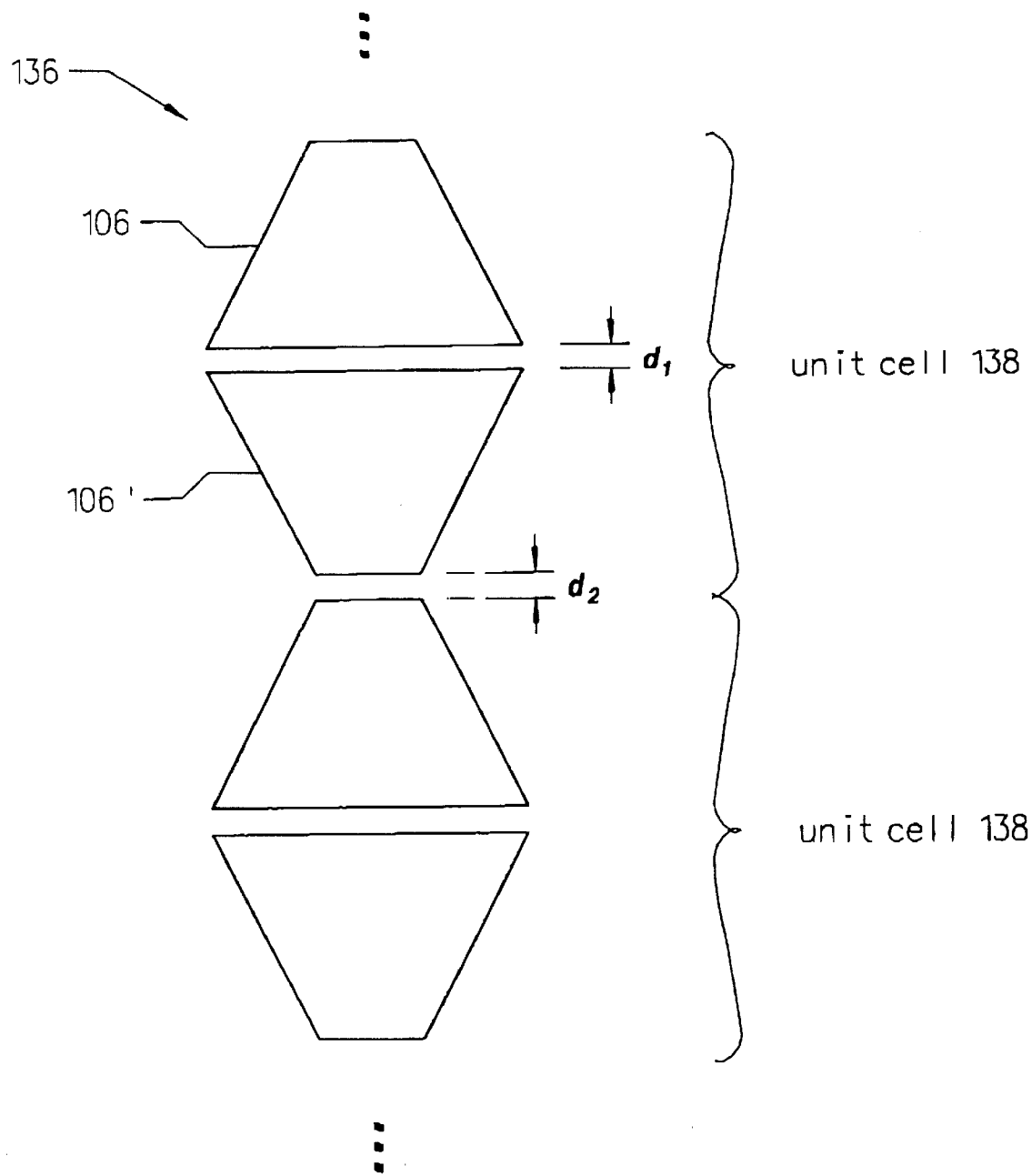
FIG. 29 is a plan view of a periodic waveguide structure formed by a series of unit cells each comprising two opposed trapezoidal waveguide sections.

It should be noted that the waveguides in each cell need not be rectangular, but a variety of other shapes could be used. For example, FIG. 29 illustrates a portion, specifically two unit cells only, of an alternative periodic structure 136 in which each unit cell 138 comprises two of the trapezoidal waveguide sections 106 described with reference to FIG. 19, with their wider edges opposed.

As another alternative, the trapezoidal waveguides 106/106' could be replaced by the transition sections 130, shown in FIG. 27, with or without spacings $d_1$ and $d_2$, to form a periodic structure having sinusoidally-varying sides. It should be noted that these periodic structures are merely examples and not intended to provide an exhaustive detailing of all possibilities; various other periodic structures could be formed from unit cells comprised of all sorts of different shapes and sizes of elements.

It should be noted that voltages can be applied to some or all of the strips in order to establish charges on the strips which would change their permittivity and thus vary the optical transfer function of the periodic structures. If the dielectric material surrounding the strip is electro-optic, then the applied voltages would also change the permittivity of the dielectric which also contributes to changing the optical transfer function of the periodic structure.

Photonic bandgap structures can be created by placing 2-D arrays of unit cells (comprised of strips of various shapes and sizes) over numerous planes separated by dielectric material. The size and shape of the strips are determined such that stop bands in the optical spectrum appear at desired spectral locations.

Figures 30A, 30B:
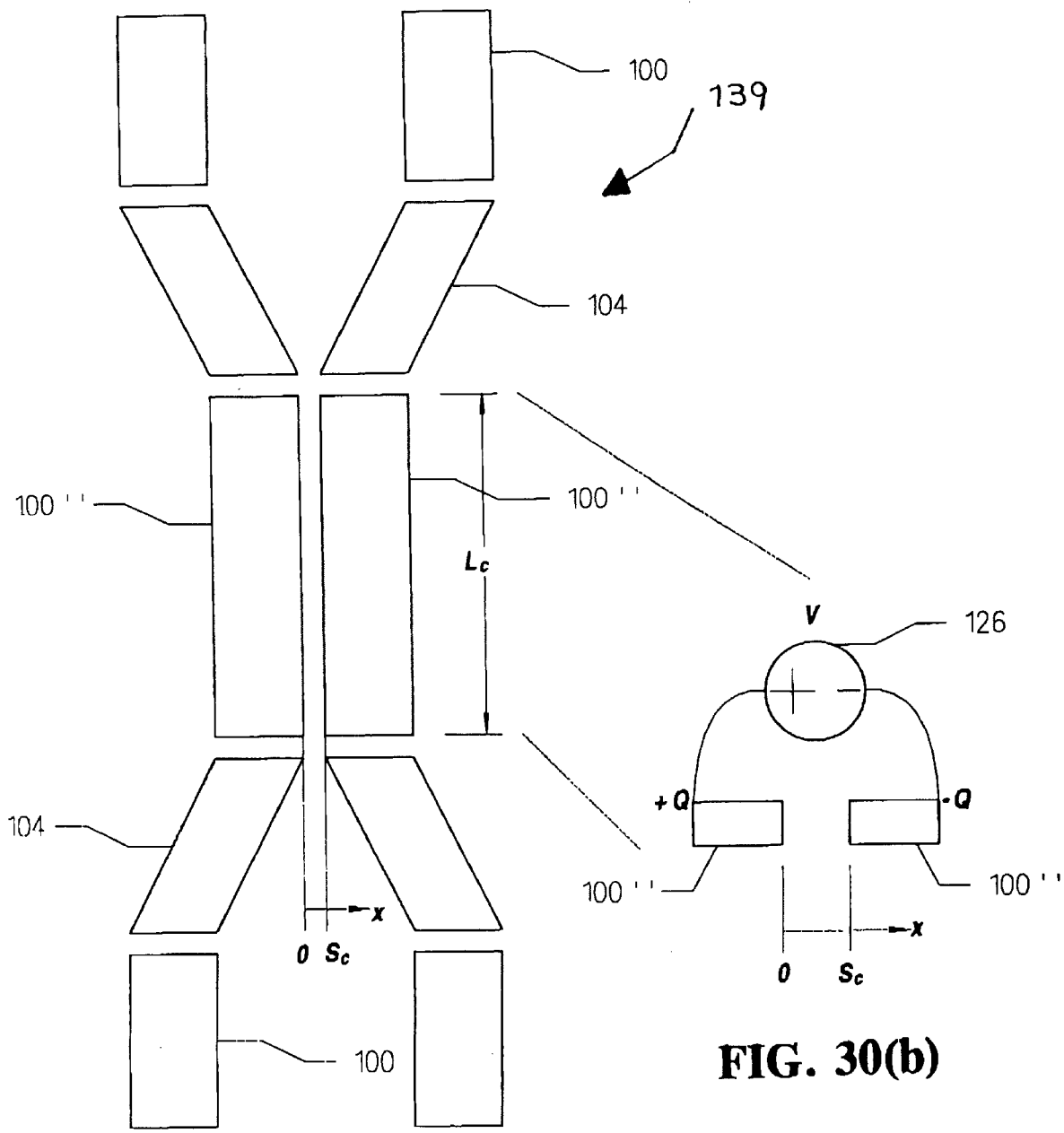
FIG. 30(a) is a plan view of an edge coupler formed by two parallel strips of straight waveguide with various other waveguides for coupling signals to and from them.
FIG. 30(b) is an inset diagram illustrating a way of applying a modulation control voltage.

FIG. 30(a) illustrates an edge coupler 139 created by placing two parallel strips 100" in close proximity over a certain length. The strips 100" could be separated by $S_c=1$ $\mu$m (or less) to 20 $\mu$m apart and the coupling length $L_c$ would be in the range of a few microns to a few dozen millimeters depending on the separation $S_c$, width and thickness of the strips 100', the materials used, the operating wavelength, and the level of coupling desired. Such a positioning of the strips 100" is termed edge coupling.

The gaps between the input and output of the waveguide sections shown would ideally be set to zero and a lateral offset provided between sections where a change of direction is involved. Curved sections could be used instead of the sections 104, 100 and 100" shown in FIG. 30(a).

Although only two strips 100" are shown in the coupled section, it should be understood that a plurality of strips can be coupled together to create an N×N coupler.

As illustrated in FIG. 30(b) a voltage can be applied to the edge-coupled section 100' via minimally invasive electrical contacts. FIG. 30(b) shows a voltage source 126 connected directly to the sections 100" but, if the sections 100, 104 and 100" in each arm are connected together electrically, the source 126 could be connected to one of the other sections in the same arm. Applying a voltage in such a manner charges the arms of the coupler, which according to the plasma model for the waveguide, changes its permittivity. If in addition the dielectric material placed between the waveguides is electro-optic, then a change in the background permittivity will also be effected as a result of the applied voltage. The first effect is sufficient to change the coupling characteristics of the structure but if an electro-optic dielectric is also used as suggested then both effects will be present allowing the coupling characteristics to be modified by applying a lower voltage.

Figures 31A, 31B:
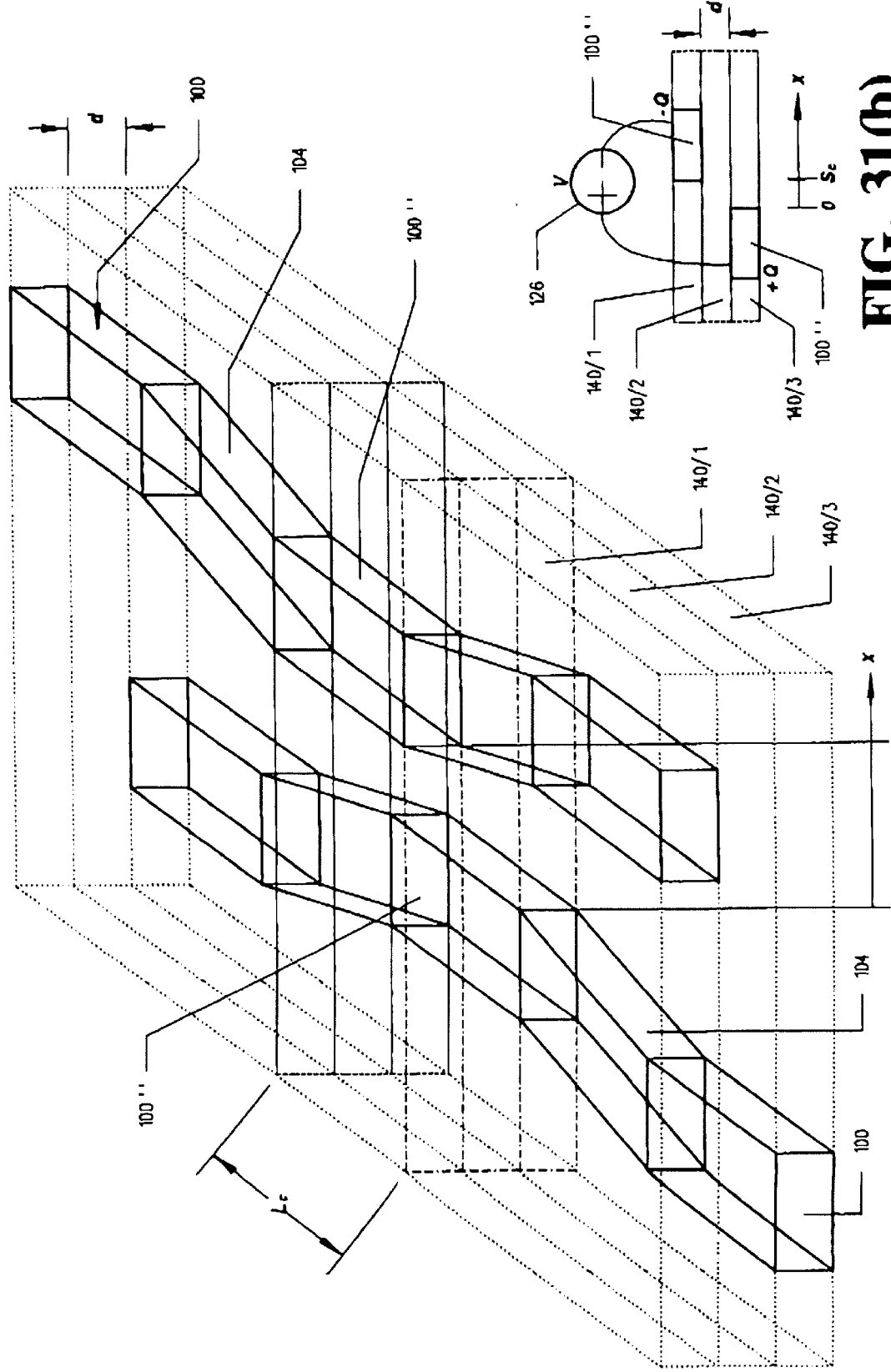
FIG. 31(a) is a perspective view of an edge coupler in which the parallel strips are not co-planar.
FIG. 31(b) is an inset diagram illustrating a way of applying a modulation control voltage.

FIG. 31 (a) illustrates coupled waveguides similar to those shown in FIG. 30(a) but placed on separate layers in a substrate having several layers 140/1, 140/2 and 140/3. The strips can be placed one directly above the other with a thin region of dielectric of thickness d placed between them. Such positioning of the strips is termed broadside coupling. The coupled guides can also be offset from broadside a distance $S_c$, as shown in FIG. 31(a). The strips could be separated by d=1 $\mu$m (or less) to 20 $\mu$m apart, the coupling length could be in the range of a few microns to a few dozens millimeters and the separation $S_c$ could be in the range of −20 to +20 $\mu$m, depending on the width and thickness of the strips, the materials used and the level of coupling desired.

As before, curved sections could be used instead of the straight and angled sections shown in FIG. 31(a).

Gaps can be introduced longitudinally between the segments of strip if desired and a lateral offset between the straight and angled (or curved) sections could be introduced.

Though only two strips are shown in the coupled section, it should be understood that a plurality of strips can be coupled together on a layer and/or over many layers to create an N×N coupler.

As shown in FIG. 31(b), a voltage source 126 could be connected directly or indirectly to the middle (coupled) sections 100" in a similar manner to that shown in FIG. 30(b).

Figure 32:
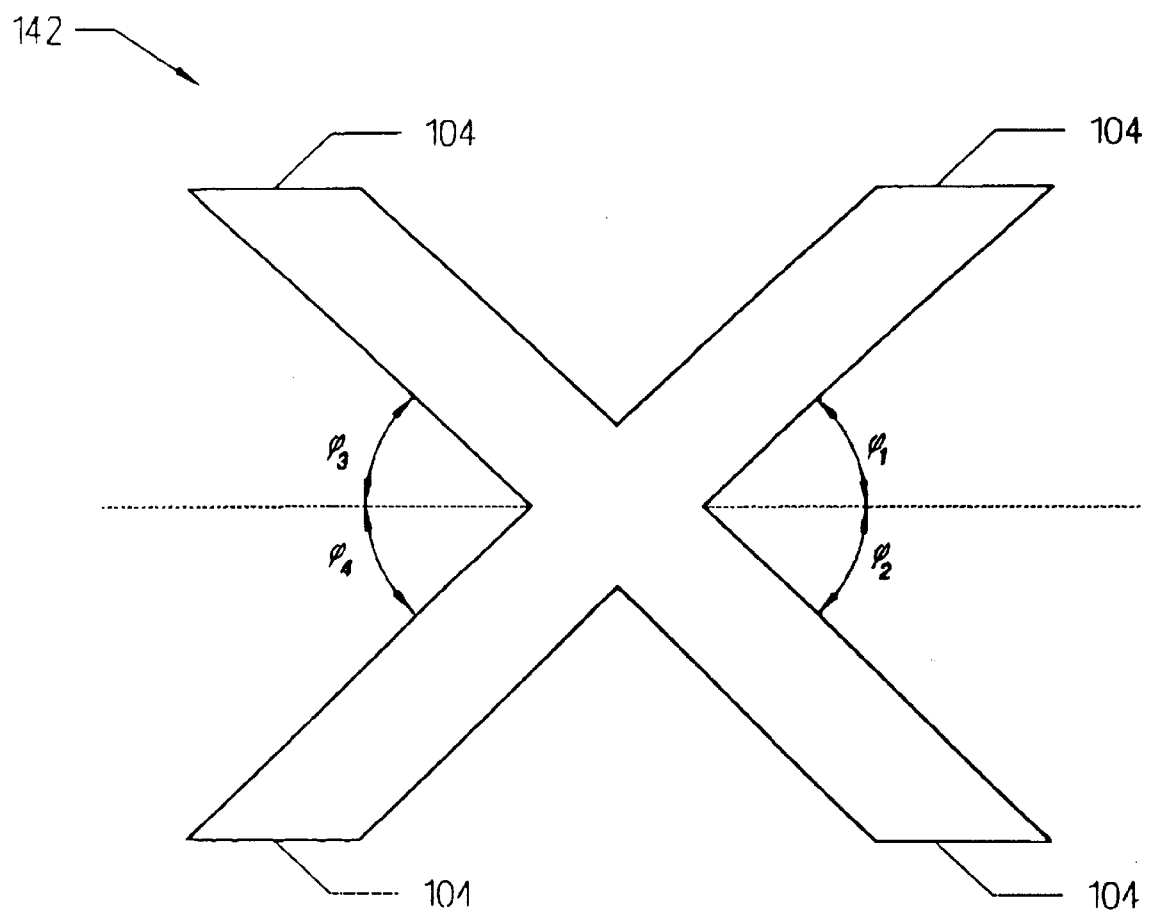
FIG. 32 is a plan view of an intersection formed by four sections of waveguide.

As illustrated in FIG. 32, an intersection 142 can be created by connecting together respective ends of four of the angled waveguide sections 104, their distal ends providing input and output ports for the device. When light is applied to one of the ports, a prescribed ratio of optical power emerges from the output ports at the opposite side of the intersection. The angles $\phi_1 \ldots \phi_4$ can be set such that optical power input into one of the ports emerges from the port directly opposite with negligible power transmitted out of the other ports. Any symmetry of the structure shown is appropriate.

Various other modifications and substitutions are possible without departing from the scope of the present invention. For example, although the waveguide structure shown in FIGS. 1(a) and 1(b), and implicitly those shown in other Figures, have a single homogeneous dielectric surrounding a thin metal film, it would be possible to sandwich the metal film between two slabs of different dielectric material; or at the junction between four slabs of different dielectric material. Moreover, the multilayer dielectric material(s) illustrated in FIG. 31(a) could be used for other devices too. Also, the thin metal film could be replaced by some other conductive material or a highly n- or p-doped semiconductor. It is also envisaged that the conductive film, whether metal or other material, could be multi-layered.

The foregoing examples are not meant to be an exhaustive listing of all that is possible but rather to demonstrate the breadth of application of the invention. The inventive concept can be applied to various other elements suitable for integrated optics devices. It is also envisaged that waveguide structures embodying the invention could be applied to multiplexers and demultiplexers. Moreover, the invention could be applied to electro-optical switching devices, magneto-optical switching devices and so on.

Although embodiments of the invention have been described and illustrated in detail, it is to be clearly understood that the same is by way of illustration and example only and not to be taken by way of the limitation, the spirit and scope of the present invention being limited only by the appended claims.

What is claimed is:

1. An optical device comprising a waveguide structure formed by a thin strip of a material having a relatively high free charge carrier density surrounded by a material having a relatively low free charge carrier density, the strip having finite width and thickness with dimensions such that optical radiation having a wavelength in a predetermined range couples to the strip and propagates along the length of the strip as a plasmon-polariton wave.

2. An optical device according to claim 1, wherein said free charge carrier density of the surrounding material is substantially negligible.

3. A device according to claim 1, for optical radiation having a free-space wavelength near 1550 nm, wherein the strip comprises a metal and has thickness less than about 0.1 microns, preferably 20 nm, and width of a few microns, preferably about 4 microns.

4. A device according to claim 3, wherein the strip has a thickness of about 20 nm and width of about 4 microns.

5. A device according to claim 1, wherein the strip is straight, curved, bent, or tapered.

6. A device according to claim 1, wherein said strip is curved, and further comprising at least a second strip of similar construction to the first-mentioned strip, the first and second strips being juxtaposed end to end with the end of the second strip offset outwardly relative to the juxtaposed end of the first-mentioned strip.

7. A device according to claim 1, further comprising a plurality of strips similar in construction to the first-mentioned strip, the plurality of strips having respective ends juxtaposed to one edge of the first-mentioned strip to form a combiner/splitter, the arrangement being such that said optical radiation leaving said first-mentioned strip via said one edge will be split between said plurality of strips and conversely said optical radiation coupled to said one edge by said plurality of strips will be combined to leave said first-mentioned strip by an opposite edge.

8. A device as according to claim 1, comprising a plurality of said strips arranged in a first group and a second group to form a splitter and a combiner, respectively, the splitter and the combiner being arranged to form a Mach-Zehnder interferometer device, the splitter comprising an input strip for receiving said optical radiation at one end thereof and having first and second strips coupled to an opposite end thereof each for receiving a portion of the radiation, the combiner comprising third and fourth strips each coupled at one end to a respective one of the first and second strips of the splitter and coupled at an opposite end to an output strip, the first and third strips, and the second and fourth strips forming two arms, respectively, each arm for propagating a respective one of the first and second plasmon-polariton waves to the output strip for recombination thereby.

9. A device according to claim 8, and means for adjusting the propagation characteristics of at least one of said first and second plasmon-polariton waves.

10. A device according to claim 9, wherein the adjusting means is arranged to modulate said propagation characteristics so as to obtain destructive interference upon recombination and thereby modulate the intensity of said optical radiation.

11. A device according to claim 10, wherein the adjusting means comprises at least one electrode adjacent a strip in a said arm and a voltage source for providing a potential difference between the electrode and the strip.

12. A device according to claim 10, wherein the material around the strip is an electro-optic material and the adjusting means comprises a pair of electrodes one each side of the strip and a voltage source connected to the electrodes for providing a potential difference therebetween.

13. A device according to claim 10, wherein the adjusting means is arranged to induce a magnetic field in the strip.

14. A device according to claim 13, wherein the adjusting means comprises a coil formed by metal-plated via holes and surface conductors.

15. A device according to claim 13, wherein the adjusting means comprises a solenoid having magnetic poles either side of the strip.

16. A device according to claim 1, comprising a plurality of said strips arranged to form a periodic structure comprising a plurality of unit cells, each unit cell comprising a first strip and a second strip, the first and second strips being dissimilar in one or more of shape and size.

17. A device according to claim 16, further comprising adjusting means for modifying an optical transfer function of the device.

18. A device according to claim 17, wherein the adjusting means comprises a voltage source for providing a potential difference between the first and second strips in each unit cell.

19. A device according to claim 18, wherein the material between the strips is an electro-optic material and the voltage source provides a potential gradient therein.

20. A device according to claim 18, wherein the adjusting means comprises at least one electrode positioned near the periodic structure and connected to one terminal of the voltage source, a second terminal of the voltage source being connected to at least one of the first and second strips of each unit cell.

21. A device according to claim 1, comprising a plurality of strips arranged to form a coupler, two of said strips being disposed with their adjacent edges in close proximity such that at least some of said plasmon-polariton wave propagating along one of said strips will couple onto the other of the strips.

22. A device according to claim 21, further comprising means for adjusting the propagation characteristics of said plasmon-polariton wave propagating along the coupled strips so as to control the degree of coupling between the strips.

23. A device according to claim 21, wherein the material between the coupled strips is electro-optic and further comprising means for adjusting the charge on the strips and the refractive index of the material therebetween.

24. A device according to claim 21, wherein the first and second strips are not coplanar.

25. A device according to claim 24, wherein the material between the coupled strips is electro-optic and further comprising means for adjusting the charge on the strips and the refractive index of the material therebetween.

26. A device according to claim 1, comprising at least three of said strips arranged to form a waveguide intersection, each having one end connected to the other strips to form said intersection, distal ends of the three strips constituting ports such that optical radiation input via the distal end of one of the strips will be conveyed across the intersection to emerge from one or both of the other strips.

27. A device according to claim 1, wherein the surrounding material is inhomogeneous.

28. A device according to claim 27, wherein the surrounding material comprises a combination of slabs, strips, laminae, or continuously variable material composition.

29. A device according to claim 27, wherein the strip is inhomogeneous.

30. A device according to claim 28, wherein the strip is inhomogeneous.

31. A device according to claim 1, wherein the strip is inhomogeneous.

* * * * *